Sept. 24, 1968　　　　　M. R. KRUPSKY　　　　　3,402,576
COMBINATION CLOTHES WASHER, DRYER, DISHWASHER, DRYCLEANER, AND
GARMENT APPEARANCE-FINISHING MACHINE
Filed Feb. 28, 1966　　　　　　　　　　　　　　　　11 Sheets-Sheet 1

INVENTOR
MICHAEL R. KRUPSKY
BY
*Michael R. Krupsky*

Sept. 24, 1968  M. R. KRUPSKY  3,402,576
COMBINATION CLOTHES WASHER, DRYER, DISHWASHER, DRYCLEANER, AND
GARMENT APPEARANCE-FINISHING MACHINE
Filed Feb. 28, 1966  11 Sheets-Sheet 4

INVENTOR
MICHAEL R. KRUPSKY
BY
Michael R. Krupsky

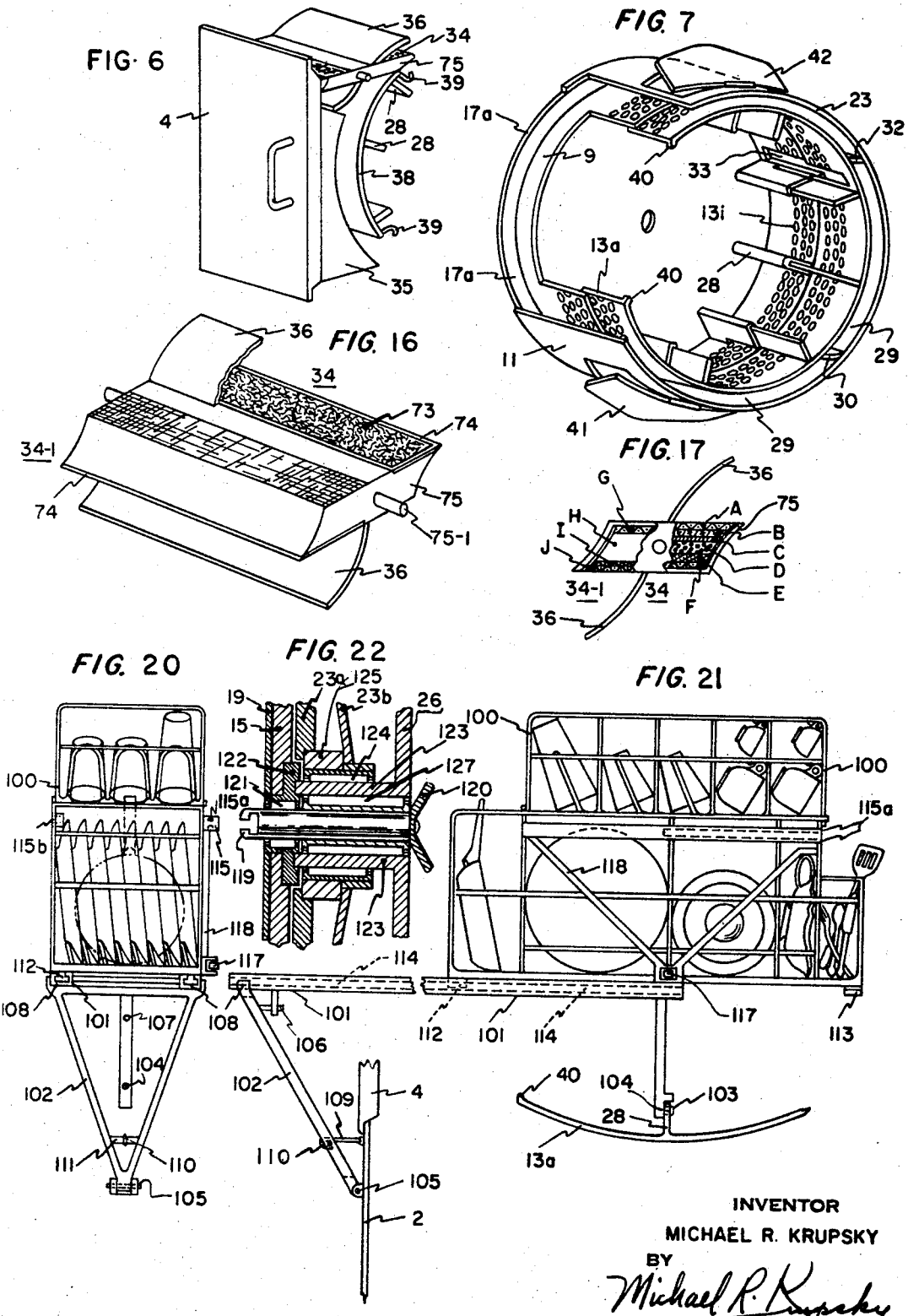

Sept. 24, 1968    M. R. KRUPSKY    3,402,576
COMBINATION CLOTHES WASHER, DRYER, DISHWASHER, DRYCLEANER, AND
GARMENT APPEARANCE-FINISHING MACHINE
Filed Feb. 28, 1966    11 Sheets-Sheet 6
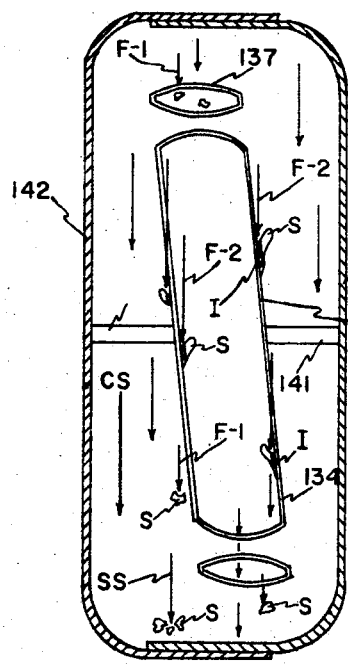
FIG. 32
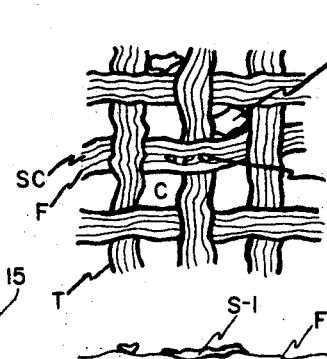
FIG. 28
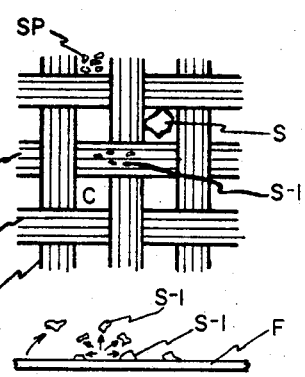
FIG. 29
FIG. 30    FIG. 31
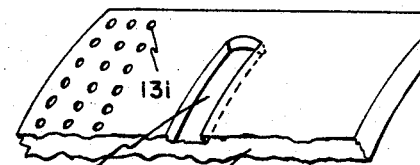
FIG. 19
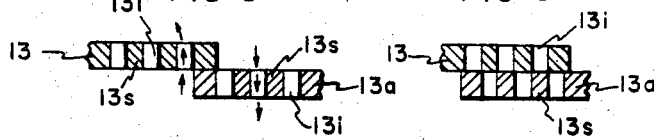
FIG. 9    FIG. 8
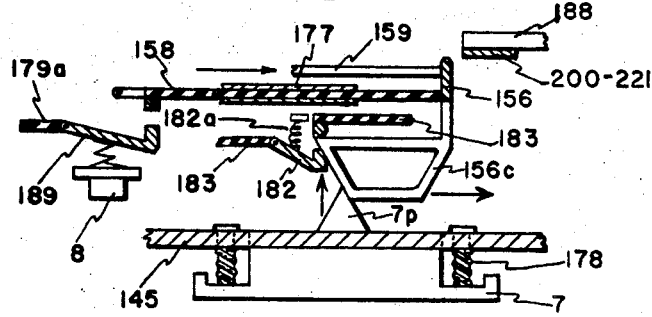
FIG. 42
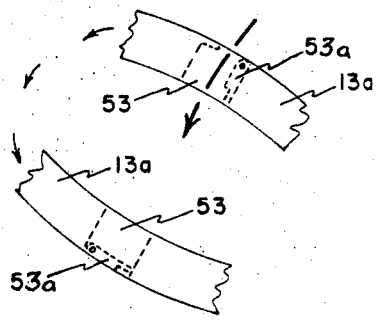
FIG. 10
FIG. 11
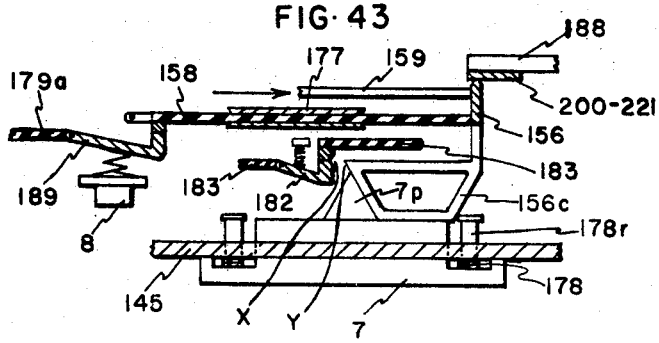
FIG. 43
INVENTOR
MICHAEL R. KRUPSKY
BY
Michael R. Krupsky Sept. 24, 1968 M. R. KRUPSKY 3,402,576
COMBINATION CLOTHES WASHER, DRYER, DISHWASHER, DRYCLEANER, AND
GARMENT APPEARANCE-FINISHING MACHINE
Filed Feb. 28, 1966 11 Sheets-Sheet 7

INVENTOR
MICHAEL R. KRUPSKY
BY
*Michael R. Krupsky*

Sept. 24, 1968     M. R. KRUPSKY     3,402,576
COMBINATION CLOTHES WASHER, DRYER, DISHWASHER, DRYCLEANER, AND
GARMENT APPEARANCE-FINISHING MACHINE
Filed Feb. 28, 1966     11 Sheets-Sheet 8
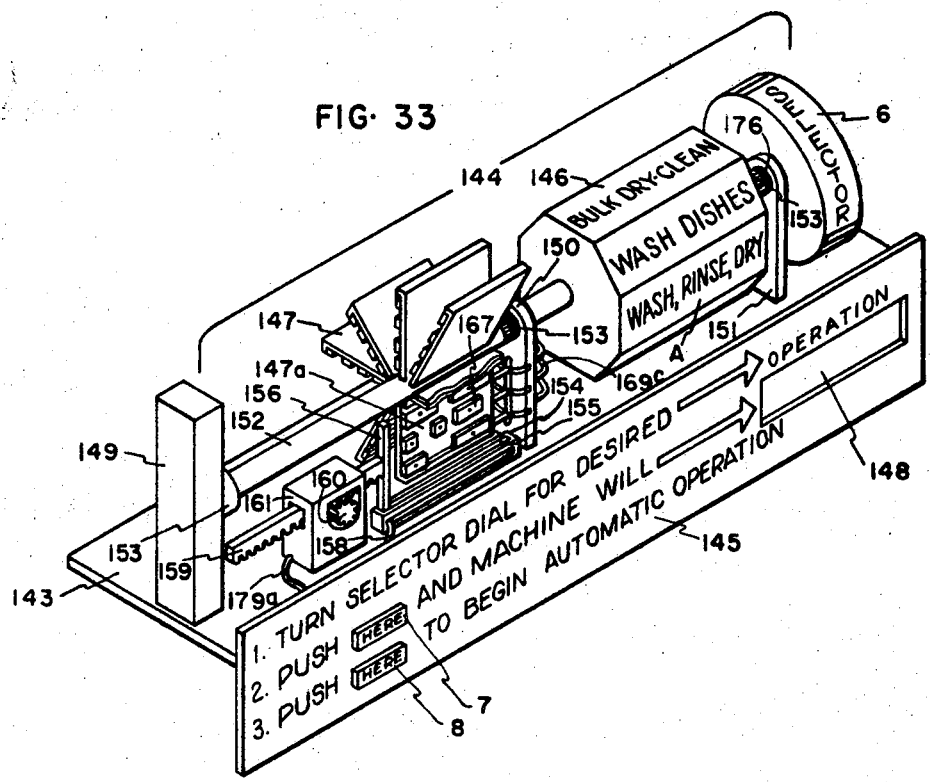
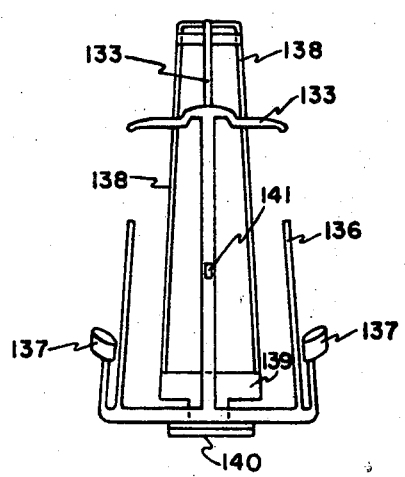 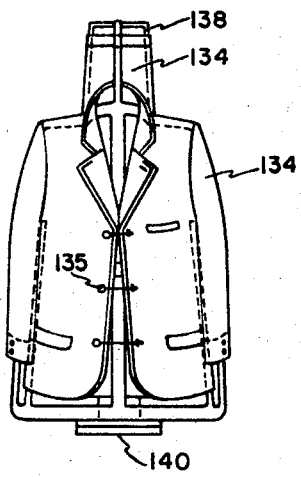 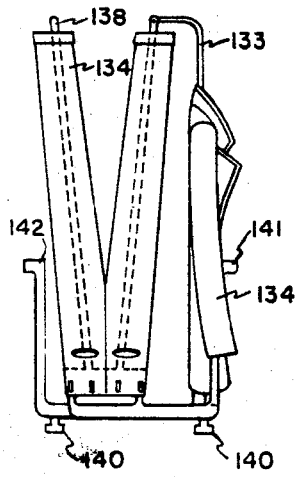
INVENTOR
MICHAEL R. KRUPSKY
BY
*Michael R. Krupsky*

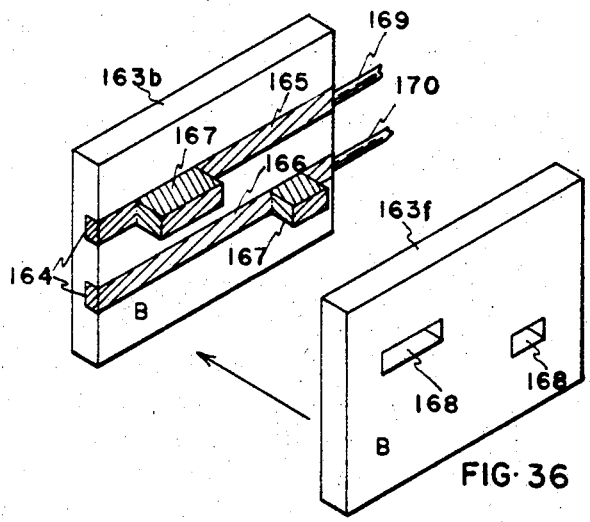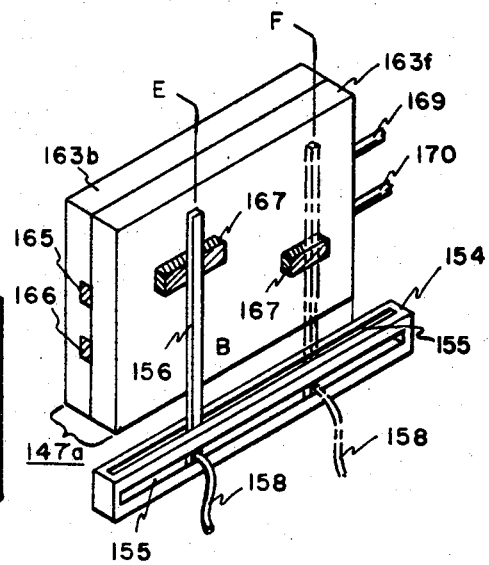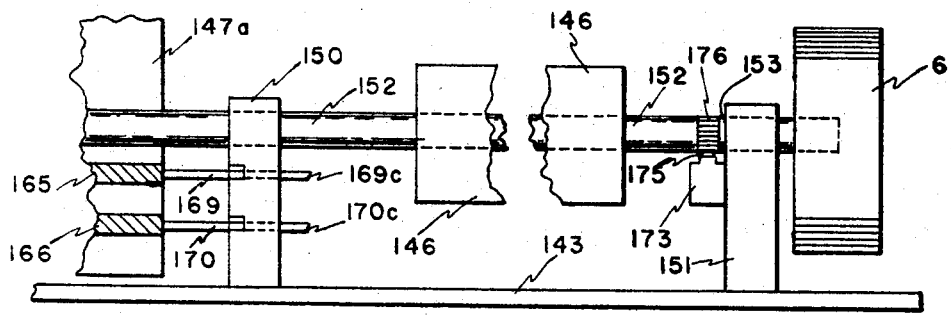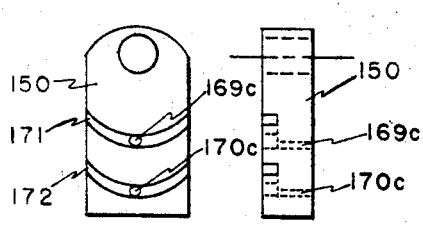

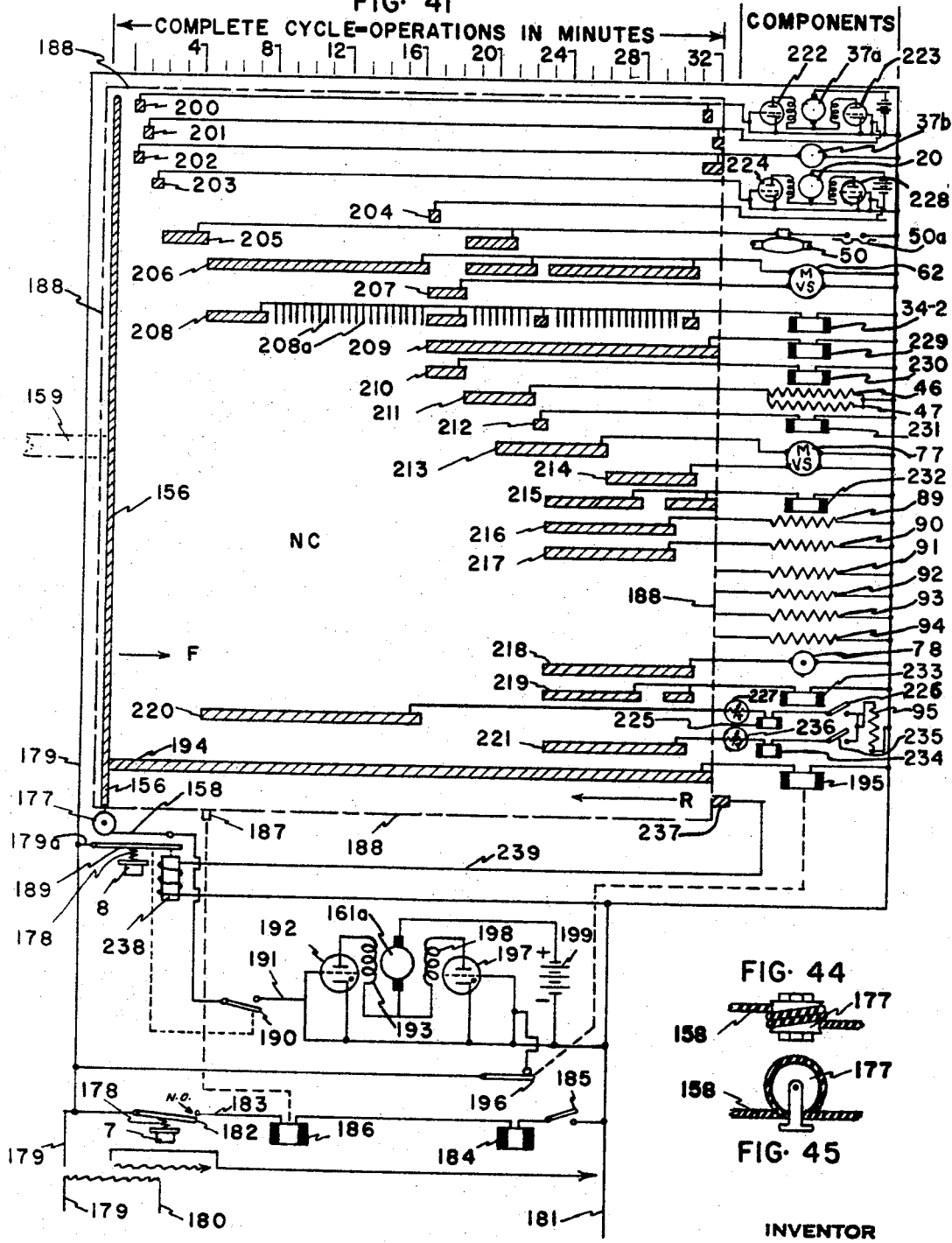

Sept. 24, 1968  M. R. KRUPSKY  3,402,576
COMBINATION CLOTHES WASHER, DRYER, DISHWASHER, DRYCLEANER, AND
GARMENT APPEARANCE-FINISHING MACHINE
Filed Feb. 28, 1966  11 Sheets-Sheet 11
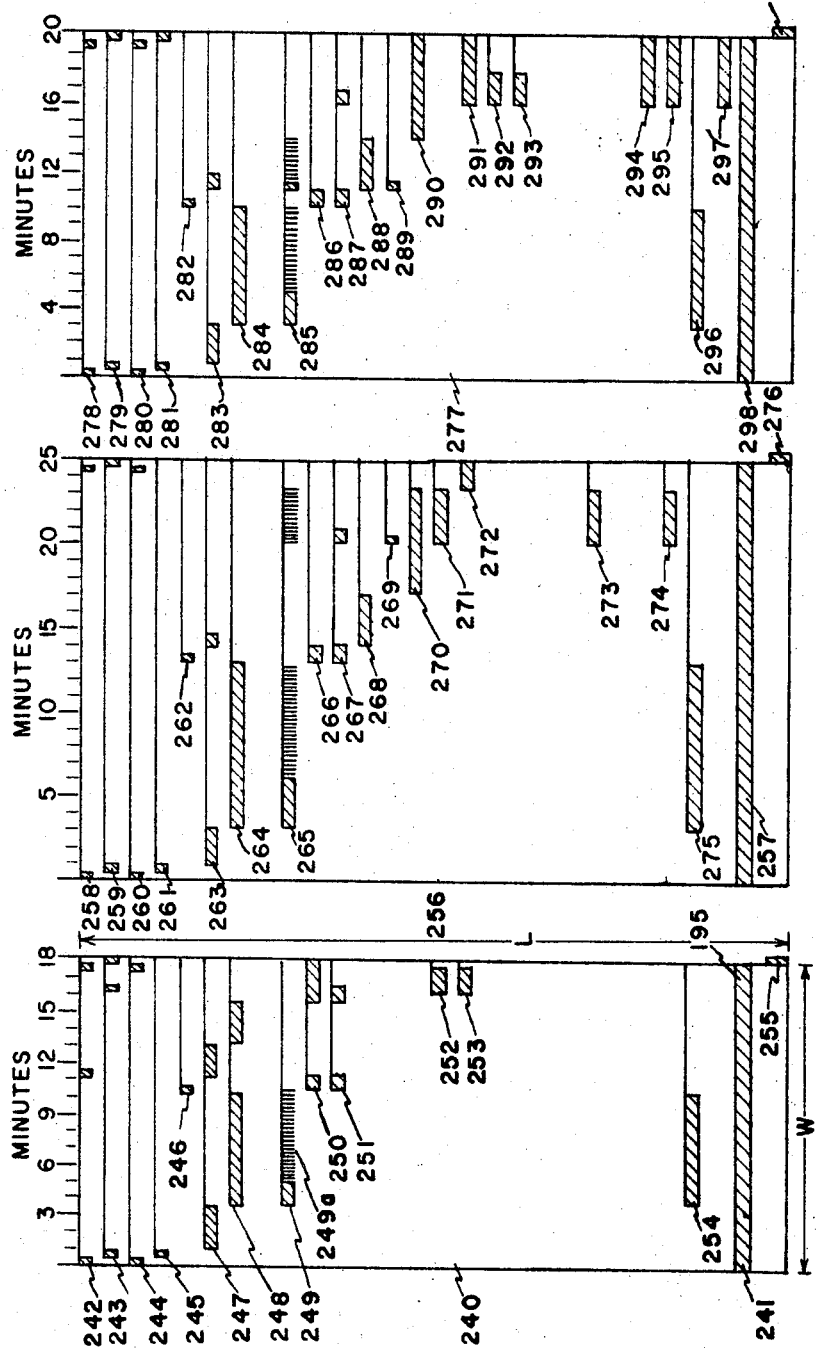
INVENTOR
MICHAEL R. KRUPSKY
BY
Michael R. Krupsky

United States Patent Office 3,402,576
Patented Sept. 24, 1968

3,402,576
COMBINATION CLOTHES WASHER, DRYER, DISH-WASHER, DRYCLEANER, AND GARMENT APPEARANCE-FINISHING MACHINE
Michael R. Krupsky, 10 Washington St.,
East Orange, N.J. 07017
Filed Feb. 28, 1966, Ser. No. 530,695
31 Claims. (Cl. 68—4)

ABSTRACT OF THE DISCLOSURE

A clothes and dish cleaning and garment appearance-finishing apparatus having a rotatable container with apertures, baffles, and filtering devices positioned and connected thereon to form, in cooperation with a stationary chamber surrounding the rotatable container, a separate enclosure to carry and alternately transfer soiled solution and/or air from the rotatable container to the separate enclosure in order to regenerate the soiled solution and/or air prior to the solution and/or air being transferred back into the rotatable container. Also a mechanically adjustable garment support apparatus and a dish holder device both having nonrotatable catch mechanisms connectable to nonrotatable mechanisms fixed to a rotatable container and a stationary chamber to rigidly fix the garment support apparatus and/or a dish holder device in free space inside the rotatable container while the garments or dishes are cleaned and/or appearance finished with solutions, steam, and heated dry air.

---

This invention relates to improvements in apparatus for, and new methods for, clothes laundering, drying, drycleaning, and appearance-finishing machines, as well as dishwashing devices. More particularly it encompasses an improved construction for a universally adaptable combination machine and processes for clothes cleaning and finishing and also dishwashing.

For maximum utility and saleability, a universal machine relates to automatic washers, and more particularly to manufacture, and function equal to, or superior to, existing single or combination machines.

The clothes washer embodiment of this universal machine relates ot automatic washers, and more particularly to filtering out contaminants from the washing solution during the washing and rinsing cycles for more effective cleansing of clothes. In conventional clothes washers a combination of water, soaps, detergents, agitation, and heat accomplish the removal of soils from clothing. The additional function of these elements is to maintain in liquid suspension the soils after their removal from the clothes being washed. Clothes washers currently in use make no further provision for the prevention of the re-deposition of these solid and suspended soils back into and onto the fabric of the clothes during the washing and rinsing operations. Hence, costlier and more chemically complex soaps and detergents are required. Moreover, with conventional methods a longer (but less effective) washing and rinsing cycle is required than by the method herein disclosed. By means of the unique construction of this machine the solid and suspended soils are continuously filtered and eliminated from the contaminated solution; the solution is repeatedly regenerated and then reintroduced for further cleansing action during the washing and rinsing cycle. This method accomplishes (1) a more effective laundering of the clothes, (2) a shorter washing and rinsing cycle, and (3) a substantial saving of water.

An additional improvement which this machine possesses over conventional washers is its ability to maintain and control constant water temperature by means of directly adding heat to the wash water during the washing and rinsing operation whenever said supplemental heat is desirable or necessary.

The clothes dryer embodiment of this universal machine relates to the conventional tumbling type of clothes dryers, and more particularly to the elimination, collection, and removal of lint during and after a drying operation. In conventional dryers lint elimination, collection, and removal systems consist of air-flow water traps, condensing chambers, water sprays, air current scrubbing, and flushing with water. The system herein disclosed utilizes none of the conventional methods stated, rather it provides a unique air recirculating and filtering system for the collection, elimination, and removal of lint.

In conventional dryers centrifuging and circulation of hot air alone is used to dry clothes and remove lint therefrom. However, in this invention steam may be introduced during the drying operation as a separate cycle within the overall drying operation thereby accomplishing superior lint removal and better drying and clothes conditioning. In all drying systems a progressive accumulation of lint and residues is deposited on the interior surfaces of the drying chambers. By means of the continuous filtration and recirculation of the solution and air in this invention the progressive accumulation of lint and residue deposits on any section of the machine is negligible. As an additional means of preventing this accumulation during a drying operation, steam may be force-blown and circulated in, about, and around the container. However, this introduction of steam for removal of deposits on the various sections of the machine during the drying cycle is of secondary importance. The primary object of introducing steam into the drying operation serves more important functions, to wit.

The dry and hot air which is introduced into the drying chamber of conventional dryers tends to produce static electrical charges on the clothes. These static charges tend to cause lint and residual soaps and detergents to adhere to the material of the clothes. When steam is introduced, static electrical charges are largely eliminated, and adherence of lint and residues on the clothes is negligible. Further, the steam vapor, owing to its density, has the ability to pick up and hold in suspension fine lint and residues. Redeposition of the lint and residues is obviated by the re-circulating system of this machine and means are also provided for the expulsion of the lint contaminated steam vapors to the atmosphere.

A further advantage of using steam in addition to using dry, hot air during the drying cycle is that a much more effective heat transfer between steam and the clothes is achieved than by using hot air exclusively. Owing to this improved heat transfer a conditioning, namely, tempering and decatizing of the clothes is possible. Moreover, after an initial and brief hot-air drying cycle, the improved heat transfer provided by a steaming cycle further removes residual contaminants.

It is established that by utilizing steam, prior to the ironing of clothes, the clothes are in a more receptive condition to be ironed. Steam supplies, due to its deep penetration, a means for retention and increase of the natural moisture which is normally associated with the fibres of clothes.

A cooling cycle at the end of the hot-air-steam-hot-air cycle has proved to be beneficial in this invention. The means provided by this invention for force blowing and circulating cool air into the clothes chamber not only cools the clothes and chamber but also fluffs the nap and sets the fibres of the clothes so that their overall hand, drape, nap, resilience and resistance to wrinkling is augmented and improved.

An additional improvement over conventional dryers that this machine possesses is its ability to supply a greater range of drying temperatures, better heat control, and more effective maintenance of constant heat during a drying operation. In conventional systems, once a predetermined temperature has been selected for the drying cycle, there is little or no means by which to maintain this predetermined heat over the entire cycle. The salient reason for this deficiency apparently is the high cost attributable to maintaining such a system of heat supply and temperature control. The novel construction of this machine and its unique sequence control system, herein to be described, not only accomplishes a wide spectrum of temperature selections economically but also assures constant maintenance of a predetermined temperature.

The dishwasher embodiment of this machine relates to the solution-agitating type of dishwashers, and more particularly to the complete elimination of prior hand-scraping and hand-rinsing of dishes before their introduction into a dishwasher. It also relates to the drying and elimination of contaminants and steam vapor inherent in the dishwashing operation.

In the dishwashing art it is generally necessary to hand-rinse the dishes and utensils prior to placing them in an automatic, conventional dishwasher. This initial and pre-requisite rinsing of the dishes, prior to placing the dishes in the conventional automatic dishwashers, is required because the particles of food and soils attached to the dishes and utensils would quickly and thoroughly contaminate the water, and block up the component water spray means and food traps provided in the washer. This invention entirely eliminates prior hand-scraping and hand-rinsing of the dishes and utensils. It also eliminates water spraying means within the machine and contamination of the interior of the machine and washing solution.

Another problem encountered in the dishwashing art is the elimination of steam vapor from the dishwashing chamber. Conventional dishwashers generally require that either a door or port be opened to allow the escape of steam vapor to the atmosphere after the dishwashing operation. Other types require special air flow paths to condense and eliminate the steam vapor. The novel construction of this invention and its recirculation, filtration and exhaust system precludes the opening of a door for steam elimination. It also excludes special condensation air flow paths to accomplish the removal of steam vapor after dishwashing.

The drycleaner embodiment of this invention relates to solvent and vapor dry cleaning, and more particularly to a method of creating a positively directed motion of solvent through and about the fibres and capillaries of the material of a garment which has been stretched to a wrinkle-free state on a garment supporting device.

The common method of cleaning soiled clothes usually involves the agitation of clothes within a solvent capable of removing the soils contaminating the garments. This conventional method limits the penetration of the solvent by the extent of diffusion or seepage. Such treatment is not completely thorough and often requires an extensive amount of time. In many instances an appreciable part of the liquid containing the impurity is also left in the fibres and capillaries and on the surface of the garments. When the solvent evaporates it leaves behind the soils and impurities. Agitation and/or mixing of a single or only a few garments within a fluid invariably is inconvenient in conventional drycleaners. However, this invention provides a convenient and economical means to dry clean a single or only a few garments.

In this invention the method utilized for creating the positively directed motion of a solvent through and about the fibres and capillaries of a stretched garment, more effectively removes soils which adhere to the fabric material of the garment. The driving force of the solvent and the direction of solvent flow over the entire garment rapidly causes removal of soils by reason of solution and velocity. By capillaries is meant the interstices or spaces between parts of the material such as pores, tubular openings, and fissures. Additionally, the passing or flow of a cleaning fluid is made positive by directed fluid pressure. The direction of the flow of the fluid is generally and preferably into the surface opposite that of the direction of the weave of the fabric. The directed flow of solvents provided by the method of this invention prevents further impregnation of noncontaminated portions of the material by the soils. It similarly prevents suspended substances or colloids of soils from being rubbed or otherwise forced and attracted back unto and into the fabric and capillaries of the garment as is the case with conventional methods.

As previously described for the dryer embodiment of this invention the additional cycle of passing steam vapor over and through the garment during a drycleaning operation reduces static electrical charges, which causes lint and residual soil retention to be almost negligible. The steaming cycle also increases the moisture content of the goods so that additional hot air pressing of the garment after drycleaning is facilitated.

A type of vapor dry cleaning, as contrasted to fluid-cleaning, which utilizes a garment stretching device and the unique design and construction of the processing chamber of this invention, may be effected. Air being force blown into the chamber may be saturated with a cleaning solvent in vapor form and passed in and about the garment to effect the cleaning. This vapor method eliminates the need for liquid solvents and the reclamation of said solvents, since the vapor solvent may be an inexpensive one, such as Stoddard's solvent. The Stoddard's solvent may be subsequently expelled into the atmosphere.

Another advantage of the stretching and vapor cleaning method, which may be provided herein, is the elimination of excessive pounding or rubbing of the fabrics that occurs during tumbling or agitation. Also, the abrasion resulting from agitation in conventional tumbling methods tends to negate the natural finish of the fabric and causes unnecessary deterioration of the garment.

The method of dry cleaning utilized in this invention is superior to conventional agitating or tumbling methods of drycleaning. The same principles of recirculating, filtering, and continually reintroducing regenerated dry cleaning solvents during the cleaning cycle, which method was outlined in the clothes washer embodiment of this application, also applies in the drycleaner modification of this invention. It may also be recalled that after the washing and rinsing cycle of the clothes washing operation steam was passed over the garments in order to eliminate lint and contaminants and also to condition the garments prior to the hot air and cool air drying cycles.

This invention also relates to the ironing and appearance-finishing arts, and more particularly to improved ironing and finishing methods of the character disclosed in Letters Patent No. 3,292,829 of Michael R. Krupsky and Harry A. Tompkins, filed April 28, 1964, and patented Dec. 20, 1966, and application Ser. No. 502,991, filed Oct. 23, 1965. This invention also utilizes a method of finishing garments without the use of bucks, plates, presser heads, etc., as described in the aforementioned applications.

However, the particular advantage that the ironer embodiment of this invention possesses over the applications cited above is that a garment may be washed or cleaned by agitating solutions or solvents about it while it is on the garment supporting device and suspended in a stationary position in the tumbling drum of this machine. This invention has the collateral advantage of being able to create a more intensive steam application cycle than the preceding inventions, if an extensive steaming cycle be so desired.

Lastly, this invention relates to control switch assemblies and/or sequence control assemblies used generally, though not exclusively, in domestic appliances. More particularly it relates to sequence control assemblies which utilize switches of the armature and contact type and of conventional sequence control assemblies wherein a number of cams or a relay is used to control related armature switches.

In convention sequence control sytsems an armature generally is closed and/or opened upon a contact by the rotation of a timer and corresponding cams connected electrically to relays. The use of conventional control systems consumes valuable space and requires many comparatively expensive moving parts; for example, the armature attached on a hinge or swivel, various springs, and retainers, contact supports, banks of supported cams, and various cam rotating means. All and each of the preceding parts, except the cams which may be replaced by relays, is and are used in conventional systems. However, the sequence control assembly of this invention, requires but one timer with a gear rack, and but one moving bus bar which makes contact with a plurality of conducting bands secured within a housing. In addition to eliminating cams, and/or relays, the conducting bands also eliminate the need need for armature switches and assemblies.

The advantages of the sequence control assembly used in this invention are demonstrated by a significant reduction of moving and costly parts. Other advantages are the greater variety of diversified cycles or operations that can be performed, higher reliability, easier maintenance, and the utilization of substantially less space than provided for by conventional sequence control assemblies.

There are also used in some conventional systems control switch assemblies which utilize reed members of magnetic material, which in turn are secured within a housing whereby the reed members are engageable with a plurality of electrical contact means. However, these assemblies, although having some advantageous features over some existing switch control types, still require more parts (such as reeds, magnetic materials, wafer type magnets, sealed encasements, etc.), and costlier fabrication than the sequence control system herein described.

It is therefore the general object of the present invention to provide a combination clothes washer, dryer, dishwasher, drycleaner, and ironer and appearance-finishing machine, wherein a single unit can perform all and each of the above mentioned operations; in addition to providing unique features which the conventional individual and/or combned machines just cited do not possess or cannot provide.

The clothes washer embodiment of this combination machine distinguishes itself from other clothes washers by the objects now herein stated.

It is an object of this invention to provide a clothes washer that possesses a recirculating and filtering system wherein the filtering and regeneration of contaminated washing, rinsing, and cleaning solutions occurs simultaneously with the washing and cleansing of clothes in order that redeposition of loosened and suspended soils on the clothes being washed is substantially eliminated. As a consequence thereof the cleansing action of the combined elements of water, soaps, solvents, detergents, agitation, and heat is improved and intensified, thus, causing a briefer and more effective and efficient washing operation which, in turn, results in superior clothes washing.

It is another object of this invention to provide a clothes washer that possesses a recirculating and filtering system wherein the various cleansing cycles are appreciably shortened by the water being filtered and reintroduced continuously during the washing operation.

It is yet a further object of this invention to provide a clothes washer that possesses a means for the automatic selection of a wide range of temperatures and wherein the temperature of the washing solution is kept constant by heating elements uniquely positioned in the recirculating system for automatically supplying additional intermittent heat, if so required, to the solution during the washing operation.

It is a further object of this invention to provide a clothes washer that possesses a recirculating and filtering system wherein the washing and rinsing cycles are affected by the same water by reason of the soaps, detergents, soils, lint, and other contaminants having been substantially removed from the wash water at the termination of the washing cycle. As a consequence thereof the wash water is sufficiently clean to act as a rinsing agent during a following rinsing cycle.

It is still a further object of this invention to provide a clothes washer that possesses impellers, ductwork, and a heating system wherein steam can be supplied to the clothes after the rinsing operation. As a consequence thereof the machine affords further removal of residual contaminants and lint from the clothes and the interior of the machine itself. In addition, the machine supplies either a complete automatic dewrinkle cycle or any other conditioning cycles.

The dryer embodiment of this combination machine distinguishes itself from other dryers by the objects now herein stated.

It is an object of this invention to provide a clothes dryer that possesses a rotatable inner drum which is separable into two sections so that an annulus of perforations may be effected for the introduction of dry and vapor hot air into the inner drum. Within said drum a plurality of interior vanes provided means to tumble the clothes and circulate the air in the interior of the drum so as to dry and condition clothes in a superior manner. This result is achieved by an air and lint recirculating and filtering system wherein filtered and cleansed air is continuously reintroduced into the inner drum. Thus, lint and residues are collected and removed from the clothes and the interior of the drum, and then deposited in an accessible and removable filter holder which is fixed upon a door.

It is another object of this invention to provide a clothes dryer that possesses a rotatable inner drum mounted inside a stationary chamber whereby an enclosure of the inner drum may be effected and the stationary chamber cooperating with the inner drum provides an air and lint recirculating system wherein a heating element and heat responsive device are positioned so as to reheat the recirculating air prior to its reintroduction into the inner drum. Consequently, heat lost during the drying cycle may be continuously restored and a constant temperature may be maintained in the inner drum.

It is a further object of this invention to provide a clothes dryer that possesses a water inlet cooperating with and in connection with a ductwork wherein heaters may be provided so as to create steam from the water introduced. As a consequence thereof a means is provided for an impeller to be positioned in said ductwork wherein said impeller blows steam into the interior of a perforated rotatable drum for the purpose of eliminating static electrical charges and the lint which adheres to the garments because of those electrical charges.

It is yet a further object of this invention to provide a clothes dryer that possesses an impeller functioning in cooperation with a ductwork wherein ambient air intake and discharge is effected into the interior of a perforated rotatable drum. Said drum having a plurality of interior vanes which tumble clothes and circulate a stream of ambient air. Thus, the clothes are cooled prior to their removal from the dryer.

The dishwasher embodiment of this combination machine distinguishes itself from other dishwashers by the objects now herein stated.

It is an object of this invention to provide a dishwasher that possesses a separable rotatable drum and removable drum section which provide means to introduce and enclose a dish and utensil rack wherein said rack remains fixed within said drum. The said drum being capable of rotating and causing detergent solution to agitate, splash, rub, and more effectively wash and rinse the enclosed dishes and utensils without using conventional water spraying means. The said solution being continuously tered, regenerated, and reintroduced in the rotatable drum throughout the operation to prevent redeposition of suspended soils on said dishes.

It is another object of this invention to provide a dishwasher that possesses a recirculating and filtering system wherein the recirculating system can accommodate a contaminated solution containing large or minute particles of food without subsequent accumulation and clogging within the system. Thereafter the system provides for the passage of the soils to a filtering means for filtration, regeneration and reintroduction of cleansed solution into the rotatable washing drum. As a consequence thereof, the need for hand-scraping or hand-rinsing of the dishes and utensils prior to being placed into the dishwasher is completely eliminated.

It is a further object of this invention to provide a dishwasher that possesses impellers, ductwork, heaters, separable perforated rotatable tub with a plurality of vanes therein, and a drying system which directs a flow of hot air about the dishes and utensils so as to dry them, and which subsequent thereto removes and directs the residual contaminants and steam vapor to a recirculation passage for collection and devaporization in a filter. Subsequent thereto, said impeller blows in ambient air so as to expel into the atmosphere the dry hot air and, as a result, ambient air alone is then allowed to circulate about and cool the dishes prior to their removaal from the dishwasher.

The drycleaner embodiment of this combination machine distinguishes itself from other drycleaners by the objects now herein stated.

It is an object of this invention to provide a drycleaning machine that possesses a separable rotatable inner drum and a means for introducing cleaning solvent into said drum wherein the rotatable drum and a plurality of vanes provides means to tumble the clothes and to agitate the cleaning solvent to clean the clothes, and wherein a recirculating and filtering system regenerates soiled solvent and then reintroduces the resultant clean solvent into the drum. As a consequence thereof redeposition of suspended soils is prevented. Thus, a briefer and superior method of drycleaning clothes is effected.

It is another object of this invention to provide a drycleaning machine that possesses the said recirculating system as well as possessing an impeller, a ductwork capable of holding water, and heaters for vaporization of water so as to enable the impeller to blow steam into the inner drum to circulate therein. As a consequence thereof the clothes may be further conditioned by steam and an additional removal of residual solvent and lint may be effected.

It is a further object of this invention to provide a drycleaning machine that possesses impellers, ductwork, and separable perforated rotatable drum in order that ambient air may be introduced into the rotatable drum for the expulsion of steam and dry hot air into the atmosphere so that the clothes therein may be cooled prior to their removal.

It is yet a further object of this invention to provide a drycleaning machine that possesses an exterior door, a separable rotatable drum, and a drum opening means which will allow the introduction and placement of a garment supporting device inside the drum. Said supporting device providing a means to dispose a garment thereon, and said supporting device provided with a means by which said device and garment can be affixed in a stationary and/or fixed position within said drum. The inner drum also possessing an attaching device connected to the drum wherein the attaching device is fixed and non-rotatable within said drum, even though the drum itself may be rotating. Thus, the drum and interior vanes are caused to circulate and provide for a positively directed motion of the cleaning solvent through the capillaries of the fabric of the garment. As a consequence thereof, said garment is drycleaned far faster and far more effectively and efficiently than with conventional drycleaning methods.

It is still a further object of this invention to provide a drycleaning machine that possesses said separable rotatable drum, an exterior door, drum opening means, garment supporting apparatus, and stationary fixing-device wherein impellers, ductwork, and heaters functioning in conjunction with one another provide means for the vaporization and the introduction of steam into said drum so as not only to condition and clean said garment, but also to provide means to remove lint and residual contaminants from the garment.

It is yet another object of this invention to provide a drycleaning machine that possesses said drum, impellers, ductwork, and heaters for the introduction of steam, dry hot air, and ambient air each in proper sequence, in order to condition, iron, and appearance-finish completely and automatically the cleansed garments which have been processed therein.

The ironer embodiment of this combination machine distinguishes itself from other ironers and appearance-finishing machines by the objects now herein stated.

It is an object of this invention to provide a clothes conditioner, ironer, and appearance-finishing machine wherein a garment supporting device that has a stretched garment placed upon it can be inserted into a curved chamber and affixed in a stationary manner therein in order that dry heated air, steam heated air and ambient air, each in proper sequence, may be circulated in and about the fibres and capillaries of the garment thereby completely conditioning, drying, ironing, and appearance-finishing said garment.

The sequence control assembly of this combination machine distinguishes itself from other sequence control assemblies generally used in washers, dryers, drycleaners, ironers, and other nonrelated machines by the objects now herein stated.

It is an object of this invention to provide a novel and improved sequence control assembly that utilizes a single timer motor and gear assembly to provide the means for driving a movable electrical conductance "bus" bar in a horizontally straight line. Said "bus" bar is capable of conducting electricity to a plurality of conducting bands which are positioned on a single sequence control card. When said individual conducting bands are energized, they provide the means for energizing separate and correspondingly individually connected components of the machine in order that the diversified cycles of operations, as provided for by the combination machine, may be performed. When said individual conducting bands are de-energized, they provide the means for de-energizing each of the components that are connected to the conducting bands.

It is another object of this invention to provide a sequence control assembly which creates a novel relationship between the conducting "bus" bar and a sequence card holder. Said sequence card holder has a plurality of individual sequence cards attached thereon. Said assembly provides a unique arrangement for the selection and placement of a separate and individual sequence control card which affords a separate and distinct operation within the combination machine of this invention.

In carrying out my invention in one form thereof, there is provided a clothes washer that possesses two clothes containers with a plurality of inwardly extending interior vanes. This affords the means for tumbling clothes and agitating wash and rinse water. However, this washer unlike conventional clothes and water containers is comprised, for purposes of better illustration, of two horizontally mounted, rotatable drums which are uniquely adapted to receive clothes for washing. The following description is given for only one of the drums, since both of the drums not only function identically, but also are identical in their structure and shape. A drum possesses a cylindrical solid wall section and a cylindrical perforated wall section. A stationary chamber surrounds and encloses the drum and cooperates therewith over the entire circumference of the drum so as to define a recirculating passage therebetween. Each drum has an independent electric motor and pulley sheave assembly so as to provide the means for rotating the inner drum in order that the clothes may be tumbled and the wash water agitated within the drum. An aperture is provided in the circumferential wall of the inner drum and, thus, allows both the introduction and the circulation of a current of water to and from the inner drum to the defined recirculating passage.

The said aperture of the rotatable inner drum extends from one vertical wall to the other. The aperture permits the discharge of part of the washing solution from the interior of the drum into the recirculating passage. Adjacent to the aperture on the exterior side of the inner drum wall, or shell, is attached a rigid baffle which directs, carries, and forces the circulated washing solution through a filter which is positioned in the upper left quadrant of the circular recirculating passage. This filter and recirculation passage arrangement provides the means for the entrapment and filtration of solids and suspended soils from the contaminated solution. In order to allow the directing and solution-carrying baffle to pass by the filter holder, which is attached on the inside of the outer chamber door and which extends horizontally across the recirculating passage, a solenoid is operated automatically so as to lift the filter out of the path of the moving baffle. This involvement affords an opening for the passage of the baffle.

The washing solution "outlet" or aperture is so disposed that as the drum revolves and the baffle passes the filter the aperture performs a second function as an "inlet" for reintroducing regenerated solution back into the interior of the drum. Thus is provided the means for reintroducing the filtered and regenerated solution back into the container. A more intensified washing and rinsing is the result. The proper intermittent positioning, or opening and closing, of the filter holder is controlled automatically by a unique sequence control assembly which is described later in this application. The opening and closing of the filter holder permits a varying intensity of solution filtration during the various washing and rinsing cycles of the machine.

In order to change filters for the purification of different solutions and solvents a motor is connected to the filter holder. The motor provides a means for rotating the filter holder in order that one type of filter may be replaced by another and different type. Prior to initiating any operation of the machine various types of filters may be inserted into the filter holder in order to provide different purifying actions. That is, certain kinds of filters will entrap or block specific types of soils and solids. While one type of filter may entrap solids, another type of filter may entrap suspended soils and micro-solids and yet another filter may separate detergents from the washing solution itself.

An immersible heater and heat responsive device is disposed in the upper right quarter section of the circular recirculating passage. The energization of the heater is automatically controlled by the heat responsive device in order that the novel construction of this invention may be fully utilized for supplying additional, or supplemental, heat for the maintenance of a constant and predetermined water temperature.

In carrying out my invention in another form thereof, there is provided a clothes dryer which has a means to institute a clothes container having an annulus of imperforations about the container for air inlet and air outlet. However, unlike conventional containers the inner drum, or container of this invention, is utilized in a unique manner so as to provide not only a washing container but also a drying container. In order to utilize the drum as a drying container there is provided a motor which operates a gear and gear rack in order to separate the container into two halves. When one half of the drum is caused to move partially away from the other half of the drum by means of the motor and gear mechanism, an annulus of imperforations is achieved. The annulus of imperforations extend completely around and generally in the center of the partially separated or enlarged container thereby providing a means for air inlet and air outlet. The air inlet is effectuated through a solenoid operated inlet flap which is adjacent and affixed to the bottom of the outer chamber. Said inlet flap cooperates with an inlet duct system which has heaters positioned therein so that when ambient air enters the duct system it can be preheated and circulated through the duct system into the container. As a consequence thereof, any moisture in the clothes, which are being dried inside the container, is evaporated. Appropriate conventional means, such as an electric induction-type motor with a speed responsive device or sheave assembly and pulley, may be provided to rotate the drum and to move the air inside the drum.

The temperature of the air entering the container is predetermined and maintained constant by means of heaters, which are positioned in the aforementioned ductwork system and energized automatically by a sequence control assembly.

In addition to providing a means for the introduction of dry hot air into the drum there are also provided, in a duct cooperating with and positioned below the drum, immersible heaters which create steam vapor from water which can be introduced into the duct. The steam resulting from the energization of the heaters if force blown into the interior of the drum by impellers cooperating with the ductwork. The introduction of steam is utilized as a separate cycle so as to provide for the further removal of residual solution, solvent, and lint, as well as providing a moisture restorer and conditioning cycle.

An additional important feature provided by this invention is the lint and moisture filter which may be positioned in the aforesaid recirculating passage. While the dry hot air within the interior of the container is circulating to provide evaporization of moisture from the clothes it collects lint and moisture. The dry hot air subsequently carries the lint and moisture laden air to an aperture from whence it is discharged into the recirculating passage. Once the moisture and lint laden air enters the recirculating passage it is directed and forcibly driven to and through the filter. The contaminated air is cleansed by the filter and is then reintroduced into the container as clean air for more effective drying and further lint removal.

Another valuable and novel function is performed by expelling air into the recirculating passage. More descriptively, the hot air in the interior of the container which, owing to its contact with the clothes, is caused to drop in temperature, is reheated as it passes over the heater that is located in the recirculating passage. Thus, the heater in the passage supplies a fresh quantum of heated air for reintroduction into the interior of the drum. Also housed in the machine are a solenoid-operated exhaust flap, which is attached to the top of the exterior chamber, and an impeller designed to exhaust the dry hot air. Additionally, the impeller also serves as a means to introduce ambient air into the drum to cool and further condition the clothes.

In carrying out my invention in still another form thereof, there is provided a dishwashing machine that eliminates the need for conventional hand-rinsing, hand-scraping and the removal of food particles prior to the insertion of dishes and utensils into the machine for a washing operation. Fixed to a rack which holds the dishes and utensils to be washed are attaching devices. The attaching devices are designed to engage a fixed holder inside the drum. The fixed holder is mounted within a bearing housing that is hung between the vertical walls of the drum. The fixed holder within the drum is designed so as to be nonrotatable when the bearing housing member and the drum are rotating.

Upon the insertion of the dishes into the drum, washing solution is introduced and is caused to be agitated about and around the dishes. The solution which subsequently becomes contaminated with solids, suspended soils, and grease, is expelled into a recirculating passage wherein a baffle attached to the outer wall of the rotating container directs, carries, and forces the contaminated washing solution through a filter. As a result of passing the soiled solution through the filter, contaminants can be filtered out of the soiled solution before being reintroduced as regenerated solution back into the interior of the container. This cleansing action, as previously disclosed in the clothes washer embodiment of this machine, provides a means for the prevention of redeposition of greases, oils, and contaminants back onto the dishes. Collateral thereto a more effective washing of the dishes is achieved by a continuously regenerated washing solution. Owing to the movement of the baffle and the water there can be absolutely no clogging, blocking or collecting of contaminants on the walls of the inner drum or outer chamber. In addition there are no water spray means or food collection pumps in the machine; hence, the elimination of discharge holes, associated with the sprayers and food pumps in conventional washers, precludes contamination and blocking of the system.

Further, the temperature of the dishwashing water is maintained constant by means of a thermostatically controlled heater that is positioned in the recirculating passage. The washing solution inside the drum, which cools as a result of its contact with the dishes, is reheated by the heater in the recirculating system. Thus, a briefer and more efficient washing cycle is achieved.

Means are also provided for the automatic drying of dishes and collection of steam vapors which result from the washing of the dishes. Impellers and an inlet duct with heaters positioned therein, permit heated air to be circulated through the duct and into and around the container and dishes. Hot and contaminated air within the inner container is continuously discharged to the recirculating passage wherein it is forcibly driven through the filter, which effectively collects and condenses all the moisture. Exterior air apertures which are adjacent to the impellers provide means to introduce ambient air into the machine. The impellers then inject the ambient air through their cooperating ducts into the interior of the container for cooling of the dishes and the dishrack.

In carrying out my invention in yet another form thereof there is provided a drycleaning machine which consists of a cylindrical clothes container for agitating and tumbling the solvent and several garments therein. Said machine also initiates a unique method for a continuously recirculating and filtering soiled solvent and for reintroducing regenerated solvent during a normal operation and thereby effects a more thorough and efficient cleaning operation. The principles involved in the recirculating and filtering of the cleaning solvent are substantially the same as have been previously disclosed in the foregoing outline of the clothes and dishwasher part of this invention. The principles involved in the drying, steaming, and conditioning cycles described for the washer and dryer embodiment of this invention also apply to the drycleaner embodiment.

In carrying out my invention in yet another form thereof there is provided an additional drycleaning method which utilizes a garment-supporting device and a single garment disposed thereon for cleaning inside a tumbling clothes-container. Unlike conventional clothes containers the container utilized in this machine has a motor operated gear rack device which provide means for separating the container into two sections and thereby presents an opening for the introduction of a garment supported on a stretching device. Said stretching device and garment are introduced into the container and attached to a nonrotatable mechanism on the inside of the container. The solvent which is agitated in the container is positively directed and forced so as to impregnate thoroughly the fibres of the garment and also to circulate rapidly through the capillaries of the material. Thus, owing to the stretching action of the support, the entire garment is thoroughly exposed to the cleaning action of the solvent.

In carrying out my invention in still another form thereof there is provided an ironer and appearance-finishing machine which has a separable rotatable container wherein a motor-operated gear and rack assembly provide the means for separating partially the rotatable container in order to allow the insertion into the interior of the drum of a garment supporting device and garment stretched thereon. Within said drum preheated air may be introduced into an inlet duct and force blown by an impeller through imperforations into the interior of the container. The garment which is enclosed in the container can thereby be conditioned, dried, and ironed in one operation. The ambient air inlets, the impellers and the vents and ductwork also provide means for the cooling of the garment and supporting device prior to their removal from the container.

Another feature of my invention is provided by means of an air and water inlet and enclosure duct which have heaters positioned therein so that, when the heaters are energized, they create steam vapor which may be driven by an impeller into the container. Thus, further cleansing and conditioning of the garment is achieved.

There are also means provided by the attaching devices on the garment-supporting apparatus and the nonrotatable fixing devices in the interior of the drum for holding the garment and supporting device in a stationary position while the drum is rotated. Hence, water or cleaning solvent may be introduced into the drum and a washing or cleaning cycle may be initiated prior to the ironing and appearance-finishing of the garment. Means are also provided for the performance of a multiplicity of cycles of ironing, drying, conditioning, and appearance-finishing of a garment by the unique sequence control assembly herein disclosed.

In carrying out my combination of inventions in one of its integral parts thereof, there is provided an improved sequence control assembly that utilizes a single timer motor and gear assembly for providing the means to drive a movable electrical conductance "bus" horizontally across a plurality of conducting bands. Said conducting bands provide the means for energizing and de-energizing the various components of the machine which, in turn, effect the washer, dryer, dishwasher, drycleaner, and ironer operations of the machine.

The subject matter which I regard as my invention is particularly cited and distinctly claimed in the concluding portion of this specification. My overall invention both as to organization and method of operation together with further objects and advantages thereof may best be understood by reference to the following description taken in conjunction with the accompanying drawings.

In the drawings,

FIGURE 5 is a side elevational view of the tumbling vanes utilized in the combination machine seen in FIGURE 3 and shows to advantage the construction of the tumbling vanes; the view being partly broken away in order to illustrate details;

FIGURE 6 is an isometric view of one of the doors and the attached filter-holder and drum section opening means as the door and drum section are applied to the drum shown in FIGURE 7; the view being taken from the left and partially from the front in order to illustrate the improved door, filter-holder and drum section arrangement used in the combination machine;

Figure 1:
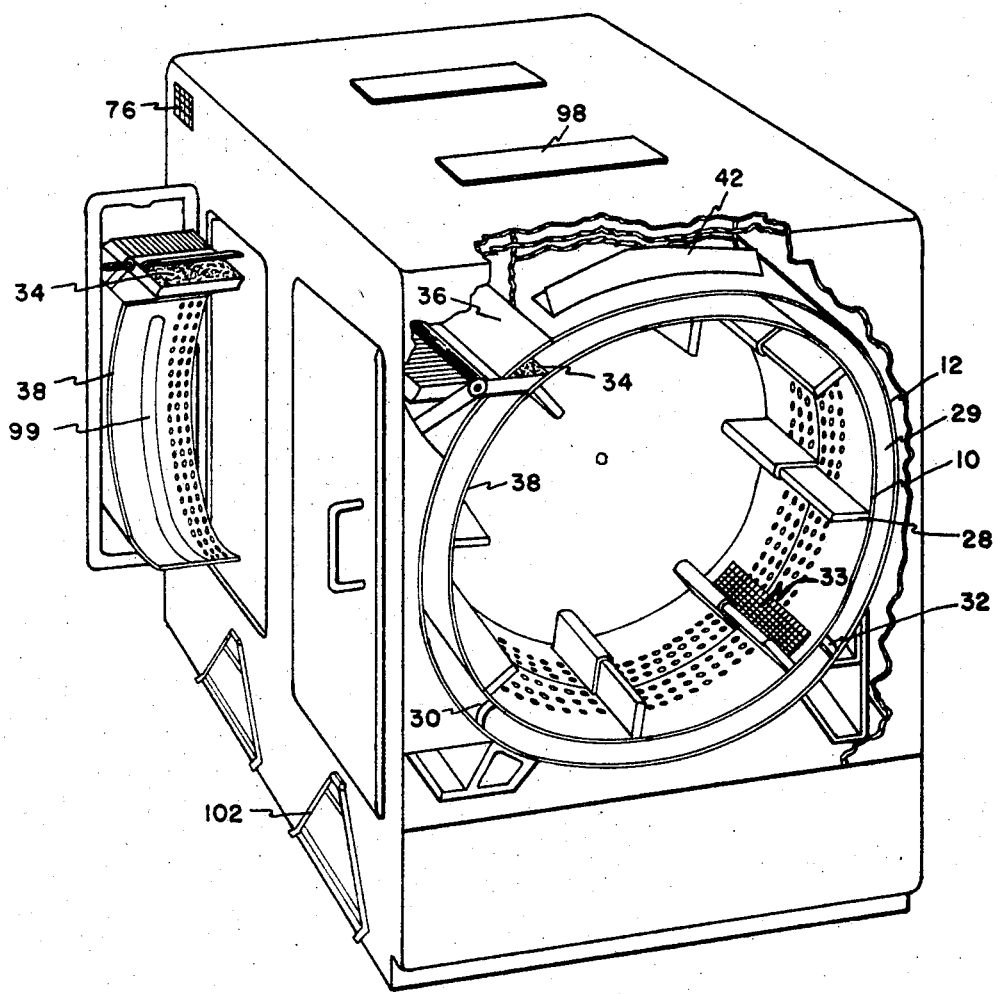
FIGURE 1 is a perspective view of the combination machine of this invention, illustrating a representative form of a combined washer, dryer, dishwasher, drycleaner and appearance-finishing machine, as viewed from the front and partially from the left.
Figure 3:
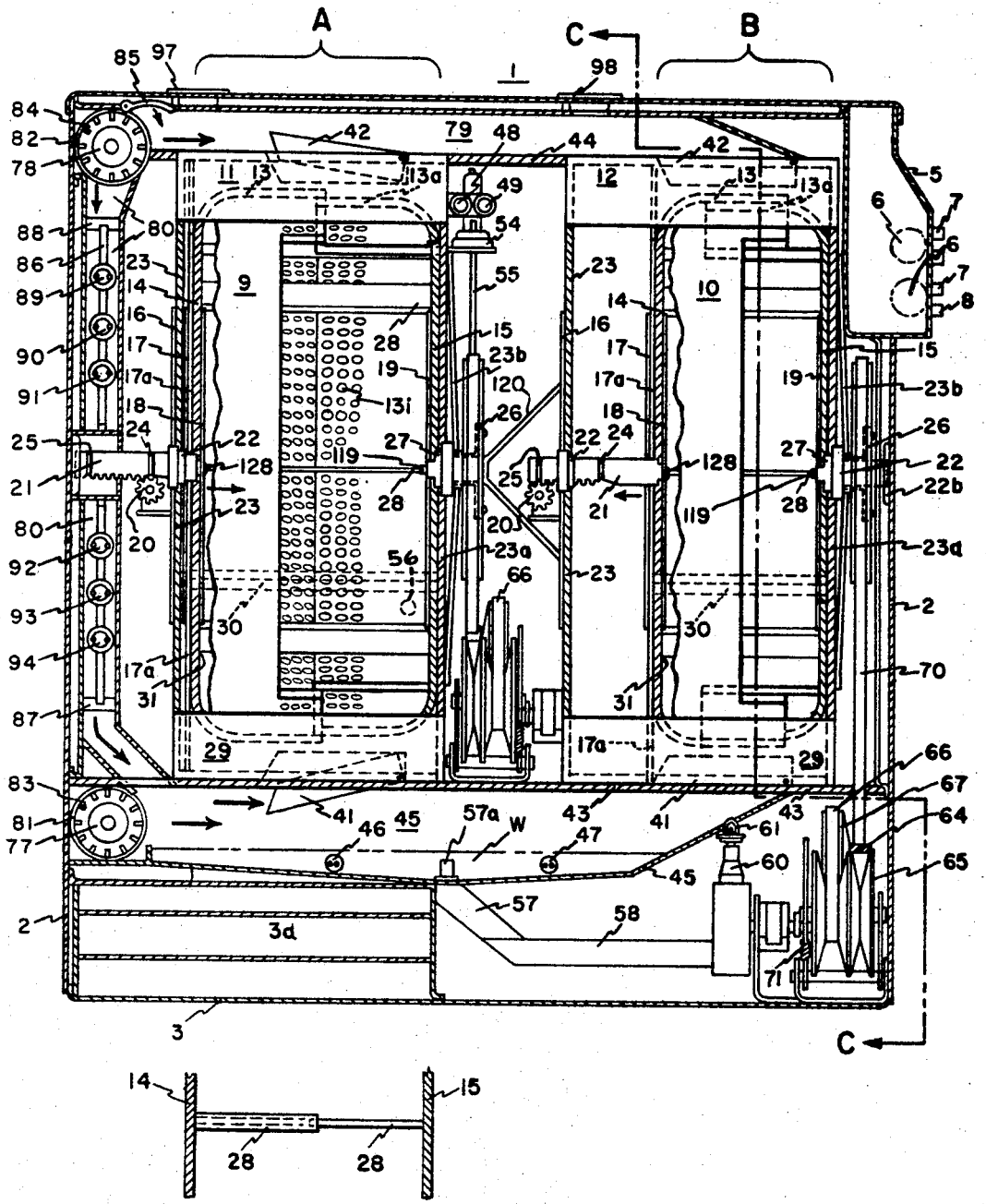
FIGURE 3 is a side elevational view of the combination machine of FIGURE 1, the view being partly broken away and partly sectionalized in order to illustrate details.
Figure 4:
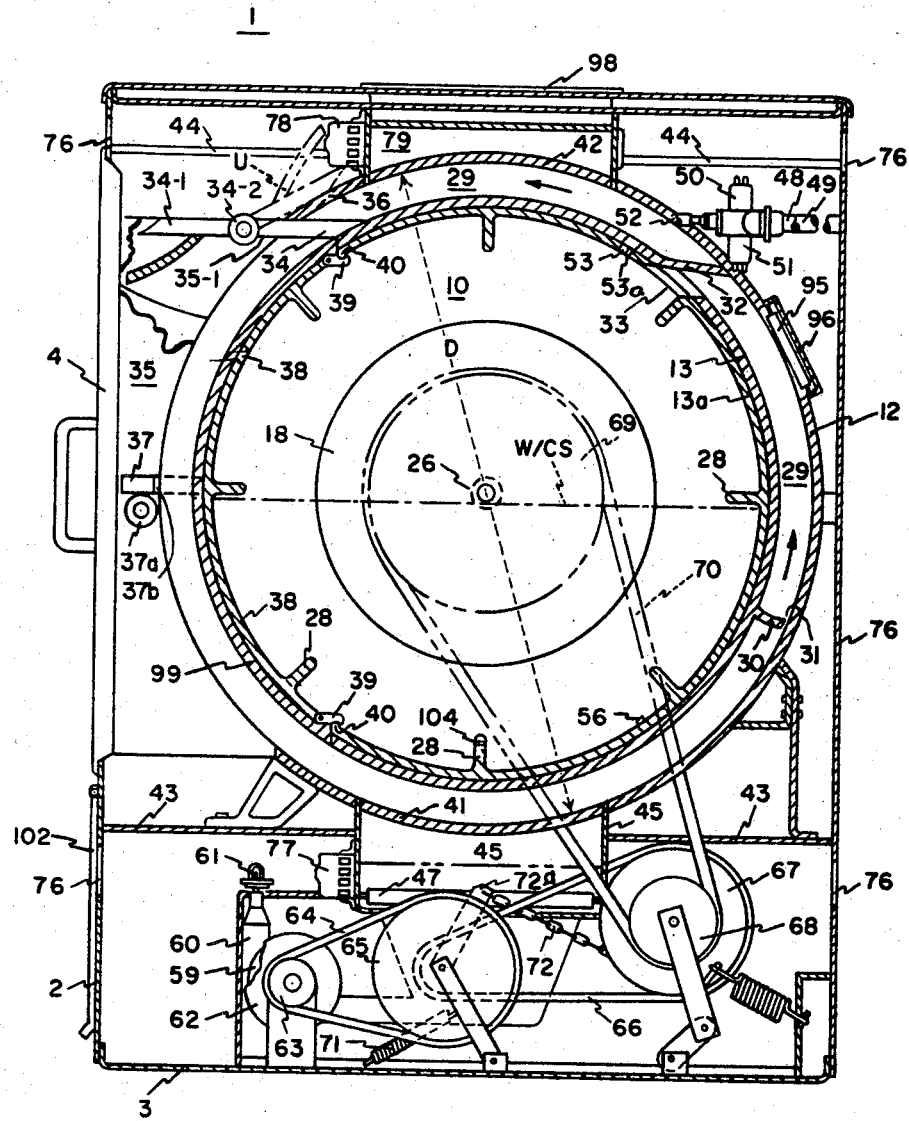
FIGURE 4 is a front view of the combination machine of FIGURES 1, 2 and 3 with the front panel removed and the view being taken along section line C of FIGURE 3.
Figure 12:
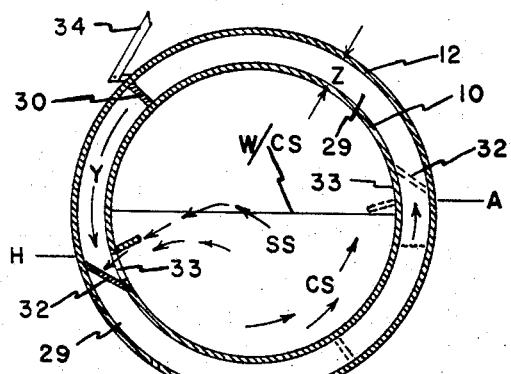
Figure 13:
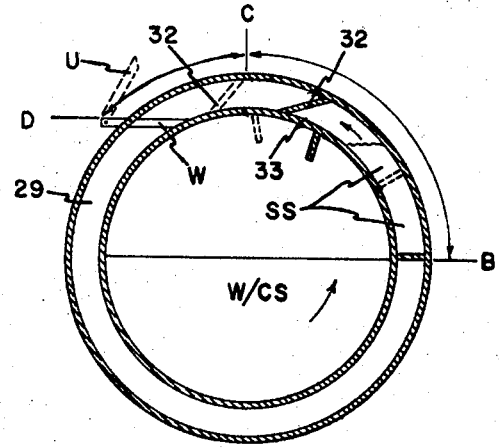
Figure 14:
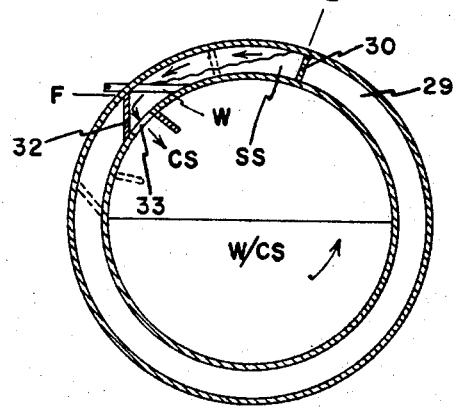
Figure 15:
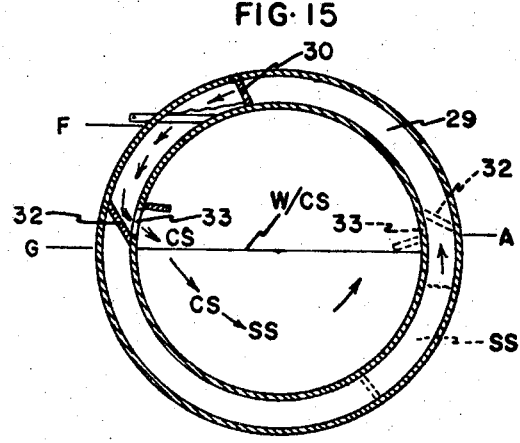
Figure 23:
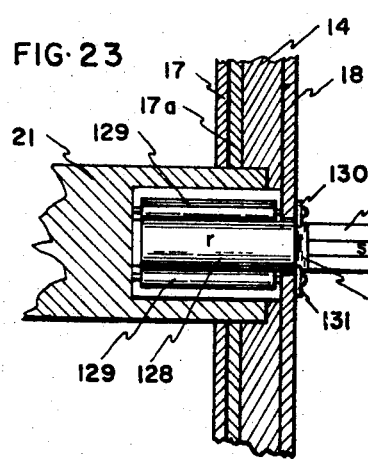
Figure 24:
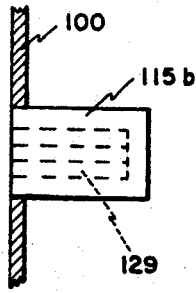
Figure 18:
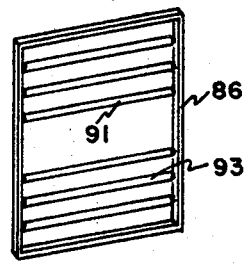

FIGURE 7 is a perspective view of one of the outer chambers and inner drums with the vertical front wall section of the chamber and the vertical front wall section of the drum removed, thereby showing the relationship of the inner drum to the outer chamber in order to illustrate a novel drum opening means and the unique recirculating passage arrangement provided in the combination machine; the view being taken from the front and partially from the left in order to illustrate interior details;

FIGURE 8 is a vertical section of the inner drum walls of machine 1 as seen in FIGURE 3 and shows to advantage the method by which a closed drum is effected to provide a clothes and dishwashing container and also a clothes drycleaning container; the view being partly broken away and sectionalized in order to illustrate details;

FIGURE 9 is a vertical section of the inner drum walls of machine 1 as seen in FIGURES 3 and 8 and demonstrates the method by which an open drum is effected to provide a clothes and dish drying container; the view being partly broken away and sectionalized in order to illustrate details;

FIGURE 10 is a side elevational view of a section of the circumferential wall of the inner drum as seen in FIGURE 4 and shows to advantage the water inlet and the water inlet closing means provided in the drum; the view being partly broken away in order to illustrate details;

FIGURE 11 is a side elevational view of a section of the circumferential wall of the inner drum as seen in FIGURES 4 and 10 and shows to advantage the water inlet in a closed condition; the view being partly broken away in order to illustrate details;

FIGURE 12 is a schematic diagram representing the inner drum and outer drum of the combination machine and illustrating the functional aspects of the recirculating and filtering system of the machine 1 as seen in FIGURE 4;

FIGURE 13 is a schematic diagram still further illustrating the functional aspects and a progressive change in position of the various elements of the recirculating and filtering system of the machine 1 seen in FIGURES 4 and 12;

FIGURE 14 is a side view of a schematic diagram showing further progressive changes in the positions of the elements in FIGURES 13 and 12 in order to illustrate the functional aspects of the recirculating and filtering system of the machine 1 seen in FIGURES 4, 12 and 13;

FIGURE 15 is a schematic diagram showing the progressive changes in the positions of the elements of FIGURES 4, 12, 13 and 14 thereby further illustrating the functional aspects of the recirculating and filtering system of the machine 1 seen in FIGURES 4, 12 13 and 14;

FIGURE 16 is a perspective view of the filter-holder and filter used in the recirculating system to illustrate the novel arrangement provided for alternating and changing filters as used in the combination machine, the view being taken from the upper left and slightly from the front;

FIGURE 17 is a side elevational view of the filter-holder and filtering aids seen in FIGURE 16; the view being partly broken away and partly sectionalized in order to illustrate details;

FIGURE 18 is an isometric view of the main heater element rack;

FIGURE 19 is an isometric view of the drum opening means showing to advantage the slot-like arrangement in the drum section which provides a means to stop a rotating drum as seen in FIGURE 4; the view being partly broken away in order to illustrate details;

FIGURE 20 is a side elevational view of a dish rack incorporating the unique dish rack introduction device and a latching arrangement used in the dishwasher embodiment of the combination machine of FIGURE 1;

FIGURE 21 is a front elevational view of the dish rack and the dish rack introduction device further illustrating the latching arrangement of FIGURE 20; the view being partly broken away and partly sectionalized in order to illustrate details;

FIGURE 22 is a vertical section of the novel fixing devices used in the dishwasher, drycleaner, and ironer embodiments of the combination machine and shows to advantage the nonrotatable shaft, the bearing assembly arrangement, and the drum supporting and rotating mechanism formed in the "front" walls of the inner drum and outer chamber; the view being partly broken away and partly sectionalized in order to illustrate details;

FIGURE 23 is a vertical section of a corresponding opposite counterpart of FIGURE 22 showing the novel fixing device used in the dishwasher, drycleaner, and ironer embodiments of the combination machine. FIGURE 23 shows to advantage the nonrotatable shaft, the bearing assembly arrangement and the drum supporting and rotating mechanism formed in the "rear" walls of the inner drum and outer chamber; the view being partly broken away and partly sectionalized in order to illustrate details;

FIGURE 24 is a side elevational view of the holding device formed on the dishwasher rack of FIGURES 20 and 21 and the drycleaner supporting device of FIGURES 25, 26 and 27; the view of the holder being broken away from said racks illustrating the holders' relationship with the fixing device of FIGURE 23;

FIGURE 25 is a front elevational view of a garment supporting device incorporating the holding device of FIGURES 22 and 23 as it may be applied in the drycleaner and ironer embodiments of the combination machine in FIGURES 1 and more particularly 2.

FIGURE 26 is a front elevational view of the garment supporting device seen in FIGURE 25 with garments positioned thereon as the garment and supporting device may be applied to the drycleaner and ironer embodiments of the combination machine in FIGURES 1 and more particularly 2.

FIGURE 27 is a side elevational view of the garment supporting device and garments seen in FIGURE 26 as the garment and supporting device may be applied to the drycleaner and ironer embodiments of the combination machine in FIGURES 1 and more particularly 2.

Figure 2:
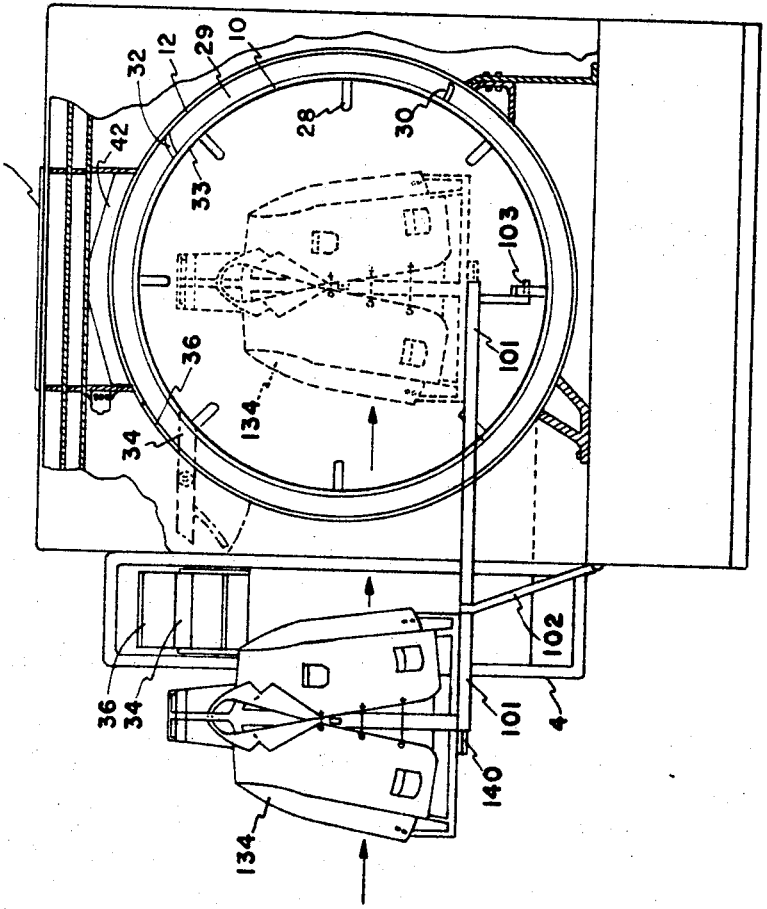
FIGURE 2 is a front view of the drycleaner embodiment of the combination machine of FIGURE 1 showing a supported garment positioned to be placed therein, the view being partly broken away and partly sectionalized in order to illustrate details.

FIGURE 28 is an enlarged section of an "unstretched" piece of fabric with soils attached thereon;

FIGURE 29 is an enlarged section of a "stretched" piece of fabric with soils attached thereon;

FIGURE 30 is a side elevational view of an "unstretched" thread of the piece of fabric seen in FIGURE 28 with soils attached thereon;

FIGURE 31 is a side elevational view of a "stretched" thread of the piece of fabric seen in FIGURE 29 with soils attached thereon;

FIGURE 32 is a top view of a combined diagram representing a stretched garment positioned in a drum of the combination machine in order to illustrate the dynamics of the dry cleaning system of the drycleaner embodiment of the combination machine of FIGURES 1 and 2; the view being sectionalized in order to further illustrate details;

FIGURE 33 is an isometric view of the sequence control assembly utilized to effect the control and the operations of the combination machine of FIGURE 1; the view being taken from the upper left and partially from the front;

FIGURE 34 is an isometric view of an example sequence control card and the bus bar utilized in the sequence control assembly seen in FIGURE 33, the illustration showing to advantage the relationship and arrangement of the sequence control card with the bus bar;

FIGURE 35 is an isometric view of the rear-half section of the sequence control card shown in FIGURE 34; the view being taken from the upper left and partially from the front;

FIGURE 36 is an isometric view of the front-half section of the sequence control card shown in FIGURE 34;

FIGURE 37 is a side elevational view of the sequence control assembly seen in FIGURE 33; the view being partly broken away and partly sectionalized in order to illustrate details;

FIGURE 38 is a side elevational view of a supporting device utilized in the sequence control assembly shown in FIGURES 33 and 37;

FIGURE 39 is a side elevational view of the supporting device shown in FIGURE 38;

FIGURE 40 is a front elevational view of a vertical section of the pawl and latching device seen in FIGURE 37; the view being partly broken away and partly sectionalized in order to illustrate details;

FIGURE 41 is a schematic electrical diagram illustrating the improved control system of this invention as used in the washer and dryer embodiment of the combination machine of FIGURES 1, 2, 3 and 4;

FIGURE 42 is a top elevational view of the mechanism used to initiate and terminate the various operations of the combination machine seen in FIGURES 1 and 2. FIGURE 42 further shows how the mechanism is utilized in the sequence control assembly of FIGURE 38 and the schematic electrical diagram shown in FIGURE 41; the view being partly broken away in order to illustrate details;

FIGURE 43 is a top elevational view of the mechanism seen in FIGURE 42 showing the positions taken by the various parts of the mechanism when an operation in the combination machine of FIGURE 1 is initiated; the view being partly broken away to illustrate details;

FIGURE 44 is a top elevational view of the bus bar conductor, retaining device used in the control assembly of FIGURE 33 and the initiating and terminating mechanism of FIGURES 42 and 43; the view being partly broken away in order to illustrate details;

FIGURE 45 is a side elevational view of the bus bar conductor, retaining device as seen in FIGURE 44;

FIGURE 46 is a schematic diagram illustrating the development of the surfaces of the conducting bands shown in FIGURES 33, 34, 35 and 36 to provide a dishwashing operation within the combination machine of FIGURE 1. FIGURE 46 is to be used in conjunction with the schematic electrical diagram of FIGURE 41 to illustrate and demonstrate the operation of the dishwasher embodiment of the combination machine of FIGURE 1. FIGURE 46 further illustrates the novel relationship between the sequence control card which provides a dishwasher operation in the combination machine and the schematic electrical diagram of FIGURE 41;

FIGURE 47 is a schematic diagram illustrating the development of the surfaces of the conducting bands shown in FIGURES 33, 34, 35 and 36 to provide a dry cleaning operation within the combination machine of FIGURE 1. FIGURE 47 is to be used in conjunction with the schematic electrical diagram of FIGURE 41 to illustrate and demonstrate the operation of the drycleaner embodiment of the combination machine of FIGURE 1. FIGURE 47 further illustrates the novel relationship between the sequence control card which provides a drycleaner operation in the combination machine and the schematic electrical diagram of FIGURE 41;

FIGURE 48 is a schematic diagram illustrating the development of the surfaces of the conducting bands shown in FIGURES 33, 34, 35 and 36 to provide an appearance-finishing and ironing machine operation within the combination machine of FIGURE 1. FIGURE 48 is to be used in conjunction with the schematic electrical diagram of FIGURE 41 to illustrate the operation of the garment appearance-finishing and ironing machine embodiment of the combination machine of FIGURE 1. FIGURE 48 further illustrates the novel relationship between the sequence control card which provides the garment appearance-finishing operation in the combination machine and the schematic electrical diagram of FIGURE 41.

Referring now to FIGURES 1, 2, 3 and 4 I have shown the invention applied to a domestic laundering machine 1 comprising a combination washer, dryer, dishwasher, drycleaner, and ironer. The machine 1 includes a cabinet 2 which is mounted on a supporting structure 3. Access to the machine for loading and unloading of clothes and dishes is provided by hinged doors 4 disposed in the side walls of cabinet 2. An enclosure 5 positioned in the front of and at the top of the cabinet serves as a mounting means and encasement for suitable operator controls and the control assembly of the machine. These controls may, for example, comprise the rotatable dial 6 and the pushbuttons 7 and 8.

The machine 1 includes two clothes tumbling containers 9 and 10 provided with suitable outer casings or cabinets 11 and 12 which completely enclose their respective tumbling drums. The drums 9 and 10 are mounted for individual rotation, being completely independent of one another as provided for by means of separate motors, pulley and sheave assemblies, and other related structures, within cabinets 11 and 12. The drums 9 and 10 are generally cylindrical in shape, having circular walls 13 and 13a, back walls 14, and front walls 15. The front and back walls of the inner drums are given additional strength by metal supports, 17, 18 and 19. The circular wall portions 13 and 13a are perforate over their circular lengths thereby producing an annulus of perforations around the drums. However, as better seen in FIGURE 7 the annulus of perforations extending around the drum has a predetermined width; the width being generally disposed in the middle area of the walls 13 and 13a of the drum.

The two drums 9 and 10 are generally separable in the center so as to form two halves 13 and 13a. Consequently, the respective drum halves may be separated and the drum enlarged, as seen under bracket A, FIGURE 3, or the drum halves may be brought together and closed as seen under bracket B. In order to separate and close the drums there are provided motor operated gear assemblies 20 and rotatable shafts 21 mounted within an elongated bearing housing 22, hung between the two vertical rear wall sections 23 of the outer cabinet structures 11 and 12. Shafts 21, as well as supporting the inner drums 9 and 10, also serve as the means for rotating the drums during the operation of the machine. The gear teeth of assembly 20 are engaged with a gear rack on the underside of the rotatable shafts 21. Two grooves 24 and 25 extend completely around the shafts 21 so as to enable the shaft to rotate while the gear wheel 20 and gear rack of shaft 21 are engaged. When the motor of gear wheels 20 is energized it causes shafts 21 to move walls 14, which are rigidly fixed to an end of their respective shafts, towards or away from their corresponding opposite walls 15. Front walls 15 are rotatable owing to their being affixed to rotatable shafts 26 in bearing housings 22 and 27. However, there is no means provided to move walls 15 horizontally towards or away from their opposite counterparts walls 14.

Referring now to FIGURE 8, it can be seen that the walls of the drum-half 13 overlap the walls of the drum-half 13a when the drum is in a closed position, thereby providing for the enclosure of the drum so as to effect a completely enclosed drum, FIGURE 3, bracket B, which can hold water or cleaning solutions for a washing cycle. As seen in FIGURE 7, and more particularly in FIGURE 8, the annulus of perforations 13i around the solid section 13s of drum walls 13 are obstructed and blocked by walls 13a when the drum is in a closed position. The perforations 13i in walls 13 do not align themselves with those in walls 13a, therefore the solid metal sections 13s of walls 13a cover the perforations 13i in walls 13 and thus effect an enclosed solvent or water-tight drum to provide means for a washing container.

Referring now to FIGURE 7 and more particularly to FIGURE 9 it can be seen that the walls 13 of the drum do not overlap the walls 13a when the drum is in an enlarged or open position, thereby providing an annulus of perforations 13i in the drum so as to effect a completely opened drum, FIGURE 3, bracket A, for introduction of hot or cold air for a drying, ironing, and/or conditioning cycle. When the drum is in an open position the annulus of perforations 13i around the circular central portion of walls 13 are not obstructed or blocked by the solid section 13s of the wall 13a. Thus the perforations in walls 13 align themselves with those in walls 13a so as to provide the means for introduction of air into the drum interior.

On the interior wall surfaces of the drums a plurality of inwardly extending vanes 28 are provided for agitating the washing and cleaning solutions, for tumbling the clothes, and for circulating air. The vanes 28 are separable into two halves with each vane half being attached to its respective drum wall 14 or 15. The vanes extend completely across the interior of the drum from the back wall 14 to the front wall 15. In order to allow unrestricted inward and outward movement of the drum walls for separation and closure as previously described, one half of the vane is hollow in the center, that is, it is constructed in an envelope type fashion, while the other half is solid and slightly smaller in size to fit snugly into the cavity of the larger envelope fashioned vane. This construction can best be seen in FIGURES 5 and 7.

The cylindrical inner drums 9 and 10 cooperate with the outer cabinets 11 and 12 to define an annular open passage 29 therebetween wherein a longitudinally extending baffle 30 is rigidly attached to the outside surface of the inner drum and extends completely across the passage 29 from the back walls 23 to the front walls 23a of the outer cabinets. The construction of baffle 30 is essentially the same as that of the interior vanes 28. That is the baffle 30 is capable of being separated into two sections wherein one half slides into the other half. A very small space 31, exaggerated as set forth in the drawing of FIGURE 4, exists between the baffle and the surrounding walls of cabinets 11 and 12 in order to allow the baffle to move without restriction within the passage 29 when the inner drum is rotated. The baffle 30 may have attached to its free end a flexible strip of material such as rubber or plastic to provide a means for rubbing or scraping the circular walls of cabinet 11 and 12 to prevent accumulation of residue thereon. The baffle 30 is generally attached at the lower right quarter section of the circular inner drum. Another baffle 32 identical in construction to baffle 30, is rigidly attached to the surface of the circular outside walls 13 and 13a of the inner drum in the manner just described for baffle 30. Baffle 32 is generally attached at the upper right quarter section of the circular drum above baffle 30. A slot-like opening or aperture 33 in walls 13 and 13a is located adjacent to baffle 32 and generally extends longitudinally across the passage from back wall 23 to front wall 23a. Solenoid operated filters 34 and 34–1 are attached to the outer cabinet sealing sections 35 of the two doors 4. Doors 4, when closed, form an outer cabinet sealing section 35 and define a portion of the outside passage wall of cabinets 11 and 12. Filters 34 and 34–1 are generally located in the upper left quarter section of the outer cabinet and inner drum. A metal section 36 of the outer cabinet is rigidly attached to the filter and defines a portion of the outside cabinets when the filter is in an operating position as shown in FIGURE 4. The letter U seen in FIGURE 4 denotes an open or "nonfiltering" position of the filter 34.

Solenoid operated shafts 37 are positioned and enclosed in cavities in the door sections 35 and move, or cause to open and close, inner drum section 38 thereby providing an opening means for introduction of clothes and dishes into the inner drum. Section 38 becomes locked into place by means of latches 39 affixed to the drum section 38 and catches 40 located on the inner drum.

Vertically positioned and fixed between back walls 14 and wall supports 17 of the inner drum are circular metal closure walls 17a. The diameter of closure walls 17a equal the inside diameter of the circular walls of outside cabinets 11 and 12 as indicated by the line D of FIGURE 4. The closure walls 17a move with the back walls 14 of the inner drum, since they are joined to one another, to provide a means for confining the washing and cleaning solutions during a washing operation within the limits of the walls 14 and 15 when the drums are closed to provide a washing or cleaning operation. Without the valuable confining action provided by the closure walls 17a the amount or quantity of the solutions or solvents within the closed inner drums would be reduced and hence the washing and/or cleaning operation of the clothes would be diminished or thoroughly ineffective. The reason for the reduction of the quantity of solutions or solvents within the drum by not having the closure walls is explained by stating that the cleaning solutions would escape from the inside of the inner drum by way of the slot-like opening 33 provided for discharge into an enlarged recirculating passage 29.

In outer cabinets 11 and 12 there are provided by vent flaps 41 positioned at the bottom of the cabinets, and vent flaps 42, positioned at the top of the cabinets, intake and exhaust openings for the introduction of air and the discharge of water from the interior of the drums and cabinets. The vent flaps are formed from sections of the upper and lower portions of the outer cabinets 11 and 12. Hingeing arrangements at one end of the vent flaps enables solenoids to open and close the vent flaps, thereby sealing the outer cabinets to provide water or air tight containers. Cabinets 11 and 12 are supported and held in place by means of braces 43 at the base of the cabinets and braces 44 at the top of the cabinets. Attached to brace 43 is a ductwork 45, which acts as an air intake means into the interior of the drums during a washing, drying, drycleaning or ironing operation, and as a water or cleaning solvent reservoir for a steaming, decatizing and conditioning cycle in a washing, drying, drycleaning or ironing operation. Positioned in duct 45 are heaters 46 and 47 which provide means for creating steam from water W when energized as seen in FIGURE 3. Water and cleaning solvents may be introduced into drums 9 and 10 by means of inlet connections 48 and 49 through which hot and cold water or solvents may be supplied to the inner drums 9 and 10 for washing or cleaning operations.

A valve controlled by a solenoid 50 admits hot water to the machine, and a valve controlled by an opposed solenoid 51 admits cold water to the machine. The hot and cold water valves under the control of solenoids 50 and 51 enter the drums through a common outlet 52. As water of clearing solvent enters passage 29 it is contained by baffle 32 and enters the inner drum by means of a slot-like opening 53 in the wall of the inner drum.

Pressure activated sensing devices or water level controls 50a may be provided to control both solenoids 50 and 51 so as to provide the proper water or cleaning solution level W/CS in the machine during a washing or cleaning operation. Sensing devices 54 may be connected to the interior of the tubs 9 and 10 by suitable conduits 55 which connect with the tub adjacent the bottom thereof at 56 as shown.

The wash and rinse water or cleaning solution used during washing and cleaning operations may be discharged from the machine by opening or enlarging the drums 9 and 10 and opening vents 41 thereby discharging the solutions into duct 45. The solution in duct 45 is discharged from the machine by way of an opening 57a which is suitably controlled by a solenoid 230, schematically shown in electrical schematic diagram FIGURE 41 through a sump 57 formed at the bottom of the duct. A suitable discharge hose or duct 58 leads from the sump to a pump 59 which may be attached directly to the motor 62 so as to be continuously driven thereby and which in turn discharges through a conduit 60 to a valve 61. For water or cleaning solution to be discharged from duct 45 the solenoid 230 must be energized to open valve 57a. It will be understood that from valve 61 a connection is made to a suitable drain (not shown). Valve 61 is always open so that the continuous operation of the pump can drain the duct and, in turn, the tubs.

Referring now particularly to FIGURE 4, during the operation of the machine 1 the inner drums 9 and 10 are driven by electric motors 62. The drive from the motor to the drum includes a pulley 63 secured to the motor shaft so as to rotate therewith and over which passes a belt 64. Belt 64 drives an adjustable sheave assembly 65 of the type which is well known for use in achieving variable output speeds from a constant input speed source. The adjustable sheave assembly in turn operates a belt 66 to cause rotation of a pair of pulleys 67 and 68 secured to each other so as to be rotatable together. The rotation of pulley 68 is passed on to a large driving pulley 69 by a belt 70, pulley 69 being rigidly secured on the end of drum shaft 26.

In this manner, motor 62 may be driven at a constant speed and, through the adjustable sheave assembly 65, the speed imparted to pulley 69 of drums 9 and 10 may be varied so as to provide an appropriate range of speeds for the drums. For instance, for tumbling purposes during the cleansing and rinsing operations, and also during the heat drying operation, a speed of approximately 40 r.p.m. may be provided to the drum, while a centrifuging speed of several hundred r.p.m. may be provided to the drums for effecting centrifugal extraction of liquid from the clothes prior to the heat drying operation.

When the sheave assembly 65 is in the position shown, it provides tumbling speed. However, when it is pulled over to the right as viewed in FIGURE 4 it provides the higher speed. The assembly is biased to provide the lower of the two speeds by means of a spring 71. The action of this spring may be overcome by means of a small synchronous motor (not shown) which, through a chain 72 and rigid member 72a pulls the sheave assembly 65 over to the right against the action of the spring. Thus, when motor 62 is not energized, a low speed rotation is provided to the drums 9 and 10, and when the synchronous motor assembly is energized the high speed rotation is provided. The operation of the variable speed drive briefly described above does not form any part of the present invention, and is set forth merely to provide a substantially complete description of an operative machine. A complete detailed description of such a drive is provided, for instance, in Patent 2,950,613, issued on Aug. 30, 1960, to John Bochan, and assigned to the General Electric Company.

Drums 9 and 10 are supported by the walls 23 and 23a of the outer cabinet to which shaft holders and bearing housings 22 and 27 are rigidly held. In addition to the support given to the drums by the walls of the outer cabinets additional strut members 23b may be attached to the front walls of outer tubs and the shaft bearing and holders. In addition a bearing shaft holder 22b attached to the main structural members of the machine 1 may be provided to add more strength to drum 10 and to prevent excessive vibration. The braces 120 attached to the nonrotatable shaft portion 119 of drum 9 and to the back wall 23 of cabinet 12 also serve the same function. The primary function of the nonrotatable shaft 119 and braces 120 as seen in FIGURE 22 is explained later in this text.

During the washing and cleaning operation of the machine, water or drycleaning solution is injected into the closed drums 9 and/or 10 through inlet 53 and trap door 53a better seen in FIGURES 10 and 11. The trap door 53a of the inlet is forced open by the incoming water into an open or down position, FIGURE 10, and allows water to enter the drum through inlet 53. When the water reaches a predetermined level W/CS, the pressure actuated sensing device 50a activates the solenoids 50 and/or 51 which terminate the injection of water from outlet 52.

Briefly described now is what occurs in conventional washing machines. In a conventional manner the washing and rinsing of the clothes and dishes and the drycleaning of clothes is effected by driving drum 9 and/or 10 by their independent electric motors 62 and their respective pulley and sheave assemblies. The interior vanes 28 agitate the washing solution and tumble the clothes. The water that mixes with the detergent, previously placed in the drum, penetrates the fibres of the fabric and dissolves the soils in and on the fabric and holds the soils in suspension in the detergent solution; or solvent in the case of drycleaning. After a specified length of time the contaminated soil-laden water is discharged from the washer and one or more applications of new and clean rinsewater is introduced so as to further loosen the residual soils and detergents from the clothes. After a tumbling process, as just described during the washing cycle, the partially contaminated rinse-water is then discharged.

One of the primary disadvantages encountered with this type of conventional washing operation is that the soils which have been broken away from and dissolved by the soiled clothes by means of the soaps and detergents, redeposit themselves back onto the clothes that are being cleaned. Heretofore, no conventional washing method has achieved a physical or mechanical means to prevent the redepositing of the soils back unto and into the fibres and fabric of the clothes once the soaps or detergents have loosened them from the clothes. The agitation of the washing solution in conventional systems loosens the soils from the fabric; but by the application of the same principles required to loosen the soils from the clothes the washing solution also redeposits them back onto the clothes. Therefore, several rinses of clear water are generally required to ultimately remove the soils. The only acceptable method, thus far, for cleaning of clothes is dependent upon chemical means, namely soaps and detergents. Hence, in conventional methods more costly and chemically complex soaps and detergents are required; longer washing cycles are needed; and separate and additional fills of clean rinse water in the drums are necessitated.

The unique construction of this invention utilizes for the first time a very effective mechanical means for the prevention of the redepositing of soils back onto the clothes. Thus, the need for complex and expensive soaps and detergents is substantially eliminated and the overall washing operation time for clothes is shortened, and the need for supplemental introductions of rinse water is substantially eliminated. As a consequence, a better and more efficient washing and cleaning of clothes is achieved by my invention.

Referring now to FIGURES 12, 13, 14 and 15 there are shown four diagrams illustrating the various positions taken by the baffles 30 and 32, the aperture 33, and the filter 34 during one revolution of the drum. The diagrams will demonstrate how the system of recirculating, filtration and reintroduction of regenerated solutions contribute to the unique achievements of this invention. It is to be noted that this system is continuous and dynamic, and that the stationary positions as depicted in FIGURES 12, 13, 14 and 15 are selected arbitrarily for purposes of explanation only.

Referring now particularly to FIGURE 12, there is represented diagramatically the essential parts of the recirculating system. For example, an inner circle representing inner drum 10 and outer circle representing outer drum 12 as applied in FIGURE 4. The outer drum 12 encloses the inner drum 10 and thereby creates an annular passage 29 between the respective drums 10 and 12. The baffle 30 is shown in the upper left quadrant of the circular drum. It is depicted as just having passed the filter 34. The filter, just prior to baffle 30 making contact with it, would be caused to move to an "up" position out of the way of the travelling baffle. The filter is shown in an up position. It is to be understood that after the baffle has passed the filter, the filter would be caused to move in a "down" position as it is shown in FIGURES 13, 14 and 15.

The baffle 32 and aperture 33 are shown in the lower left quadrant of the circular drum, below the contaminated solution level W/CS in the drum. Inasmuch as the aperture 33 is below the solution level the contaminated solution inside the drum flows out through the aperture to the passage 29 as indicated by the arrows SS. The solution will continue to flow out of the drum to the passage 29 until the space Y is filled completely. Space Y has a definite solution capacity because it is defined by the walls of the inner drum 10 and outer drum 12 and the baffles 30 and 32.

Referring back to FIGURE 3, bracket B, it can be seen that the solution is further confined by wall 23a of the outer cabinet and closure wall 17a of the inner drum. The baffle 30 pushes the solution in space Y in a counter-clockwise direction inside the recirculating passage during the revolution of the drum.

Once the baffle 32 and aperture 33 are moved above the solution level W/CS, location A, the solution W/CS from inside the drum can no longer flow out into the recirculating passage 29, and the contaminated or soiled solution SS, within the space Y of the recirculating passage cannot flow back into the interior of the drum.

Referring now particularly to FIGURE 13 it can be seen that from point B to point C on the circumference of the circle very little or no soiled solution SS can enter the interior of the drum, because the aperture 33 is always above the solution level W/CS and ahead or in front of the solution mass SS. However, from point C to point D an extremely small amount of solution SS may enter into the interior of the drum by way of aperture 33 because aperture 33 falls below the level of solution SS in the passage 29 at that particular moment of drum revolution. At this particular moment of revolution, C to D, the aperture 33 is located below the solution level SS. It must be clearly understood that the drum is revolving and the time for solution SS to enter the drum during this period is a fraction of a second. The length of the circumferential segment C–D would be slightly less than ten (10) inches on a circular drum having a ten (10) foot circumference. Thus at a drum speed of approximately forty (40) revolutions per minute, or 1.50 seconds per revolution, during a washing cycle the approximate time period that the solution SS would be able to enter the drum during the time required to cover segment C–D is .15 second.

Just before the baffle 32 reaches the filter, at approximately point C, the filter will be caused to move into an up or open position, as designated by the latter U, to allow the baffle 32 to pass by the filter. When the baffle 32 has passed by the filter the filter will instantly be caused to move to a down position, letter W, thereby blocking the recirculating passage.

Referring now particularly to FIGURE 14 it can be seen that the baffles 30 and 32 have moved to positions E and F and the filter has been caused to move to a down position W. The baffle 30 at this point in time would be driving the soiled solution SS through the filter 34. The soiled solution SS that is thrust through and past the filter would have all, or the greatest portion of the soils, filtered out from it. The resultant filtrate would be regenerated clean solution CS. The regenerated clean solution CS would then be forced to pass through the aperture 33 into the interior of the inner drum by the blocking and directing function performed by baffle 32.

Referring now particularly to FIGURE 15 it can be seen that the cleaned solution CS is caused to continuously enter the interior of the inner drum during a revolution from point F to point G, since the aperture 33 and baffle 32 are above the level of the solution W/CS in the interior of the drum. However, when the baffle and aperture are positioned below the solution level W/CS in the inner drum, as seen at point H in FIGURE 12, the soiled solution SS inside the inner drum will flow out of the drum through the aperture 33 into the recirculating passage 29. At this particular point in time, where the soiled solution starts to flow into the passage 29, another revolution of the drum would commence. A repetition of the recirculation and filtration process, as just described and illustrated by the FIGURES 12, 13, 14 and 15 would be effected throughout the complete washing operation. It is to be understood that the baffles, aperture, filter, and recirculation passage function in substantially the same manner for all the operations performed by the combination machine of this application. That is, the system functions in the same way, except for certain modifications which are explained in detail in other parts of this application, during the washer, dryer, dishwasher, and drycleaner, and ironer operations of this invention.

It is to be noted that the distance between the baffle 30 and aperture 33, and the baffle 32 are critical in their relationship to the circumference of the drum and the solution level as explained in the foregoing paragraphs. By not positioning the baffle 30, aperture 33, and the baffle 32 within the reasonably specific and defined limits laid out in the illustrations of FIGURES 12, 13, 14 and 15 the system and method herein disclosed will not work as efficiently, if at all. It should also be noted that the positioning and operation of the filter is another singularly important prerequisite.

Though the dimensions of the outer cabinet and drum may be changed, being made either smaller or larger, the distances between the baffles, aperture, and filter must be changed proportionally.

The size or dimensions of the passage may be changed, without respect to the change in cabinet and drum size and without respect to the change in the distances between the baffles, aperture, and filter elements.

By changing the size or dimensions of the passage 29, for example the width or distance between outer drum wall 12 and inner drum wall 10, designated by the letter Z in FIGURE 12, will not affect the primary function of the recirculating system. If the dimension Z is shortened, the passage width will be narrower thereby providing for less solution to be recirculated in the passage. If the dimension Z is increased the passage 29 will hold and circulate more solutions. Likewise the size of the aperture 33 may also be altered without affecting the primary function of the machine. If aperture 33 is small in size it will let less solution pass to and from the interior of the drum 10 to the passage 29. If the aperture 33 is large in size it will allow more solution to be recirculated.

It is to be understood that the dimensions of the non-critical or variable constituents, the passage 29 and the aperture 33 may be altered as to choice. However, optimum dimensions of the passage 29 and aperture 33 will provide for maximum efficiency of the recirculation and regeneration system of the combination machine.

Referring now particularly to FIGURE 12 the dynamics and effectiveness of the system can further be seen. The direction of the filtered or clean soluton CS during a revolution is indicated by the arrows CS. The arrows SS represent dirty or soiled solution.

Clean solution CS passes through the aperture 33 into the drum as seen in FIGURE 15 to be mixed with the soiled solution SS seen in FIGURE 18. The mass of the clean solution CS displaces the soiled solution SS owing to the rotation of the drum and the force and weight of the cleaned solution. Hence, the soiled solution SS is pushed by the clean solution CS and the rotation of the drum and the clothes therein, ahead of the clean solution CS as indicated by the arrows.

Referring back to FIGURE 12, it can be seen that when the baffle and aperture are located at point H, the clean solution CS will have been caused to move ahead or to the right side of the drum by the rotation of the drum and the clothes therein. The soiled solution SS will have been caused to move backwards or towards the left side of the drum by the rotation of the drum and the clothes therein. The soiled solution SS will at that point of revolution be in position to flow through the aperture 33 to the recirculating passage. Hence, the greatest quantity of solution to enter the passage 29 will be the soiled solution SS. This action substantially contributes to the overall effectiveness and efficiency of the recirculating system of this invention. It might also be noted that the largest portion, if not all, of the clean solution CS will remain inside the drum thereby enabling the clean solutions regenerated cleaning characteristics or detergency properties to function at their optimum efficiency.

Referring now to FIGURES 16 and 17 there is shown a filter assembly and some typical filtering elements to achieve the results herein disclosed.

During the washing and cleaning operation the filter 34 is operated intermittently by solenoid 34–2 and conducting band 208 and lines 208a as seen in schematic FIGURE 41. When the conducting band 208 is energized the soelnoid 34–2 is energized and the filter assumes an "up" or non-filtering position. When the solenoid 34–2 and conducting band 208 is de-energized the filter assumes a "down" or filtering position. The filter is intermittently operated in order to permit passage of the baffles 30 and 32 and to properly filter the suspended solids and soils out of the contaminated solution as required by the specific type of soaps, detergents, or cleaning solvents used in the operation. The filter holder 75 is located on and attached to the door 4 and door-section sealer 35 as seen in FIGURE 6. The filter holder 75 is located on the door 4 so that the actual filtering elements 73, which may be housed in a removable tray-like apparatus 74, can be removed from the filter holder 75 when the door 4 is opened. Thus the filtering elements 73 or overall filters 34 and 34–I may be cleaned or replaced when the filter 34 or 34–I become worn. The choice of the actual filtering elements 73 of the filters 34 and 34–I and the type of filter to be used are dependent upon the type of materials to be removed from the washing or cleaning solution. In FIGURE 17 there is given examples of some filtering aids and a representative filter are shown by the letters A, B, C, D, E, F, G, H, I and J. Layer A may be a section of porous cloth stretched across the filter tray 74. Layer B may consist of a more tightly woven porous cloth than A, and layer C may be an even more tightly woven porous cloth than B. In this manner the larger solid particles of soils may be entrapped by cloth A, and the finer solid particles which might pass through A can be entrapped by the cloth layers B and C. The layer D may consist of filtering aids such as alum, viz, aluminum sulfate, calcium chloride, ferrous sulfate, slacked lime or other precipitating or coagulating agents, etc., to purify and separate the suspended soils from the detergent. The layer E may consist of diatomaceous earth alone, or in combination with activated carbon, so as to reduce further the suspended soils and absorb them. The layer F may be a strong, finely meshed screen specifically constructed to support and hold the layers A, B, C, D and E in place. The typical professional laundry waste water generally consists of the following elements. These elements can be filtered by the filtering aids A, B, C, D and E and filter assembly just described.

| | |
|---|---:|
| pH | 9.0–9.3 |
| Alkalinity above pH 7 (as sodium carbonate) p..p.m.[1] | 60–250 |
| Total solids p.p.m | 800–1200 |
| 5-day B.O.D.[2] p.p.m | 400–450 |

[1] Parts per million.
[2] Biochemical oxygen demand.

The purification or treatment of laundry wastes ultimately depends upon the specific soaps, detergents, and synthetic detergents used. However, the example just given of a representative filter system substantially filters out laundry waste contaminants. It is generally possible, with a type of filter just outlined, to reduce 84–98 percent of the suspended solids and to remove up to 90 percent of detergents. Hence, at the end of a predetermined wash cycle, wherein known soaps or detergents are used, it can be seen that a filtering system and mechanical construction of the type used in this machine can prevent the redeposition of soils on the clothes and can provide a shorter and more effective wash cycle. Ultimately the wash water which becomes contaminated during a washing operation, may also be used as a rinse water once the contaminated wash water has been regenerated.

The filter 34, with the various layers of filtering devices and aids as shown, requires that a substantial driving pressure be effected upon the soiled water or cleaning solvent to be filtered in order to force the water or solvent through the filter. The considerable pressure required to accomplish the filtering process is provided for by the driving force of the moving baffle 30. The rotation of the drum 9 and/or 10 causes the baffle 30 to carry the soiled water to and force it through the filter 34. In essence, the baffle 30 acts as a force pump. The simple and low cost of construction of the baffle 30 and the filter 34 causes this filtering system to become a very economical and practical application of some commercial types of pressure plate filtering systems now used in other areas of industry. In addition the solenoid 34–2, which causes the filter holder 75 to lift up and out of the way of the baffles 30 and 32, need not be costly or large in size because it is only required to lift the weight of the filter and filter holder itself and little or no water. Since the soiled water passes through the filter before the filter is caused to assume an "up" or nonfiltering position. An expensive solenoid is not required. However, when the filter holder 75 is in a "down" or filtering position it is subjected to considerable downward pressure caused by the weight of the water to be filtered, and the substantial driving force or pressure created by the moving baffle 30. In order for the filter holder 75 to bear the weight of the water and the pressure created by the baffle, the door section 35 is so designed that the filter holder and filter are solidly supported and rest on portions 35–1 of the door section 35 as more clearly depicted in FIGURE 4.

Referring back to FIGURES 3 and 4, machine 1 is designed to provide a heat drying operation. That is, the machine 1 is intended to effect complete drying of clothes after they have been washed, and after a substantial amount of liquid has first been extracted from them by centrifuging as provided for by the drums 9 and/or 10. In the conventional manner, the heat-drying operation is accomplished by providing a source of heat for the evaporization of the moisture from the clothes in drums 9 and/or 10. In order to heat the ambient air being drawn and then force blown into one of the drums, there is provided four aperture air inlets 76, seen in FIGURE 4, which allow ambient air to pass to variable speed motors 77 and 78 and into ducts 45 and 79, and passage 80. Squirrel cage impeller assemblies 81 and 82 have fins 83 and 84 which extend horizontally and completely across the ducts 45 and 79. A solenoid-operated impeller cover 85 prevents ambient air from being blown into duct 79 when it is in a down or impeller covering position. Ambient air which is drawn into the impeller assemblies 81 and 82 is force blown by the impellers into ducts 45 and 79 and passage 80 and subsequently into the drums 9 and/or 10. There are air inlets into drums 9 and/or 10 created by vents 41 and 42 when those vents are caused to be in an open position. In order to heat the ambient air being injected into the drums there is provided a heater assembly 86, better seen in FIGURE 18, which is supported and removable by means of channel guides 87 and 88. Heater assembly 86 consists of six round, elongated heater elements, 89, 90, 91, 92, 93 and 94. The heaters may be the plug-in type and are individually removable and replaceable when the assembly 86 is pulled out of passage 80. A general supply of heat is obtained from the heater elements 89 through 94. However, the six heaters in passage 80 are varied in their respective wattages and ability to deliver heat. Heater 89 is capable of producing 200° temperature, heater 90 produces 50°, heater 91 produces 25°, heater 92 produces 25°, heater 93 produces 100°, and heater 94 produces 200°. During the various and distinct washing, drying, cleaning, and ironing operations provided by this machine different combinations of the heaters are used to provide specific amounts of heat to the drums. The specific heaters used in the various cycles and operations are explained in detail in the further description of this invention.

As the clothes are tumbled in the open drum, impeller 82 blows air down into the passage 80 and over the heater assembly 86 to impeller 81 where impeller 81 blows the preheated air into duct 45 and into inlets 41 to be subsequently injected into the drum or drums being used.

Referring to FIGURE 4, a variable heater 95 is positioned in an enclosure 96. Enclosure 96 is fixed to the wall of drum 12 and has an open side adjacent to passage 29. As air or water circulate through the passage 29 the thermistors 226 and 236 in electrical diagram schematic FIGURE 41 respond to the temperature of the air or water passing by the heater 95 and provide a means to energize heater 95 through relays 225 and/or 234. When the temperature in the inner drum falls below a desired level the thermistors sense the drop in temperature and allow current to pass through them to the relays. The relays when energized cause the switches 226 and/or 235 to close and, in turn, provide current to energize the heater 95. The heater 95 is positioned outside the path of the baffles 30 and 32. It is to be understood that that air or water in the passage 29 which is caused to pass by and over the heater 95 as a result of the movement of the baffle 30 is approximately the same temperature as the air or water inside the drums.

It is noted that during a drying cycle the temperature of the hot air inside the drum is decreased. The decrease in temperature of the drying air is a result of the removal by the heated air of the moisture from the clothes. Therefore, the heater 95 is provided in the machine 1 to reheat the recirculating air before its reintroduction as clean, moisture free air into the drum. In addition, the heater 95 is positioned outside of the inner drum so that additional heat can be injected into the drum during a washing or drying operation without any danger of directly scorching or burning the clothes. By eliminating the danger of having direct contact between an exposed heater and the clothes being washed or dried a valuable safety feature is provided by the machine.

During the first few minutes of the drying cycle the impeller cover 85 and the vents 42 are in an open position. The opening of the vents and the impeller cover provide a means for some of the air being blown by the impeller 82 to enter duct 79 for subsequent injection into the drum. The injection of ambient air through the top of the drum and simultaneously fromt he bottom of the drum causes the air within the drying drum to circulate more uniformly and freely about the clothes. Thus, a more effective heat transfer of air to and from the clothes is achieved. Hence, the evaporation of the moisture from the clothes is more rapid and effective. After a brief cycle of the injection of air by both impellers into the drum the impeller cover 85 is closed over the impeller 82. The impeller 82 is thereby compelled to blow air directly into the passage 80. The air which is being blown by the impeller 82 passes over the heater assembly 86 and into the duct 45. The preheated air is injected from the duct 45 into the interior of the drum. The closing of the vents 42 and the cover 85 over the impeller 82 provide a means for creating greater air pressure inside the drum. The increase in the amount of air being injected into the drum, and the accompanying increase in air pressure, ultimately causes the lint and moisture-laden air inside the drum to be discharged more forcibly through the aperture 33 into the passage 29.

The operation of the filter holder 75 and filter 34, as previously described, is intermittent in operation in the washing cycle. However, just before a drying cycle is initiated the solenoid 231, shown in the electric diagram schematic FIGURE 41 is energized and causes the filter holder 75 to rotate 180° about its axis 75–1. As a result of the revolution of the filter holder 75 the filter 34–1 assumes the position previously held by filter 34. As seen in FIGURE 17, the filter 34–1 may be composed of different filtering aids, such as cloth-filtering means only, as opposed to the use of filtering aids such as chemicals and diatomaceous earth, etc., used in the filter 34. During a drying operation it is necessary to have a filter which will allow air to pass through it at a faster rate than a filter which is designed to allow passage of water during a washing operation. Therefore the filter 34–1 is used during a drying operation. The filter 34–1 need only perform the function of lint and moisture removal in a drying operation whereas the filter 34 is required to remove soils and detergent during the washing cycle.

When a predetermined amount of the moisture has been evaporated from the clothes which may be regulated by time, or measured by a humidistat (not shown), all of the heaters 89 through 94 and the heater 95 are de-energized and the speed of impellers 81 and 82 is increased. It is pointed out at this time that a humidistat could be effectively placed in a separate enclosure similar to enclosure 96. When all of the heaters are de-energized and the speed of the impellers is increased, the impeller cover 85 and the vents 41 and 42 are opened. Thus ambient air alone may be introduced into the drum for a short fluffing cycle. At the end of the fluffing cycle, the impeller cover is closed over the impeller 82 and an exhaustion and cooling cycle is initiated. A cooling cycle consists of ambient air being injected into the drum and being expelled through the damper vents 97 and 98. The weight of the damper vents 97 and 98 is sufficiently light (for instance, being made of very thin aluminum sheet) so that they may be moved open by the velocity and pressure of the air being expelled.

After the washing and drying operation, the impellers 81 and 82 and the motor 62 are de-energized When the motor 62 stops, the pulley 69 and the drum do not immediately stop but rather slowly come to rest. As the rotation of the drum gradually decreases and while there remains only a few "last" revolutions of the drum, and before the drum completely comes to rest, the motor 37a is energized. The motor 37a then causes the shaft 37 to move forward so as to engage the slot 99, seen best in FIGURE 19, on the drum section 38 thereby making the drum stop in a predetermined position. When the drum is at rest and the section 38 is engaged with the shaft 37 an electromagnet 37b positioned at the end of shaft 37 is energized. The electromagnet 37b provides a means for the shaft 37 to become magnetically attached to the drum section 38. When the motor 37a causes the drum section shaft 37 to move back towards the door 4, the electromagnet 37b, which possesses sufficient magnetic strength to hold the section 38 unto the shaft 37, dislodges or disengages the drum section 38 from the catches 40. Thus the drum section 38 is brought back into contact with and in resting position against the door 4. It is understood that the drum section 38 may be attached to the inner drum by hinges and may be used as a second "inner" door to provide a means to introduce clothes into the washing and/or drying drum. However, the use of the shaft 37 and electromagnet 37b as a means to produce an opening for placing clothes in the drum is provided for convenience and to effect a fully automatic operation. When the washing and drying operation has been fully completed, the relay 184 seen in the electrical schematic diagram of FIGURE 41 effects a means to disengage an automatic safety door lock and thus enables the operator to open door 4 and remove the clothes.

Referring now particularly to FIGURES 20 and 21 and in general to FIGURES 3 and 4, machine 1 is designed to provide a dishwashing operation. That is, the design of machine 1 is intended to effect the complete washing and drying of soiled dishes and utensils. In FIGURES 20 and 21 there is shown a dish and utensil rack 100 which is to be placed on and held upright by a removable base rack 101. The base rack 101 is supported by a brace 102. The base rack 101 provides a means to insert by slideable movement, the rack 100 and dishes thereon into the drums 9 and/or 10 of this invention. The drums 9 and/or 10 are provided with water injection means 48 and 49. The injection of water through inlets 48 and 49 is controlled by the solenoids 50 and 51. Hot and cold water are injected into the drum by way of the common inlet 52. The level of the water injected into the drum is controlled automatically by pressure-sensing device 50a. The dishwashing drums are provided with a sump 57 and a discharge hose 58, controlled by a valve 61, for the disposal of waste water. The dishwashing drums are provided with apertures 33 to enable passage of soiled water from the interior of the drum into passages 29 for recirculation of water in passages 29. Soiled water which passes through filters 34 is regenerated by the removal of suspended soils, solids, and detergents by the purifying action of the filter. The reintroduction of regenerated water into the dishwashing drums is based upon the same principles as previously described for the washing of clothes in machine 1.

Prior to the introduction of the dishes and rack 100 into the dishwasher drum or chamber, the base rack 101 is placed in the chamber and locked into place therein by inserting prong 103 into hole 104 in vane 28 of the chamber. The support brace 102 is then engaged and locked onto base rack 101 by turning support brace 102 on pivot 105 and then inserting prong 106 into hole 107 of the base rack 101. Thus, the means for the support brace 102 to restrict movement of the base rack 101 is achieved. The channel guides 108 further support and restrict the movement of the dish rack 100. An eyehook 109 rigidly locks support brace 102 in a supporting position by having the hookend 110 of the eyehook 109 placed over a horizontally joined brace 111 fixed to the support brace 102.

The dish holding rack 100 is joined to the base rack 101 by inserting T-shaped brackets 112 and 113 into slots or grooves 114 located in the base rack 100. Dish rack 100, thus engaged, is prevented from moving in any direction. However, because the T-shaped brackets 112 and 113 of the rack 100 are able to slide in the grooves 114 of the base rack 101 the dishes and rack may be inserted into the drum by the operator simply pushing the rack 100 and sliding the rack 100 on the base rack 101 into the drum. It is to be understood that the operator loads the dishes and utensils, as shown in FIGURES 20 and 21, on the rack 100 in an appropriate manner prior to inserting them into the dishwashing chamber.

After the dish rack is loaded, the operator slides the dish rack into the chamber. When the loaded dish rack is introduced into the chamber, catch 115 on the rack 100 engages and locks onto a nonrotatable shaft in the interior of the drum. The guide wheel 117 and the support 118 on the rack work in conjunction with the catch 115 on the rack and the nonrotatable shaft in the drum to hold the rack in place inside the drum. When the rack is inserted into the drum and engaged, the operator unlocks the support brace 102 and slides out the base rack 101. The operator then closes the door, rotates the selector dial 6 to the appropriate designation for the dishwashing operation and pushes the buttons 7 and 8 on the control panel, and hence, activates the operational sequence for the dishwashing operation. When the door is closed and the controls are set, the motor 37a is automatically energized and the door section shaft 37, which has the drum section 38 attached thereon, is moved forward to engage the interior drum by means of the latches 39 and catches 40. The motor 20 is then energized and causes the gear wheel of motor 20 and the drum shaft 21 to move the rear half section 13 of the drum forward to contact and join with the front half section 13a of the drum.

When the two halves of the inner drum have thus been joined and closed, a watertight chamber is effected as has been previously described for the clothes washer and dryer operation. Water is introduced into the drum and the motor 62 is then energized and causes the pulley assembly to rotate the drums 9 and/or 10, thereby causing the washing water to swirl in a counter-clockwise motion to flow between and over the plates and utensils. It is understood that aperture 33 may have a screening cover with sufficiently large enough holes in it to allow the passage of the largest particles of food scraps and greases, etc., to flow into the passage 29 for a filtering process. Hence, the operator is spared the necessity of prior hand-scraping or hand-rinsing soiled dishes before placing them into the drum as is common with conventional dishwashing systems.

By utilizing the recirculating passage and filtering system in the dishwasher, as previously described for the clothes washing operation, the redeposition of food scraps, loosened soils and greases, etc., back onto the dishes is eliminated. Thus, a more effective and shorter dishwashing operation is achieved.

Upon the completion of the dishwashing cycle, the water is discharged from the machine by the same means described for the discharge of water during a clothes washing operation. Upon elimination of the water, the motor 20 is energized and moves the gear wheel of motor 20 and the shaft 21. The drum section 13 is thereby caused to move back towards the wall 23 of the outer cabinet so as to provide an enlarged drum for a drying and a cooling cycle. The perforations resulting from the movement of the drum halves, as seen in FIGURES 7 and 9 enable preheated air from heaters 89 through 94 to be introduced into the drums by means of the impellers 81 and 82 and the vents 41 and 42. The vents 41 and 42 are at this time in an open position and, hence, allow the steam vapor and residual hot air to be exhausted into duct 79 and subsequently expelled into the atmosphere through the outlets 97 and 98. The elimination of the steam vapor by the means just described is another advantageous feature provided by this invention which is absent in conventional dishwashers. At the completion of the drying cycle, the heaters 89 through 94, the thermistor and the heater 95 in enclosure 96 are de-energized. The impellers 81 and 82 and the motor 62 and its pulley assembly are de-energized in order to arrest the revolutions of the drum. The motor 37a is then energized and causes shaft 37 to move and engage the slot 99 in the drum section 38 to make the drum stop in a specified position. The electromagnet 37b which holds the drum section 38 fast to the shaft 37 provides a means to engage and disengage the section 38 to the inner drum. The reverse of motor 37a is then initiated which causes the shaft 37 and drum section 38 to move back to the drum sections resting position in door section 35. The automatic door lock of door 4 is then disengaged and the operator may then open the door and remove the rack and the dishes from the machine. It is pointed out that the rack and the dishes are pulled out of the interior of the drum by utilizing the base rack 101 and the support brace 102 in the same manner described for inserting the rack 100 into the drum.

Referring now to FIGURE 22, it can be seen how the one end of immovable shaft 119 provides a means for securing the dish rack 100 inside the drum. The securing end of shaft 119 referred to has two tongue members which fit into the channel grooves 115a on channel member 115 of the rack 100. The channel member 115 and grooves 115a guide and hold securely the dish rack 100 inside the drum 9 and/or 10. While the drum revolves and, thus, swirls the washing solution about the dishes, the rotation of shaft 119 is prevented by attaching a stationary securing brace 120 to the shaft end which extends outside of the cabinet 11. The securing brace 120 is rigidly held stationary by attaching said brace 120 to the opposite stationary wall of cabinet 12 as seen by reference to FIGURE 3.

Referring back to FIGURE 22 it can be seen that the round, horizontally extending shaft 119 is mounted in a bearing shaft assembly 26 hung between the vertical inner drum walls 15 and outer cabinet walls 23a. The shaft 119 not only supports the drum, but also serves as the means of attaching and holding the dish rack 100. Drum wall 15 is rigidly fixed to bearing casing 122. Bearing casing 122 has rigidly attached to it hollow pipe shaft 123. Hollow pipe shaft 123 and its rotatable section 26 are attached to pulley 69 and induce the rotation of the bearing casing 122 and, in turn, the drum. The hollow pipe shaft 123 is mounted in an elongated bearing 124 which is hung in casing 125 and braces 23b which, in turn, are fixed to stationary outer cabinet wall 23a. The hollow pipe shaft 123 is supported by bearings 124 and bearings 127. Bearings 124 and 127 not only serve as the mounting means for the pipe shaft 123 but they also provide for the comparatively frictionless and free revolutionary movement of hollow pipe shaft 123 and, in turn, the inner drum which is affixed to bearing casing 122 and the pipe shaft 123.

Referring to FIGURE 20, there is shown on rack 100 a receptacle catch 115b. Referring now to FIGURES 23 and 24 the catch 115b is shown as a metal member with an octagonal cavity 129 disposed therein. The octagonal cavity 129 of catch 115b enables the octagonal end s of the shaft 128, seen in FIGURE 23, to fit or be inserted into the catch 115b. The location of shaft 128 in the rotatable drums 9 and/or 10 can be seen by referring back to FIGURE 3. When the shaft 21 moves forward to close the drum for a dishwashing operation the octagonal end of shaft 128 is caused to engage catch 115b. Thus an additional means of support is provided for the dish rack 100 while it is stationed inside the drum during a dishwashing operation.

While the drum is revolving, the rotation of shaft 128 is prevented as a result of its octagonal end having been inserted into the receptacle 115b which is rigidly fixed to the dish rack 100. Because dish rack 100 is secured to immovable shaft 119, FIGURE 22, by means of catch 115, the rack 100 does not rotate.

The round or cylindrical end r of horizontally extending shaft 128 is mounted in an elongated bearing 129 positioned within a hollow of shaft 21. The shaft 21 is hung between the vertical inner drum walls 14, wall supports 17 and 18, and the enclosure wall 17a. The drum walls 14, wall supports 17 and 18, and the enclosure wall 17a are securely joined to the shaft 21. The shaft 21 revolves about the cylindrical end of shaft 128 by means of the bearing 129. In order to prevent shaft 128 from slipping out of its position in shaft 21 there are provided two pins 130 and 131 which are secured to wall support 18 of the drum. After the shaft 128 is inserted into the hollow provided for it in shaft 21, the pins 130 and 131 are secured to wall 18. The pins 130 and 131 have rounded ends fitted snugly into a groove 132 which extends completely around the circumference of shaft 128. The groove 132 and bearings 129 enable the shaft 21 (rigidly fixed to walls 14, supports 17 and 18 and enclosure wall 17a) to rotate about shaft 128 without causing shaft 128 to rotate. While the shaft 21 and drum are rotating, the pins 130 and 131 prevent the shaft 128 from slipping out of contact with the bearing assembly and away from the drum and its support walls.

The machine 1 is also designed to provide a drycleaning operation. That is, it is intended to effect the complete cleaning of clothes. The dry cleaning of the clothes is effected by washing them in a nonaqueous solvent, draining the excess solvent from the goods, centrifuging the goods to remove solvent therefrom, and then steaming or decatizing the clothes so as to condition the fibres and remove lint and residual solvents. The clothes or goods are then dried with hot and cool air.

The solvent washing step of the drycleaning operation is carried out in the same manner as described for the washing of clothes during a washing operation of this invention. Therefore, for the purpose of brevity a detailed description of the solvent washing cycle is not given. However, a summary description of the solvent washing cycle is given. The clothes which are to be drycleaned are placed in drums 9 and/or 10. The door 4 is closed and the proper sequence control card for "bulk" drycleaning is selected by turning the selector dial 6 to the proper position designated on the cycle indicator 146 seen in FIGURE 33. The start buttons 7 and 8 are then pushed in order to begin the automatic drycleaning operation.

The drum section 38 is then caused to engage the drum 10 by means of latches 39 and the drum half 13 is then cause to move forward to engage and cover the perforations in drum half 13a thereby effecting a container capable of holding solvent. Solvent is then injected into the drum by means of the inlets 48, 49, 52 and 53. The drum is rotated by means of the motor 62 and the pulley and sheave assembly so as to agitate the solvent and tumble the goods, thereby promoting contact between the goods and the solvent for an effective cleaning operation. Prior to the solvent washing cycle the filter holder 75 may have a special solvent filter placed therein so that the suspended soils and lint may be filtered from the solvent. The filter holder and filter are then intermittently opened and closed in order to institute decontamination of the solvent and to enable reintroduction of the regenerated solvent through aperture 33 to the drum for more concentrated cleaning of the garments.

Upon completion of the solvent washing operation, the solvent is drained from the goods by the withdrawal of drum half 13 back towards wall 23. Thus the drum is enlarged and alignment of the perforations of both halves of the drum is effected so as to provide a means for the discharge of the spent solvent through vents 41 and duct 45 into the sump 57 and hose 58 for removal from the machine.

The vents 41 are then left open and a drum is rotated in order to centrifuge the excess solvent from the clothes. Meanwhile the intermittent operation of filter 34 continues in order to trap the lint and residual contaminants that are centrifuged from the clothes. With the drum in an open position and the perforations in an aligned state, the various heaters of the heater assembly 86 and the impellers 81 and 82 are energized. As a result of these actions warm air is injected for a brief period into the drum for a partial drying cycle.

When the hot air and centrifuging cycles are completed, hot water is introduced into the inner drum where it is cause to flow through the perforations in the drum and through the vent 41 into the duct 45. The amount of hot water which is injected into the drum and ultimately into the duct 45 is controlled and determined by the pressure sensing device 50a. As the water enters the duct 45 the heaters 46 and 47 are energized and, thus, cause the water in the duct to form steam which is, then, injected into the drum by means of the impeller 81. The drum continues to rotate as steam is blown into it. As a result all the surfaces of the clothes are exposed to the decatizing and conditioning properties of the steam. The filter 34 is caused to continue operating thereby catching the lint and residual contaminants which will have been further loosened from the clothes by the steaming process. After a predetermined period, the heaters 46 and 47, and the impeller 81 are de-energized and the excess water in the duct 45 is drained by the drain and pump from the duct and sump 57.

Upon the termination of the steaming cycle, various heaters of the heater assembly 86 and impellers 81 and 82 are energized thereby introducing dry hot air into the drum for circulation about the clothes so as to dry them completely. At a predetermined time, all the heaters are de-energized and the impeller cover 85 is closed over impeller 82 thereby causing the air being blown by impeller 82 to enter passage 80 and duct 45. The ambient air being blown by the impeller 82 then causes expulsion of the heated air inside the drum to the atmosphere through the ports 42, duct 79, and external outlets 97 and 98. When all the heated air is exhausted the impellers 81 and 82 continue blowing in ambient air into the drum to cool the clothes.

The impeller cover 85 may be opened for a brief period at the end of the exhaustion and cooling cycle in order to allow ambient air from both blowers 81 and 82 to enter the drum and fluff and raise the nap of the fabric of the clothes.

With the conclusion of the entire drycleaning operation, the drum section 38 is caused to move to its resting position in door section 35 and the automatic door lock of the door 4 is disengaged. Thus, the removal of the clothes is facilitated.

Referring now particularly to FIGURES 25, 26 and 27 there is shown a clothes rack 133 upon which wearing apparel 134, for example a suit and trousers as shown, are placed and stretched into a wrinkle-free state on said clothes rack. The clothes rack 133 consists of a conventional shoulder hanger for draping the coat over the frame. The coat is buttoned by means of button and buttonhole clasps 135. Side members 136 are made of resilient material for the expansion of the sides of the coat thereby stretching the bodice of the coat. Sleeve holder bands 137 are also made of resilient material for the purpose of expanding and supporting or holding the sleeves in a stretched condition. The collar of the coat may be placed in an upturned position to expose all areas of the collar so that a more thorough cleaning of the collar can be effected. The trouser holdels 138 are similar in construction to the conventional trouser stretching devices which are generally made of resilient material. The leg portions of the trousers are placed over the trouser holders and the waist band portion of the trousers is formed over the automatically expandable waist band member 139 thereby causing the upper portion of the trousers and the waist portion to assume a wrinkle-free state. A type of "mechanically" adjustable garment-supporting device such as that which is disclosed in the Letters Patent No. 3,292,-829, filed Apr. 28, 1964, and patented Dec. 20, 1966, of H. A. Tompkins and M. R. Krupsky, may also be used for providing a superior garment stretching apparatus. The referred to garment supporting device used in combination with the drycleaning method herein described is intended to render an improved novel technique for the drycleaning of clothes.

When the garment is stretched by utilizing the garment suporting device then the supporting device is inserted into the interior of the drum by using the base rack 101 of FIGURES 20 and 21 used in the dishwashing operation. The T-shaped guides 140 seen in FIGURES 25, 26 and 27 provide a means to engage the garment supporting device on the base rack 101. Once the supporting device 133 is inside the drum, the garment suporting device catch 141, corresponding to and similar in construction and operation to the catch 115 of FIGURES 20 and 21 engages the "tongued" end-take of the shaft 119 of FIGURE 22 in the drum. The detailed manner by which the base rack 101, the guide 140 and catch 141, and the shaft 119 work in cooperation with one another for locking and positioning the supporting device inside the drum has been previously described in the explanation of the dishwasher embodiment of this invention. Once the garment supporting device is engaged inside the drum it is rigidly supported and held in a stationary and nonrotatable state during a drycleaning operation. The back rack 101 is then disengaged from the garment supporting device and pulled out of the drum.

When the garment is thus situated inside the drum, the door 4 is closed. The operator selects and positions the sequence control card designated "Drycleaning of Individual Garments" by turning the selector dial 6. The automatic door lock of door 4 is engaged and the automatic drycleaning process is initiated as will now be described. The drum section 38 is caused to move forward and engage the drum by means of the latches 39 and catches 40. Drum half 13 is caused to move forward and join with drum half 13a. The shaft 128 which is supported by the drum wall 14 is caused to be inserted into the holder 142 on the garment supporting device so as to give additional support to the garment supporting device which is also held in place by the shaft 119 during the subsequent drycleaning operation. During a drycleaning operation the shaft 128 and the holder 142 are engaged and function in the same manner as do the shaft 128 and the holder 115b (of the dishwashing rack) do during a dishwashing operation. Similarly, during a drycleaning operation the shaft 119 and the holder 141 are engaged and function in the same manner as do the shaft 119 and the holder 115 (of the dishwashing rack) do during a dishwashing operation.

With the garment and supporting device held stationary in the drum, cleaning solvent is then injected into the drum 9 and/or 10 through inlets 48, 49, 52 and 53. The solvent is automatically injected into the drum to an appropriate level which is determined by the pressure sensing device 50a. When the drum is filled to a predetermined level with solvent, the motor 62 causes the pulley and sheave assembly to rotate the drum and drive the solvent in, about, and through the stretched and exposed fibres of the garment. It is once again pointed out that the shafts 119 and 128 hold the garment and supporting device stationary within the drum during the rotation of the drum.

The effect of the solvent being agitated, circulated, and driven with a "directed" positive-motion over and through the exposed fibres and capillaries of the material of the entire garment rapidly cause removal of the soil by reason of soil displacement, solution, and velocity.

An empirical description is now given for a more complete disclosure of the process of stretching a garment on a supporting device and forcing a liquid or cleaning solvent over and through the capillaries and fibres of the garment so as to achieve a superior and more efficient cleaning of the garment. The principles involved in this type of drycleaning process are explained and illustrated by referring to FIGURES 28, 29, 30, 31 and 32. In FIGURE 28 there is illustrated an enlarged section of the fabric of an "unstretched" garment with soils attached on and within the threads, fibres, and capillaries of the fabric.

It can be seen that the threads T of the fabric are in an irregular or askewed order. This irregular order results in some of the capillaries C between the threads being smaller in size than when the threads are in a regular order. Any capillary that is caused to become small in size would cause soils S to be more firmly entrapped and held by the surrounding threads.

In FIGURE 29 there is illustrated an enlarged section of the fabric of a "stretched" garment with soils attached on and within the threads, fibres, and capillaries of the fabric. An understanding can be had by comparing FIGURE 28 with FIGURE 29, how the threads T of the fabric in FIGURE 29 are placed in a more regular order in the stretched fabric and therefore cause some of the capillaries C in the fabric to assume their natural size. As a result of some of the capillaries C between the threads becoming larger in size as seen in FIGURE 29 than those shown in FIGURE 28 the soils S held in the capillaries by the threads would have to expand in size to accommodate the increase in size of the enlarged capillary or else would have to lose contact with one or more of the sides of the threads which define the area of the capillary. Thus, by stretching the fabric and threads the size of the capillaries C is increased thereby causing the soils to become either broken into smaller particles SP or to become unattached to all but one or two of the surrounding threads. Since the stretching of the threads and fibres causes either an expansion of the size of the soils, a breaking up of the soils into smaller particles, or a diminishing of contact between the threads and the soils it is easier to displace the soils from the fabric material of the garment. By explaining separately the three changes just stated, which are effected upon the soils by the stretching action imparted to the garment, a fuller understanding of the principles can be acquired.

If a soil particle is caused to expand beyond the size it initially had would cause the soil particle to become thinner in dimension by the action of the soil particle spreading itself over a larger area. Hence the dilated soil particle would be more susceptible to being broken into smaller fragments or dissolved by cleaning solvent.

If a soil particle is caused to break up into smaller fragments or particles SP, more of the surface area of the soil would be exposed to the dissolving action of the cleaning solvent. Hence the soil particle would be more susceptible to being dissolved or carried away from the garment and subsequently held in liquid suspension by the solvent. If the soil particle is caused to lose some of its original contact with the threads of the garment the soil particle will have less fabric to "hold" unto and therefore the soil particle can be more readily displaced and carried away from the garment by the solvent.

Thus, it can be seen that solvents are more able to displace, loosen, attract, dissolve and hold in suspension those soil particles which have a change effected upon them. Simply stated, the soils in FIGURE 29 are less surrounded and bonded by the threads in the stretched fabric as compared with those soils seen in FIGURE 28 of the unstretched fabric.

Also seen in FIGURES 28 and 29 are soils S–1 which are held in between the capillaries C–1 of the fibres F themselves.

By comparing FIGURE 28 with FIGURE 29 it can be seen that the fibres in FIGURE 29 are caused to be placed in a rather straight line formation and in closer proximity to one another by stretching the fibres. As a result of stretching the fibres F, the fibres are placed under tension, thereby causing the soils S–1 to be stretched and, in turn, broken into smaller bodies and propelled away from the fibres as indicated by the arrows. The smaller fragments are more easily removed and dissolved by the action of the solvent. The stretching not only decreases the coheesive strength of the molecules of the soils S–1 but the stretching also decreases the adhesive properties and attraction that the soil bodies S–1 possess for the fibres. Further the stretching of the fibres causes the soils S–1 to be pulled beyond their elastic limit and, as a result, the soils S–1 break into smaller fragments. In addition, as seen in FIGURE 31, the pulling apart of the soils will cause some fragments of the soils to be thrust completely away from the fibres as a result of the sudden breaking or "snapping" action caused by the stretching of the soils beyond their elastic limit. FIGURE 30 depicts an unstretched fibre having soils thereon and FIGURE 31 depicts the same fibre stretched and by comparing the FIGURES with one another the change that is effected on the soil particles by the action of stretching can be seen.

Referring now to FIGURE 32 it can be seen how a further aid to the superior clenaing of the garment is achieved for by the positively "directed" motion of the cleaning solvent against the stretched garment.

In FIGURE 32 a diagrammatic sectionalized top view of the stretched garment on the supporting device is shown positioned at a slight angle to the direction taken by the moving solvent CS in the drum. The "directed" motion of the solvent is indicated by the arrows. It can be seen by the cleaning force arrows F–1 that the solvent is thrust and forced over and through the capillaries and fibres of the fabric of the garment 134 so as to remove any soils which are held therein.

It can be seen by the arrows F–2 that the solvent, acting as a wetting agent, penetrates the "soil-fibre" interface I, which exists between the soil and the fabric of the garment, and replaces the soil S from the fabric. The dissolved surface-active agents within the solvent itself assist this action.

In addition, as is the case with all soaps, detergents, or in this particular case, cleaning solvents, the solvent becomes positively absorbed on the surface of both the soil S and the fabric and thereby forms a "solvent-soil" interface instead of a "soil-fibre" interface. Thus the "solvent-soil" interface displaces the "soil-fibre" interface and, hence, the solvent actually consumes the actual soils themselves. The liquidity of the solvent is the vehicle for carrying the surface-active agents within the solvent to the point where it is needed for cleaning purposes, namely to the "soil-fibre" interface. The liquid solvent is also the vehicle for carrying away the separated soils S as shown by the arrows SS. In addition, the liquid solvent serves the function of distributing evenly about the garment the mechanical action imparted to it by the drum and interior vanes. By using the garment supporting device and its stationary position within the drum, the mechanical force which the drum and vanes supply to the liquid solvent for flushing away soils is substantially enhanced. Further, the energy force which the rotation of the drum and vanes give to the liquid solvent applies the impact required for reducing soil particle and globule size so that the resultant smaller size of the soils can be dissolved for stable dispersion within the solvent.

It should be recalled that with the recirculating system provided by this invention the soils which have been separated and removed from the garment are immediately carried away from the garment in a suspended form as designated by the arrows SS. Therefore, the soils which are separated from the garment no longer are permitted to be carried by the cleaning solvent back to the garment for redeposition on the garments as is the case with conventional washers or cleaners. The recirculating, filtering, and regenerating method provided by the construction of this invention, as previously described, prevents redeposition of soils.

Referring back to FIGURE 25 the clothes rack 133 may have placed thereon a shirt, or any other type of water washable garment, rather than a suit of clothes, for washing or cleansing. In the Letters Patent No. 3,292,829, filed Apr. 28, 1964, and patented Dec. 20, 1966, and No. 502,991, filed Oct. 23, 1965, there is disclosed a garment supporting device and an apparatus for, and method of achieving a finished appearance in a garment. The garment appearance-finishing embodiment of this invention, although substantially the same as disclosed in the aforementioned applications, has two distinct advantages over said applications. The one advantage consist of a better means, as provided for by the heaters 46 and 47 and water intake reservoir 45 of machine 1 for more effectively steaming or decatizing a garment which is to be ironed. The second advantage consists of being able to place a soiled shirt or garment on a supporting device for a washing operation prior to conditioning and ironing the shirt automatically within the same drum that was used during the washing operation.

Briefly, the ironer embodiment of this invention is explained as follows. The garment that is to be washed is placed on a supporting device 133 whereupon it is stretched into a wrinkle-free state. The garment is introduced as previously described into a washing drum for a washing operation. The washing of a garment supported and stretched on a supporting device is identical to the method used in dry cleaning a stretched garment.

Once the garment has been washed, it undergoes various cycles of dry hot air injection, steam injection, and ambient air injection in order to condition and appearance-finish said garment. After a short steaming cycle the garment is then subjected to hot and cold air injection cycles, as fully disclosed in the aforementioned patent application No. 502,991 in order to appearance-finish said garment.

With the combination machine herein disclosed a shirt, suit, or any other garment may be automatically washed or cleaned, conditioned, and appearance-finished in one machine. Thus, within a single unit a complete laundering, cleaning, and finishing of garments is achieved.

Referring now to FIGURE 33 of the drawings it will be seen that above a suitable base surface 143 there is secured a sequence control assembly or control switch assembly, bracket 144, which occupies the enclosure 5 of the machine 1 as seen in FIGURE 3. This sequence control assembly provides a means for automatically controlling the various operations provided by the machine 1. As can be seen by reference to FIGURE 13 it is contemplated that the sequence control assembly 144 may be made very small in cross section so as to occupy a minimum amount of space while yet furnishing a simple means for controlling many types of varied cycles and operations within a unit such as machine 1. The sequential controller 144 incorporates a manually operable selector dial 6 which has a plurality of positions each one of which, as will be further described herebelow, provides a predetermined sequence of operations for the machine. The control panel 145 incorporates a pushbutton 7 which must be depressed in order to energize the electrical circuit of machine 1. When the button 7 is depressed it also causes the relay 184 to close a switch 185 seen in the electrical schematic diagram of FIGURE 41 which operates a conventional door locking device. When the door latch is engaged the door 4 of the machine 1 is locked. When the button 7 is depressed it also causes the solenoid 186, FIGURE 41, to move a locking mechanism 187 to engage and make stationary a single sequence card 147A or other appropriate sequence control card which is selected by the operator by turning selector dial 6.

Referring now to the electrical schematic diagram of FIGURE 41 it can be seen that the sequence control card locking device 187 controlled by the solenoid 186 provides the means for affixing a sequence control card in a perpendicular manner as seen in FIGURE 33. The card is held in this position during any complete operation of the machine 1. The locking device 187 is comprised of a U-shaped bracket. The U-shaped bracket is so designed as to fit over the bottom of a preselected sequence control card and, thus, prevents the card from moving.

Referring now particularly to FIGURE 33 when the pushbutton 8 is depressed, it causes energization of the "bus" bar 156 owing to the pushbutton 8 being electrically connected to the bus bar 156 by the conductor 158. The start pushbutton 8 also effects the horizontal movement of the energized bus bar 156. Disposed on the control panel is an aperture which functions as a window or viewer 148 through which the operator may view and select the particular cycle of operation desired as indicated on the cycle indicator 146. Secured to base surface 143 of the assembly are suitable support members 149, 150 and 151 upon which a horizontal extending shaft or axle 152 is supported. Rigidly secured to axle 152 are selector dial 6, cycle indicator drum 146 and a plurality of sequence control cards 147. The axle 152 is caused to rotate with the manual turning of the selector dial 6 by means of bearing assemblies 153 hung in supports 149, 150 and 151. As the dial 6 is turned the operator may see through viewer 148 the designation of a particular cycle of operations printed on indicator drum 146, such as Wash, Rinse, and Dry. For every cycle of operation presented on the indicator drum 146 there is a specific and individual sequence control card 147 rigidly joined to the axle 152. For example, in FIGURE 33 the panel A designates that a Washing, Rinsing, and Drying operation will be performed by the machine 1. The panel A will be seen through the viewer 148 and a specifically programmed sequence control card 147a, which actually regulates and controls the clothes washing, rinsing, and drying operation will be in a position perpendicular to the base 143 of the assembly.

When a card, such as 147a is selected and automatically positioned, the operator then depresses button 7. The button 7 then causes the lock 187 to hold the sequence control card in a stationary position until the desired operation is completed in the machine 1.

Shown at the bottom of the example card 147a is a channel guide member 154, better seen in FIGURE 34, which may consist of a nonconducting material such as Bakelite, wherein slots 155 provide a means for the insertion, support, guidance, and the movement of the conducting bus bar 156 along a predetermined horizontal path. The bus bar 156 may consist of a conducting material such as copper. Connected to the bottom of bus bar 156 through the slot 155 is electrical conducting wire 158 which has its opposite end connected to pushbutton 8.

Rigidly fixed to the bus bar 156 is push rod 159 which has gear teeth located on its underside. The gear teeth of the push rod 159 are engageable with the teeth of gear wheel 160 in motor and gear box assembly 161. The push rod 159 is made of a rigid non-conducting material and is caused to move in a horizontal direction by means of gear wheel 160 which is attached to a timer motor 161a, shown schematically in FIGURE 41, enclosed in the gear box assembly 161. The motor 161a is energized by means of the conducting wire 179a connected to the pushbutton 8.

When a particular sequence control card, such as 147a is selected, and then locked into place by means of depressing button 7 in the manner previously described, the start button 8 is then depressed. The button 8 causes energization of the motor 161a which causes the gear wheel 160 to rotate and move push rod 159 and the energized bus bar 156 along a predetermined path, which in the present case, is a horizontal straight line. The bus bar 156 being energized becomes an electrical conductor. As the bus bar is caused to move in a straight line it traverses over the sequence control card 147a, as provided for by means of the guide slot 155 and push rod 159. The motor 161a is a constant-speed motor and causes the bus bar to travel at a constant speed.

Referring now more particularly to FIGURE 34 there is shown a representative form 147a of a sequence control card. The sequence control card 147a may consist of molded, nonmetallic and nonconducting insulating material, such as ceramic or Bakelite B which may be molded or shaped to encase and hold in a rigid position a plurality of conducting bands 165 and 166. The conducting bands may consist of a suitable metallic conducting material such as copper.

Referring now to FIGURE 35 there is shown the back half 163b of a Bakelite sequence control card with horizontal grooves 164 formed therein which extend horizontally across the entire horizontal length of the Bakelite material of the card. Strips or bars of conducting material such as copper are inserted in grooves 164 so as to form the conducting bands 165 and 166. The bands 165 and 166 have square or rectangular protrusions 167 which may be formed as integrated parts of the band itself, rather than as an attachment, extending out from the surface of the body of the bands 165 and 166. As will be explained hereinbelow the protrusions 167 provide the means whereby the various components of the machine are energized or de-energized in an established manner for specific and predetermined time periods.

Referring to FIGURE 36 there is shown the front half 163f of the representative sequence control card 147a. When the conducting bands 165 and 166 are positioned in the grooves 164 of the back half 163b of the card, the front half 163f and back half 163b are placed together to form a complete or unified sequence control card 147a as seen in FIGURE 34. In the front half 163f of the card there are provided square or rectangular slot-like openings 168 which correspond in all dimensions and positions to the dimensions and positions of the protrusions 167 on the back half of the card.

Because the protrusions 167 of the conducting bands 165 and 166 coincide with the openings 168 in the front half of the card the front half of the card can be joined with the back half so as to provide a complete sequence control card 147a. The two halves of the card may be permanently bonded together by means of heat sealing processes or by various commercial glues, or they may be united in an impermanent fashion by means of screws or bolts, thereby enabling the removal and replacement of the conducting bands should said bands become worn, broken, or damaged.

The conducting band protrusions 167 extend far enough away from the Bakelite surface of the back half 163b of the card to rise substantially above the Bakelite surface plane of the front half 163f of the card when said front half is joined to the back half. The resulting extension of protrusions 167 through the openings 168 and above the surface of the front half of the card, as seen in FIGURE 34, provide the means whereby the bus bar 156 can make contact with the bands 165 and 166 as the bus bar moves horizontally across the face of the totally assembled card 147a. It will be recalled that the bus bar 156 becomes an electrical conductor when the start button 8 is depressed.

As the electrically energized bus bar moves across the sequence card 147a it makes contact only with the surfaces of the protrusions 167. The bus bar does not make contact with the surface of the insulating or Bakelite portion 163f of the sequence card because the protrusions 167 extend out, or rise above the surface of the Bakelite portion of the card.

Referring now to FIGURE 34 there are shown for illustrative purposes only, two bands 165 and 166 which would have connected to them by means of wire or rod contacts 169 and 170 two components of the machine 1.

When the energized bus bar makes contact with band 165, as shown at point E, electrical current is simultaneously conducted from the bus bar to the band 165 and to the rod 169 to be subsequently conducted to a component in the machine. Thus, the component in the machine is energized.

It is also to be noted that at this particular point E the bus bar 156 does not make contact with any protrusion or extension of the conducting band 166. Therefore, no current is conducted from the bus bar to the band 166 and rod 170 to energize a component that would be connected to the rod 170. Hence, while the conducting band 165 is energizing a component in the machine the band 166 cannot and does not energize a component of the machine which would be in connection with the rod 170.

When a new position is assumed by the horizontal movement of the bus bar across the sequence control card, as can be seen at the point F, a different condition of components energization and de-energization occurs. At point F the bus bar does not make contact with any protrusion of the conducting band 165. Therefore, there is no current transmitted to the conducting band 165 and the rod 169. Hence, any component connected to the rod 169 would not be energized. However, the bus bar does make contact at the point F with a protrusion of the conducting band 166. The current from the bus bar is then conducted by the band 166 and rod 170 to a component connected to the rod 170. Hence, while the conducting band 166 is energizing a component in the machine 1 the conducting band 165 cannot and does not energize the component connected to the rod 169.

It will readily be understood from the simplified example and illustration just given that a sequence control card may consist of any number of distinct and separate conducting bands which may, individually or collectively, be connected to a plurality of components in the machine 1. By providing sequence control card possessing a plurality of programmed conducting bands the predetermined, intermittent, specific, and separate energization and de-energization of any number of components in the machine 1 may be effected.

Referring now to FIGURES 37, 38 and 39 there is shown a means for the conducting bands 165 and 166 and the rods 169 and 170 of the example sequence control card 147a of FIGURE 34 to make contact with rods or conductors 169c and 170c which could be caused to lead and connect with components in the machine 1. There is provided in support 150 of the sequence control assembly 144 a plurality of slot-like recesses. Two such slot-like recesses 171 and 172 are provided in support 150 and are indicated in FIGURES 38 and 39. In actuality the support 150 of the assembly 144 contains as many slot-like recesses as there are components in the machine. Positioned in each slot 171 and 172 are the ends of the rods or conductors leading to the specific components in the machine 1. As the rods, for example the rods 169 and 170 in FIGURE 37, extend from the sequence control card 147a they make contact with the conductors leading from the support 150 to the components in the machine 1. Thus, a means is provided to make a complete electrical connection from the bus bar to the individual components in the machine 1. The following example will demonstrate how connection is made from the bus bar to the various components in the machine. The slots 171 and 172 provide means for the rods 169 and 170 to slide and position themselves in the support 150 and thereby make contact with the conducting wires 169c and 170c which, in turn, lead to components in the machine 1. It is to be understood that the slots 171 and 172 are cut into the support 150 so as to define circumferential segments of a circle and, thus, the path of the slots enable the rods 169 and 170 to be guided in the support 150 to make contact with rods 169c and 170c when the shaft 152 and the sequence control cards attached to shaft 152 are caused to be rotated.

Referring now to FIGURES 37 and 40 it can be seen that a retainer 173 and a spring 174 fixed to support 151 provide the means for engaging a pawl 175 with gear groove ratchet 176 on the shaft 152. As the selector dial 6 is manually rotated, the shaft 152 rotates and the pawl 175 and ratchet 176 provides a means to arrest the cycle indicator at any desired position. As the shaft 152 is rotated the gear teeth of ratchet 176 push the pawl 175 in a downward direction against the spring 174 thereby compressing the spring. As the shaft is caused to continue rotating, the action of the compressed spring 174 pushes the pawl upwards to engage respectively each one of the grooves of ratchet 176. Each groove of the ratchet 176 may coincide with a panel on the cycle indicator 146 so that when the pawl engages a groove on the ratchet, there is a single panel of the cycle indicator positioned in the viewer on the control panel. When a panel and operation is selected, a corresponding sequence control card with the appropriate conducting bands for effectuating the operation designated on the positioned panel is situated so as to perform a specific operation.

With a sequence control card situated in an operating position, as seen at 147a of FIGURE 33, the locking device 187, shown in the electrical schematic diagram of FIGURE 41, is caused to engage and hold the sequence control card in a fixed position for the duration of one of the various washing and cleaning operations provided by machine 1.

Referring now to the schematic circuit diagram of FIGURE 41, there is shown the control arrangement for the machine 1 as it is controlled by the new and improved sequence control system herein disclosed. The entire control system of the machine 1 may be energized across a three wire power supply which includes supply conductors 179 and 180 and a neutral conductor 181. For domestic use, the conductors 179 and 180 will normally be connected across a 220 volt power supply with 110 volts appearing between the neutral line 181 and each of the conductors.

In the machine 1 there is provided a sequence control assembly 144, FIGURE 33, which affords an integrated control circuit to perform operations in the machine. The cooperative relationship of the assembly 144 with the various electrical components in the machine 1 will now be described. The sequence control card 188 is schematically shown as including a group of conducting bands 194, 237, and 200 through 221 which are respectively connected, during an operation, to appropriate terminals in the support 150 of assembly 144. From the terminals in 150 a plurality of conducting rods or wires 169c and 170c, seen in FIGURE 40, extend to each of the components of the machine 1. A movable, conducting bus bar 156 is advanced across the sequence control card 188 and makes contact with the conducting bands 194, 237, and 200 through 221. The bus bar 156 is movable as a unit by a motor-operated gear bar 159 in order that the bus bar 156 may make contact, or not make contact, with the conducting bands. When bus bar contact is made, as indicated by the cross-hatching, with any one conducting band a specific component which is electrically connected to the band will be energized. When the conducting bus bar does not engage the bands as indicated by the "no contact" blank area, NC, on the sequence control card, there is no energization of the bands and hence, no energization of the electrically connected components to the band. Thus, the bands being of predetermined length and being disconnected for predetermined intervals, provide the means for the sequential control of the various components during an operation within the machine 1.

The electrical system of the machine is energized by pushing or depressing "Start" button switch 7. It will be understood that in the conventional manner the manually operable start buttons 7 and 8 are positioned on the control panel of the machine. When the switch 7 is depressed, the normally open switch 182 is caused to close on the contact of conductor 183. Thus, an energizing circuit across conductors 179, 180 and 181 is completed. The closing of switch 182 energizes the solenoid 184 so as to close a switch 185 which operates a conventional door locking mechanism. The door locking mechanism is normally open when the circuit is de-energized and when the circuit of machine 1 is energized for an operation the door locking mechanism is engaged. The door 4 of machine 1 is thus locked during an operation as a safety feature. When the machine is in a nonoperating condition the door lock is opened.

The switch 182 when closed also energizes the solenoid 186 which causes the latching device 187 to engage and lock the selected sequence control card 188 in position so as to provide an operation within machine 1. For the purposes of a washing and drying operation the card 188, in this example, controls the operation. With the card 188 locked in position the pushbutton 8 is depressed.

The button 8 closes switch 189 on conductor 158. When the switch 189 is closed on conductor 158 it completes an energizing circuit between conductor 179 and 180 and the neutral conductor 181.

The button 8 controls a pair of normally open switches 189 and 190. When the switch 189 is closed it energizes the bus bar 156 through conductor 158 and when the switch 190 is closed it energizes the forward run of motor 161a through conductor 191. The wire conductor 158 is coiled around a spring-loaded conductor retaining device 177 which is made of nonconducting material. The retaining device 177, as better seen in FIGS. 44 and 45, serves as a means for retaining and holding the conducting wire 158 in order to prevent the conducting wire 158 from becoming entangled when the bus bar 156 is caused to move.

When the switch 190 is closed it energizes, through conductor 191, the constant speed motor 161a which is disposed in gear and motor assembly housing 161. The forward run of the motor 161a which drives the bus bar 156 horizontally across the sequence control card 188 is provided for by the thyraton 192 which controls the No. 1 field winding 193 of the motor 161a. The thyraton 192 is caused to fire immediately and continuously during the complete operation or forward motion of the bus bar 156. It should be noted that the bus bar 156 is caused to move at a uniform rate of speed by the constant speed motor 161a. Thus, the predetermined length of the conducting bands on the sequence control card 88 and the speed of the motor will precisely control the cycle time and define the period of each operation as provided for in the machine 1. For example, if the speed of the motor 161a causes the bus bar to move one-half (½) of an inch per minute along a horizontal straight line, and the longest conducting band is fifteen (15) inches in length, the complete time for the operation, as determined by the conducting band and the constant rate of movement of the bus bar, will be thirty (30) minutes.

Referring to the control card 88 and the time-graduated lines designated above the card it will be seen that the washing and drying operation is scheduled for a period of thirty-two (32) minutes. The time designations are made at one minute intervals. The time designations illustrate how and when the various cycles of operations are carried out during the washer and dryer operation of machine 1. The plurality of conducting bands 200 through 221 are shown connected to the components they control under the heading "components."

The start of the washing and drying operation is initiated by depressing the buttons 7 and 8. The motor 161a which has been energized for a forward run by the closing of the switches 189 and 190, drives the energized bus bar 156 across the card. The first band to be energized is band 194. The band 194 is simultaneously energized with the bus bar 156 because the band 194 is in immediate contact with the bus bar.

The reason for immediate contact between the bus bar and the band 194 will now be explained. When the band 194 is energized, it conducts current to relay 195. When the relay 195 is energized it opens the normally closed switch 196. When the switch 196 is closed it energizes the motor 161a to provide a reverse drive (arrow R) of the bus bar. The switch 196 energizes the motor 161a to run in reverse as provided for by the thyratron 197 which controls the No. 2 field winding 198 of the motor 161a. Therefore, the bus bar has to have immediate engagement with the band 194 to open the switch 196 in order to prevent a short circuit. A short circuit would occur by having the motor 161a energized both for a forward run and a reverse run at the same time with the start of the machine 1. It is now also pointed out that the thyratron 197 is a slow firing thyratron and it fires much more slowly than the thyratron 192. Therefore, the reverse drive of motor 161a is not initiated. During the brief interval in which the thyratron 197 is being fired, the band 194 conducts current to relay 195 which in turn opens the switch 196 and thus deenergizes the reverse thyratron 197. Phrased differently, the firing of thyratron 197 is so slow that it allows no current to pass to the motor 161a by way of the switch 196 for a brief period of time. During this brief period of time the relay 195 is energized and disconnects the switch 196. Throughout the complete operation the band 194 is energized and thereby keeps the switch 196 in an open position and prevents the firing of the thyratron 197 so as to prevent a reverse run of the motor 161a. At the end of the completed operation the band 194 is deenergized and the switch 196 closes and thereby the reverse run of the motor 161a is activated. It should also be noted that the thyratron 192 and 197 get their plate voltage through the armature of the motor 161a from a DC power line, which may be a battery 199. The sequence of events occurring with the de-energization of the band 194 at the end of the operation will be described later herebelow.

The reader is referred now particularly to the advantages the sequence control card 188 and the sequence control assembly 144 of FIGURE 33 provide over existing sequence control systems. In the sequence control assembly of this invention there are a number of conducting bands 200 through 221 which bands, when contacted by the energized conducting bus bar 156, perform the function of an equal or greater number of switches and cams. In conventional sequence control assemblies the conducting bands would be replaced by a number of switches, for example, switches 182, 185 and 189 of this circuit diagram. The opening and closing of the switches 182, 185 and 189 is normally controlled by a number of rotatable cams. Each individual switch of a conventional control switch assembly would have a corresponding rotatable cam associated with each switch. A plurality of cams would provide the means to open and close the switches in a suitable sequence so as to effect the desired operations within a machine. In addition, the rotation of the cams would be controlled and effected by one or several timer motors. Thus, when the timer motors would be energized, the cams would be caused to rotate and cause the switches to open and close. However, in the present sequence control assembly the bus bar performs the function of the timer motor which normally would rotate the cams so as to open and close the switches. The bus bar acting in conjunction with the conducting bands also functions as another part of conventional switching systems. That is, the conducing bands replace the cams and function in the same manner as the cams would in a conventional system. Thus, as the bands are energized or de-energized by the bus bar they perform the function of opening and closing the switches. Phrased differently, the different lengths and the sequenced intermittent contact of the bus bar with the conducting bands complete or break circuits in the manner or fashion that the cams and switches would in a conventional assembly. The duration of contact between the bus bar and the conducting bands determines the amount of time a component of the machine will be energized. The location of the conducting bands on the sequence control card determines precisely when the energization or de-energization of the components will be effected. Hence, the movement of the bus bar and the location of the conducting bands also serve as a timing mechanism.

For illustrative purposes, the conducting bands 200 through 221 have been shown as controlling various components of the machine during operation of the machine 1 for the washing, rinsing, and drying cycles. The washing and drying operation of the machine is now explained.

As the energized bus bar 156 is caused to travel across the sequence control card 188 it makes contact with the band 200. When the band 200 is contacted it is energized and the band then conducts current to the thyratron 222. The thyratron 222 is caused to fire and induces the No. 1 field winding of motor 37a to provide a forward run of motor 37a. The motor 37a causes the drum section 38 to move forward and engage the rotatable drum 10. The bus bar simultaneously makes contact with band 202 for the same period of time that it makes contact with band 200. The band 202 causes energization of the electromagnet 37b which holds the drum section 38 unto the end of shaft 37. Once the section 38 is placed into position and engaged with the drum 10, the bands 200 and 202 are disengaged and de-energized. Thus, the forward run of motor 37a and the energization of the electromagnet 37b are terminated.

Immediately thereafter the bus bar 156 makes contact with band 201. Bus bar contact with band 201 causes the thyratron 223 to fire and thereby provides current through the No. 2 field winding to cause a reverse run of motor 37a. As a result of the motor 37a running in reverse the shaft 37 is caused to move back to its normal resting position in door section 35.

The bus bar 156 next makes contact with band 203 which energizes the gear motor 20. The motor 20 causes the shaft 21 and the drum-half 13 attached to shaft 21 to move forward so as to join the drum half 13a in order to provide a closed or water-tight drum required, as seen under bracket B in FIGURE 3, for a washing operation. The band 203 provides for the forward run of motor 20 through the thyratron 224. Once the closed drum has been effected, the bus bar 156 disengages band 203 and contacts band 205.

The band 205 when contacted energizes the solenoid 50 which provides for the introduction of hot water into the washing drum 10. As the hot water is introduced into the drum and reaches a predetermined level within the drum, the pressure-activated sensing device or water level control 50a opens so as to de-energize the solenoid 50. Thus, when the proper level of water is reached for a washing operation the de-energized solenoid 50 is caused to terminate the introduction of water into the drum.

When the introduction of hot water is terminated, the bus bar makes contact with bands 206, 208 and 220. The band 206 energizes the variable speed motor 62 to provide, through the pulley and sheave assembly, a slow rotation of approximately 40 r.p.m. to the drum 10 for a washing operation. Engagement of band 208 energizes the solenoid 34–2 which lifts the filter holder 75 and filter 34 "up" into a nonfiltering or open position as seen at U in FIGURE 4. The solenoid 34–2 is energized for approximately the first three minutes of the washing operation. Therefore, the wash water is not filtered as is recirculates in the passage 29. The reason for not filtering the water during this three minute period is to allow time for the detergents in the water to loosen and attract the soils from the dirty clothes. Once the detergent water has liberated the soils, and the soils are held in suspension in the wash water, the solenoid 34–2 is de-energized and energized in an intermittent manner, thereby providing for the filtration of the soils from the contaminated wash water. The intermittent closing and opening of the filter is illustrated by the dash lines 208a which represent very brief contact with the conducting band 208. When a band 208a is contacted, the solenoid 34–2 is energized and causes the filter to assume an "up" or non-filtering position. When a band 208a is not engaged, the filter is in a "down" or filtering position. It should be recalled at this point that it is necessary to have the filter open and close in the manner just described so as to allow the baffles 30 and 32 to pass the filter 34 while the drum is rotating. The filter is operated intermittently until the end of the wash and rinse cycle as seen at the 16th minute.

Bus bar contact with band 220, at the same time as contact is made with the bands 206 and 208, provides for the band 220 to energize the relay 225 which closes the switch 226. When the switch 226 is closed, the variable heater 95 is energized to provide up to 170° of heat to the passage 29. The energization of heater 95 is controlled by the thermistor 227 in the following manner. When the temperature of the wash water inside the drum falls below 170°, as initially provided for the washing operation, the thermistor 227 senses the decrease in temperature and causes the switch 226 to close and thereby energizes the heater 95. The heater 95 having been thus energized supplies additional heat to the wash water which is being recirculated in the passage 29. The thermistor 227 also acts as a safety device so that if the heater 95 contributes too much heat to the recirculating water, and, in turn, causes the temperature of the water inside the drum to rise above 170°, the thermistor then causes the relay 225 to open. Thus, no current will be supplied to energize the heater 95. In other words, as the temperature of the water increases, the resistance of the thermistor decreases and more current flows in the circuit to the relay 225 which causes the switch 226 to open. When the switch 226 opens it de-energizes the heater 95. The band 220 is engaged throughout the complete washing cycle in order to have current available whenever it is needed to energize the heater 95.

At the end of the washing and rinsing cycle at approximately the sixteenth (16th) minute the bus bar disengages band 206. The motor 62 is thereby de-energized and the slow rotation of the drum is terminated. The disengagement of band 220 also takes place to curtail any energization of the heater 95.

The bus bar next contacts, at the end of the sixteenth (16th) minute, the band 204. Bus bar contact with band 204 energizes the motor 20 through the thyratron 228. The thyratron 228 controls the No. 2 reverse field winding which causes the motor 20 to run in a reverse direction. The motor 20, being caused to run in a reverse direction, moves the gear shaft 21 and the drum half 13 back towards wall 23 of the outer cabinet 12. Once the drum half 13 is caused to move and make contact with the wall 23, the band 204 is disengaged and thus the motor 20 is de-energized. As a result of these actions the drum 10 is in an open position, as seen under bracket A of FIGURE 3, and an annulus of perforations is effected therein. The open drum thus becomes a drying drum which enables a centrifuging and drying cycle to be effected in machine 1. The bus bar engages or makes contact with bands 207, 208, 209 and 210 in the seventeenth (17th) minute.

Bus bar contact with band 207 energizes an appropriate field winding in the variable speed motor 62 to provide a high speed rotation of several hundred r.p.m. to drum 10 for a centrifuging cycle. The band 208 is also engaged during the complete centrifuging cycle, thereby keeping the filter 34 in an "up" or nonfiltering position. The reason for placing and keeping the filter in a nonfiltering position during the complete centrifuging cycle from the seventeenth (17th) to the nineteenth (19th) minute is that the rotation of the drum 10 (at several 100 r.p.m.) is much too fast to permit intermittent operation of the filter.

Bus bar contact with band 209 provides energization of the relay 229 which causes the lower vent flap 41 to open and thereby allows the water inside the drum 10 to flow to duct 45. As the water flows from the drum to duct 45 the band 210 is engaged and the solenoid 230 is energized. The solenoid 230 opens the drain valve 57a so as to allow the discharge of the washing water to sump 57 for elimination out of the machine 1.

When the spent detergent water has been drained from the drum and the clothes have been centrifuged to remove moisture therein, the bands 205, 206, 208, 209 and 211 are engaged. The bus bar contact with band 205 energizes the solenoid 50 thereby providing for the introduction of hot water into the drum 10. The water being introduced into the drum subsequently flows from drum 10 into the duct 45. It will be noted that the band 209 is also in contact with the bus bar. Therefore, the relay 229 is energized and hence, keeps the lower vent flap 41 in an open position so that the water being introduced into the drum can flow into the duct 45. The band 211 is also contacted at this time and the heaters 46 and 47 are thereby energized. It will also be seen that the bands 206 and 208 are also engaged at the same time as bands 205, 209 and 211 are engaged. The bus bar engagement with band 206 provides for the energization of motor 62 and the slow rotation, approximately 40 r.p.m., of the drum 10. Bus bar contact with band 208 provides for the intermittent operation of the filter 34 as caused by the energization of the solenoid 34–2. The bus bar engages the band 213 approximately two (2) minutes after it engages bands 205, 206, 208, 209 and 211. Contact with band 213 energizes the impeller motor 77 to run at a moderate speed.

With the bands 205, 206, 208, 209, 211 and 213 being thus engaged there is provided the means for a steaming cycle in the machine 1 which is now explained.

The water which was introduced into the duct 45 by means of engagement with bands 205 and 209 is turned into steam by the engagement of band 211 which energized the heaters 46 and 47. The engagement of band 213 causes the energized impeller 77 to blow the steam into the rotating drum. The impeller 77 injecting steam into the drum, and the drum rotating, causes the steam to circulate about, in and through the fabric of the clothes. Thus, a steaming cycle is achieved.

Upon the completion of the steaming cycle the band 206 is briefly disengaged as seen in the twenty-third (23d) minute. The disengagement of band 206 terminates the rotation of the drum 10. The drum 10 has to be stopped from rotating in order to allow time for the filter 34 to be automatically replaced by the filter 34–1. The band 212 and the solenoid 231 provide the means to completely revolve the filter holder 75. The filter holder 75 is caused to revolve by the bus bar engagement with band 212 which energizes the solenoid 231. It is necessary to replace filter 34 with filter 34–1 because the filter 34 is specifically designed to filter out suspended soils and detergent in the liquid. The filter 34–1 however, is designed to filter lint and residues from circulating air. During the drying operation, which is now to be explained, the positioning of the specially designed filter 34–1 enables proper filtration of said contaminated air.

With the termination of the steaming cycle, at approximately the end of the twenty-second (22nd) minute of the operation, a drying cycle is initiated.

The drying cycle is initiated by bus bar engagement of bands 206, 208, 209, 213, 216, 217 and 221. The band 206 provides for slow rotation of the "opened" drying drum 10. The band 208 provides for intermittent filtering of the circulated air in order that the lint and residues may be removed. The band 209 and relay 229 are energized to hold the lower vent flap 41 open thereby allowing air being blown by impeller motor 77 to be injected into the drum. The engagement of bands 216 and 217 energize the heaters 89 and 90 and thus provide means to pre-heat air to a temperature of 250° to be injected subsequently into the drum. The band 218 is engaged to energize the impeller motor 78. The impeller motor 78 provides means to blow air over the heaters 90 and 91 into the drum 10 through the duct 45. The band 219 is engaged at the beginning of the cycle so as to energize the solenoid 233 which closes the impeller cover 85 over the impeller and motor. The impeller cover 85 is initially closed so that all the air being propelled by the impeller 78 is directed over the heaters 89 and 90 to be subsequently introduced into the drum 10 through the lower vent 41. The band 221 is engaged to provide current to the relay 234 for the closing of switch 235. The closing of switch 235 energizes the auxiliary heater 95 so that supplemental heat may be added when it is so required. It will be noted that the introduction of supplemental heat is regulated and controlled by the thermistor 236. It can be seen that band 214 is engaged shortly after the start of the drying cycle. The bus bar contact with band 214 and the simultaneous disengagement of band 213 causes the impeller motor 77 to shift to high speed operation. The high speed operation of impeller 77 causes more heated air to be injected and circulated within the drum. It will be noted that the bands 215 and 219 are disengaged during the drying cycle. The disengagement of bands 215 and 219 cause the vent flap 42 to open and the impeller cover 85 to open. Thus some of the air being propelled by impeller 78 can enter the drum through the upper vent flap 42 in order to effect more rapid drying of the clothes.

When the drying cycle is completed at approximately the end of the thirtieth (30th) minute of the operation, the bands 216 and 217 are disengaged thereby de-energizing the heaters 89 and 90. The band 221 is also de-energized thereby terminating the supply of current which energizes heater 95. Commencing with the thirty-first (31st) minute the bands 206, 208, 209, 213, 214, 215 and 219 are engaged to expel the heated air and to cool the clothes within the drum. The band 206 keeps the drum rotating. The band 208 energizes the relay 34-2 to keep the filter in an "up" position. The bands 209 and 215 hold the lower and upper vent flaps 41 and 42 in an open position. The band 214 continues to energize the impeller 77 at a high speed operation thereby providing for swift introduction of ambient air into the drum. The band 219 is engaged thus energizing the relay 233 to close the impeller cover 85 over the impeller 78. The closing of cover 85 causes all the air from the impeller 78, which is energized through band 218, to be propelled into the drum exclusively through duct 45.

Upon the termination of the exhaustion or cooling cycle, at approximately the thirty-second (32nd) minute, the drum 10 is caused to stop rotating by the disengagement of the bus bar with the band 206. The impellers 77 and 78 are also de-energized. The relay 233 is also de-energized, thereby causing the impeller cover 85 to assume an open or normal position.

As band 206 is disengaged the bands 200 and 202 are simultaneously contacted. The engagement of band 200 causes the motor 37a to run in a forward direction, thereby effecting the forward movement of the shaft 37 to engage the slot 99 in drum section 38. Band 202 energizes the electromagnet 37b. When the electromagnet contacts the drum 10 it acts as a brake to arrest or stop the drum at a predetermined position. The electromagnet is energized until the very end of the cycle for reasons which are now explained.

When the band 200 is disengaged, the forward run of motor 37a is terminated. The disengagement of band 200 is followed by the bus bar's immediate engagement with band 201. The band 201 provides for the energization and reverse run of motor 37a as afforded by the thyratron 223. It can be seen that the electromagnet 37b is also energized at this time, therefore the electromagnet will hold section 38 fast to the shaft 37. The motor 37a then moves shaft 37 back towards the door section 35. As shaft 37 moves towards the door 4 it pulls the section 38 out of engagement with catches 40 on the drum. It is to be understood that the strength of the electromagnet 37b is sufficient to disengage the latches 39. When the section 38 arrives at its resting position in section 35 of the door 4, the operation is complete. It will be noted that all the bands, except band 237, are disengaged at the end of the thirty-second (32nd) minute which is also the end of the sequence control card 188.

Referring now to band 237 it will be seen that the band 237 extends past all the other bands. The reason for the band 237 extending past all the other bands is intentional so that when energized the bus bar makes contact with the band 237 in order that the relay 238 can be energized.

The relay 238 when energized causes the switch 189 to open and thus de-energize the bus bar 156. The relay 238 also effects the opening of switch 190. It will be recalled that the switch 190 operates in conjunction with the switch 189. As switch 189 is opened the forward running of motor 161a is terminated as provided for by the de-energization of the thyratron 192.

It will be most particularly noted that when the energized bus bar loses contact with the band 194, the relay 195 is de-energized and the switch 196 therefore closes so that the thyratron 197 is energized which, in turn, causes the motor 161a to be energized through the field winding 198. The energization of motor 161a through the thyratron 197 provides for the reverse run of the motor 161a. However, before the motor 161a moves the bus bar 156 back over the sequence control card in the direction of arrow R the bus bar is automatically de-energized as follows. The bus bar actually causes its own de-energization when it engages the conducting band 237. When the energized bus bar makes contact with the band 237 it sends current through the band 237 and the conductor 239 to energize the relay 238. When the relay 238 is energized it causes the switch 189 to open and/or becomes disconnected from the conductor 158. The switch 189 then assumes its normally open position. Thus, the bus bar is de-energized. The switch 189 will remain in an open position until it is caused to be closed again by the manual depression of pushbutton switch 8.

When the switch 189 is opened, the switch 190 is caused to be opened and thereby de-energizes the forward run of the motor 161a through the thyratron 192 and field winding 193. The motor 161a which has been caused to run in a reverse direction moves the drive shaft 159 and the de-energized bus bar 156, attached to drive shaft 159, backwards in the direction of arrow R across the sequence control card 188. With the bus bar in a de-energized condition it cannot energize any of the conducting bands 200 through 221 when it travels back across the sequence control card 188. It will be recalled that the thyratron 197 is slow firing and does not allow sufficient current to be conducted through the field winding 198 to energize the reverse run of motor 161a until the forward run of the motor 161a is terminated. Thus, a short circuit in the system is avoided.

When the de-energized bus bar 156 has travelled back over the card 188 and arrives at its starting point at the left of the sequence control card 188, the bus bar "mechanically" trips the switch 182 open. The method by which the bus bar causes the switch 182 to open and de-energize the remaining components of the machine 1 is now explained. The switch 189 when opened also de-energizes the complete circuit.

Referring now to FIGURES 42 and 43 it will be seen how the bus bar accomplishes the opening of switch 182 and the subsequent de-energization of the complete circuit of FIGURE 41. In FIGURE 42, which is a top view of the bus bar arrangement, the switch 182 is shown in an open position and shown resting on the section 156c of the bus bar 156. The section 156c forms a rigid and integrated unit with the bus bar 156. The section 156c of the bus bar 156 is constructed of a rigid, nonconducting material, whereas the actual bus bar 156 consists of an electrical conductance material such as copper. When the pushbutton 7 is depressed to initiate an operation within the machine 1 the triangular pointed portion 7p of the button 7 forces the bus bar section 156c to the right as indicated by the arrow. The button portion 7p and the section 156c are separate parts and are not joined to one another. However, the portion 7p and section 156c are positioned adjacent to one another and have an angular relationship existing between them. When the button 7 is manually depressed by the operator the button portion 7p slides against and down the angular portion of section 156c thereby causing the section 156c to move in much the same manner an a conventional cam forces a cam-follower to move. The button portion 7p functions like a conventional cam and the section 156c reacts to the movement of button portion 7p as a conventional cam-follower reacts to the movement of a cam.

Referring now to FIGURE 43, which is a top view of the bus bar starting and stopping arrangement, the switch 182 is shown in a closed position thereby making contact with and shown resting on the conductor 183. It will be recalled that the conductor 183 is the conductor which provides for the complete energization of the electrical circuit of the machine 1 when the switch 182 completes a connection. It can also be seen in FIGURE 43 that the button 7 is in a completely depressed condition with the result that the button portion 7p has been caused to slide completely down the angular portion of section 156c. As a consequence of button portion 7p being caused to change positions by the button 7 being depressed, the section 156c is shown moved over to the right. The switch 182 which initially rested on the angular portion of section 156c is caused to close due to the pulling action of the spring 182a attached to switch 182. Since the section 156c has been caused to move to the right, the section 156c cannot prevent the closing of switch 182. In addition to the button portion 7p causing the movement of section 156c and thus allowing the switch 182 to close, the movement of section 156c also causes the bus bar 156 attached to section 156c to move to the right and engage the conducting bands positioned on the sequence control card 188. Thus, the bus bar 156 is shown placed in a "start" position.

The bus bar 156 being connected to wire conductor 158 is capable of horizontal movement because the wire conductor 158 is wrapped or coiled around the rotatable retaining device 177, better seen in FIGURES 44 and 45. The drive shaft 159 rigidly attached to the bus bar 156 does not restrict the manually initiated horizontal movement of the bus bar 156. Since the drive shaft 159 is engaged with the rotatable gear wheel 160 the manually initiated movement of the bus bar 156, caused by depressing the button 7, is possible.

When the button 7 is fully depressed by the operator as shown in FIGURE 43, the operator than releases the button 7. As a result of releasing button 7 the extension springs 178, which are compressed when the button 7 is depressed, are then able to assume their normal extended condition. As a consequence of the springs 178 expanding to their normal extended state, shown in FIGURE 42, the button 7 is caused to move to its original "start" position. It is to be understood that the springs 178 are retained between the panel 145 and the button 7. The button 7, as well as providing a holding means for the springs 178 through the utilization of the cylindrical rods 178r (which are attached to the button 7), are positioned in appropriate openings in the panel 145. Thus, the button 7 and the rods 178r are capable of movement back and forth in the openings provided for them in panel 145.

When the button 7 is depressed to cause the closing of switch 182 and the movement of the bus bar 156, the button 8 is then depressed by the operator. The normally open centrifugal switch 189 is caused to close by depressing the button 8. The closing of switch 189 provides a means to make a connection between the conductor 179a and the conductor 158. When switch 189 is closed the switch 190 working in conjunction with switch 189 as shown in electrical schematic diagram FIGURE 41, is also closed. Hence the bus bar 156 is energized and the forward run of motor 161a is effected. The motor 161a when energized causes the energized bus bar 156 to move across the sequence control card 188 to effect the washing and drying operation within machine 1. The actions just described explain how the machine 1 is started to provide an operation therein.

Referring once again to FIGURE 43 the method by which the operation of machine 1 is automatically terminated by the bus bar 156 will now be explained. It will be assumed that the bus bar 156 has completely travelled across the sequence control card 188 and effected an operation in machine 1. It will then be assumed that the de-energized bus bar 156 has been caused to move in a reverse direction back over the sequence control card 188 and has arrived at the position shown in FIGURE 43. The bus bar at the position as shown in FIGURE 43 will be caused to continue moving in reverse to the left of FIGURE 48 until it engages switch 182. The continued movement of the bus bar towards switch 182 is a result of the switch 196 being closed. The switch 192 when closed results in the reverse run of motor 161a as provided for by the thyratron 197 and the field winding 198. The switch 196 remains in a closed position until the switch 182 is opened. When the switch 182 is caused to open the entire control system, as seen in the electrical schematic diagram of FIGURE 41, it will be de-energized and as a result the bus bar 156, the motor 161a, and all components of the machine 1 will be de-energized.

As the bus bar 156 moves to the left of the position as shown in FIGURE 43, the section 156c, which is attached to the bus bar, also moves to the left. The section 156c will subsequently make contact between the switch 182 and the conductor 183 at the point X. The opening of switch 182 occurs when the pointed end Y of the section 156c slips in between the connection existing between the switch 182 and the contact of the conductor 183. When the pointed end Y of bus bar section 156c causes a complete separation of the connection existing between the switch 182 and the conductor 183 the entire control system of machine 1 is de-energized and the operation of the machine 1 will have been completed. It is to be understood that the movement of section 156c towards the switch 182 to disconnect the switch 182 from conductor 183 is not restricted by the button portion 7p of the button 7, because the button 7 and button portion 7p are caused to be moved in the beginning of the operation out of the way of section 156c by the extension springs 178. It will be recalled that the springs 178 cause the button 7 to move to an open or "start" position as seen in FIGURE 42 when the operator releases the button 7.

With the washing and drying operation completed in the machine and the entire circuit de-energized the relay 186 becomes de-energized. The de-energization of relay 186 causes the sequence control card locking latch 187 to become disengaged from the sequence control card. In addition, the relay 184 becomes de-energized and the switch 185 is caused to open. The opening of switch 185 causes the automatic door lock of door 4 to become unlocked. At this point the washing and drying operation as provided for in machine 1 is complete. The switch buttons 7 and 8 have been caused to assume an open or "start" position and all the other switches of the circuit are properly positioned so as to be ready to effect any type of operation that may be desired by the operator.

Referring now to the FIGURES 46, 47 and 48 there is shown a diagram of the sequence control cards which provide the means for the automatic operation of the dishwasher, drycleaner, and ironer embodiments of the machine 1. For the purposes of brevity, the explanation and illustration of that part of the electrical schematic circuit diagram which provides the means for the starting and termination of the dishwashing, dry cleaning, and ironing operations is not given. Because the commencement and termination of the washer, dryer, dishwasher, drycleaner and ironer operations are identical to one another, the energization and de-energization of the electrical circuit is not given. Since the electrical schematic diagram FIGURE 41 fully describes and illustrates the energization and de-energization of the washer and dryer embodiment of this invention, it is felt that a detailed explanation of the energization and de-energization of the dishwasher, drycleaner, and ironer embodiments of the machine would be unduly repetitious. Further, the components which are connected to each individual conducting band of the diagram of FIGURES 46, 47 and 48 are also now shown. Since all of the components of machine 1 are shown in FIGURE 41, and only the positions and length of the conducting bands change for each operation, a rendering of the components would also be repetitious. Hence, the illustrations of FIGURES 46, 47 and 48 show only the development of the conducting bands.

Consequently, it is to be understood that the control system for providing the dishwashing, dry cleaning and ironing operations, just now cited, are energized across a three wire power supply which includes supply conductors 179 and 180 and a neutral conductor 181 as seen in FIGURE 41. The electrical system of the dishwasher, drycleaner, and ironer embodiments are energized by pushing or depressing the pushbuttons 7 and 8. It is again pointed out at this time that the buttons 7 and 8 initiate and cause energization for all the operations provided for in machine 1. However, the specific operation to be performed by the machine 1 is determined by the dial selector 6 and the positioning of an appropriate sequence control card which controls the individual operation. That is, the operator can select from a number of example sequence control cards 147, seen in FIGURE 33, one specific sequence control card such as the "Wash Dishes" panel and card of FIGURE 33. The "Wash Dishes" card selected would then automatically control the various cycles of the dishwashing operation within the machine 1. Once the operator has selected a card for the desired operation by turning the dial selector 6, the buttons 7 and 8 are then depressed to provide the operation.

Referring now particularly to FIGURE 46, let it be assumed that the operator has selected the sequence control card 240. The card 240 will provide a dishwashing operation within machine 1. The button 7 is then depressed and the system is energized, the card 240 is locked in position, and the door 4 is locked. The button 8 is then depressed and the motor 161a and the bus bar 156 are energized. It is of course understood that the dishes and rack 100 of FIGURES 20 and 21 would have been, prior to the initiation of the operation, inserted into the drum 10 in the manner previously disclosed in this application.

The motor 161a drives the bus bar 156 forward across the sequence control card 240 and the bus bar first makes immediate contact with the band 241. The band 241 energizes the relay 195 and opens switch 196 and, thus, deenergizes the thyraton 197 and the field winding 198. This action restricts the reverse run of motor 161a.

The bus bar next makes contact with bands 242 and 244. The band 242 causes the motor 37a to move the section 38 into engagement with the shaft 10. The band 244 energizes the electro-magnet 37b which holds the section 38 onto the shaft 37. The bands 242 and 244 are then disengaged and the band 243 is engaged. Bands 243 provides a reverse run for motor 37a, thereby causing the shaft 37 to move back to its starting and resting position in door section 35 of door 4. The band 245 is then engaged and energizes the motor 20 which drives the shaft 21 and drum half 13 forward, as seen under bracket B of FIGURE 3, to engage drum half 13a to provide a closed dishwashing container.

It is now pointed out that although all the sequence control cards 188, 240, 256 and 277 are of the same vertical length, line L, they are of different horizontal widths, line W. The same length is necessary for all the cards because the conductors, for example conductors 169c and 170c of FIGURE 37 which extend from the cards to the components of the machine, are permanently connected to the support 150 as seen in FIGURES 33 and 37. All the components of the machine 1 are not used necessarily in the various operations provided. However, they must be in a position to be engaged when their use is necessitated. Hence, the sequence control cards 188, 240, 256 and 277 are of the same length even though all the conducting bands may not be used and all the electrical connections may not be made to certain components. The horizontal widths of the sequence control cards are of necessity, of a different dimension. Because the bus bar 156 moves at a constant rate across the width of the cards and because the various operations require different times to be completed, the conducting bands of the sequence control cards must be of different horizontal lengths. Therefore, the width of the cards themselves is determined by the time needed to complete each operation. Phrased differently the time required for a washer and dryer operation is thirty-two (32) minutes. Therefore, if the bus bar moves at a constant rate of one-half (½) inch per minute, the length of the longest conducting band and the width of the sequence control card will be approximately fifteen (15) inches. The dishwasher operation requires approximately fifteen (15) minutes to be completed. Therefore, the length of the longest conducting band and the width of the sequence control card controlling the dishwashing operation will be approximately seven and one-half (7½) inches Referring back to the sequence control card 240 it is seen that the band 247 is engaged and causes the solenoid 50 and water level control 50a to introduce hot water into the drum at an appropriate level for a dishwashing operation. The band 248 is then engaged and the motor 62 is caused to run at a slow speed and provide a drum rotation of approximately 40 r.p.m. to the drum 10. Thus, the washing solution inside the closed drum is caused to rotate, splash, and whirl over and about the dishes and utensils and, thus, cleanse the dishes and utensils. It will be recalled that the dish rack 100 which holds the dishes and utensils stationary is held, during rotation, in a fixed and nonrotatable position inside the drum.

The band 249 is contacted and, thus, energizes the filter solenoid 34-2. The band 249 remains in constant contact with the bus bar for the first minute and a half of the washing operation in order that the filter 34-1 is held in a nonfiltering position. Thus, the washing solution has sufficient time during this period to loosen and hold in suspension the grease and food particles washed free from the dishes and utensils. The band 249 is then intermittently engaged, as seen by the dash lines 249a, so as to lift open and close the filter and, thereby allow the passage of the baffles 30 and 32 in the passage 29 while the drum is rotating.

At the end of the tenth (10) minute, or the end of the washing cycle, the bands 246, 250 and 251 are contacted. The band 246 energizes the motor 20 so as to run in a reverse direction and, thus, effects the backward movement of drum half 13 in order to provide an open drying container as seen under bracket A of FIGURE 3 The band 250 is engaged and the relay 229 is energized thereby causing the lower vent flap 41 to open. This action allows the spent washing solution to flow into the duct 45. The band 251 is energized and causes the solenoid 230 to open the valve 57a so that the washing solution inside the drum 10 and duct 45 can be discharged from the machine 1.

It is noted that even though the withdrawal of drum half 13 disengages the octagonal shaft 128 from the holder 115b as seen in FIGURES 20, 21, 23 and 24 on the dish rack 100, the dish rack remains rigidly attached to the nonrotatable gripping shaft 119 as seen in FIGURES 20 21 and 22. The dish rack 100 will not fall or lose its position because the attachment to the gripping shaft 119 and the lower wheel support 117 provide ample support for the rack during a drying operation. It is necessary however, to have the dish rack engaged by both support devices 128 and 119 during a washing operation because the force of the swirling water during the washing operation is much greater than the force of circulating air during a dish drying cycle.

When the spent wash water is drained from the drum 10 as provided for by the engagement of bands 250 and 251 a rinse cycle may be initiated. The rinse cycle is achieved by energizing the bands 242, 247 and 248. The band 242 causes the drum to become closed so as to provide a water-tight container, the band 247 causes hot water to be introduced into the drum, and the band 248 causes the drum to rotate. The rotation of the drum causes the rinse water to clean off any residual soaps and contaminants which may remain on the dishes and utensils from the prior washing cycle.

At the end of the rinse cycle the band 243 is energized and causes the drum to open and effect a drying container. The bands 250 and 251 are energized thereby causing the lower vent 41 and drain valve 57a to open for the elimination of the rinse water from the machine.

With the drum in an open or drying state and the water drained from the drum, the bands 252 and 253 are energized. The band 252 causes the high speed run of impeller 77 and the band 253 energizes the relay 232 to open the upper vent flap 42 in order to expel the hot air and provide a drying and cooling cycle. The steam and hot air is thus expelled into the atmosphere through the apertures 97 and 98.

Upon the completion of the dishwashing cycle the bands 242 and 244 are engaged and, thus, cause the shaft 37 and electromagnet 37b to move forward and make contact with the slot 99 in drum section 38. The electromagnet working in cooperation with the slot 99 causes the drum to stop in a predetermined position. The band 242 is then disengaged and band 243 is energized. The band 243 energizes the motor 37a and provides the means for moving the section 38 back to its start and rest position in door section 35.

The de-energization of the circuit is then effected through the energized bus bar engaging the band 255. The band 255 energizes the relay 238 of electrical schematic diagram FIGURE 41 and thereby causes the switches 189 and 190 to open. The energization of the bus bar 156 and the forward run of the motor 161a is thus terminated. The bus bar is caused to move back to the left of the sequence control card by the reverse run of motor 161a being initiated through the closing of switch 196. When the bus bar arrives at its start position it mechanically trips the switch 182 open, as explained and seen in FIGURES 42 and 43, and the dishwashing operation is complete. All the switches of machine 1 are then in their original "start" positions and ready to perform another operation.

Referring now particularly to FIGURE 47, let it be assumed that the operator has selected the sequence control card 256 which will provide a dry cleaning operation for several garments or a single garment. For purposes of illustration it will be assumed that the operator has chosen to dry clean a single garment such as a suitcoat and a pair of trousers as seen in FIGURE 2. The garment supporting device illustrated in FIGURE 25 will have placed upon it the coat and trousers as seen in FIGURES 26 and 27 and the supporting device and garment will be placed in the drum 10. After closing the door 4 the operator then depresses the button 7 and the system is energized and, thus, the door 4 is caused to be locked and the sequence card 256 is also caused to be locked into operating and controlling position. The button 8 is then depressed and the motor 161a and the bus bar 156 are energized. The motor 161a drives the energized bus bar 156 forward across the sequence control card 256 and the bus bar first makes contact with the band 257. The band 257 causes the switch 196 of electrical schematic diagram FIGURE 41 to open and thereby de-energizes the thyratron 197 which would provide the reverse run of the motor 161a if energized.

The bus bar then makes contact with bands 258 and 260 which energize the motor 37a and the motor 37b so as to cause the drum section 38 to engage the drum 10 as previously described. The band 259 is then engaged and energizes the reverse run of motor 37a and causes the shaft 37 to move back to its rest position in section 35. The band 261 is then engaged which energizes the motor 20 so as to provide a closed drum 10, as seen under bracket B, FIGURE 3, in order to effect a cleaning drum.

The time required for the dry cleaning operation is approximately twenty-five (25) minutes, therefore, the width of the dry cleaning sequence control card 256 is determined to be about twelve and one-half (12½) inches in width, W line. The bus bar travelling at a constant rate of one-half (½) inch per minute determines that the width of the dry cleaning card will be twelve and one-half (12½) inches as was previously explained.

Continuing with the explanation of the movement of the energized bus bar across the card 256 of FIGURE 47, it will be seen that the bus bar engages the bands 263, 264 and 265. Bus bar contact with band 263 energizes the solenoid 50 in order to provide for the introduction of cleaning solvent to a proper level into the drum 10. When the drum is filled to a proper level, as determined by the level control switch 50a, the band 263 is then de-energized and the band 264 is energized. The band 264 causes the motor 62 to run at a slow speed and, hence, provides for a slow rotation of approximately 40 r.p.m., of the drum 10. The cleaning solvent is thereby caused to agitate, revolve about, in, and through the pores and fibres of the garment. It is to be understood that the garment supporting device is held in a fixed position within the rotating drum 10 by means of the fixing devices 141 and 142 on the supporting device, seen in FIGURES 25, 26 and 27, and the holding mechanisms in the drum as seen in FIGURES 22 and 23. The manner by which the devices 141 and 142 provide a means to fix the garment and supporting device 133 in the drum is identical to that previously described for the positioning of the dishwashing rack 100 in the drum during a dishwashing operation. The device 141 is attached to the nonrotatable shaft 119 of drum 10 as shown in FIGURE 22 and the device 142 is attached to the nonrotatable shaft 128 of drum 10 as shown in FIGURE 23.

The engagement of band 265 energizes the solenoid 34-2 and thereby provides for the operation of the filter 34 which filters contaminants from the cleaning solvent. The band 274 is engaged to provide current to supply the thermistor 236 and the heater 95 when supplemental heat is required to reheat and thereby maintain a constant temperature of the circulating solvent.

When the soils have been removed from the garments, as previously explained and illustrated by the FIGURES 4, 12 through 15 and FIGURE 32, the drum is caused to stop rotating.

The bands 262, 263, 266, 267, 268, 269, 270 and 272 are then energized. The band 262 is contacted and energizes the motor 20 to cause the drum half 13 to move back towards the wall 23 of the outside cabinet 12. An opened, or drying drum, as seen under bracket A of FIGURE 3 is thereby achieved. The band 266 is energized so as to energize the relay 229 and cause the lower vent flap 41 to open. The band 267 is energized so as to energize the solenoid 230 to open the drain valve 57a. As a result of energizing the bands 262, 266 and 267, the cleaning solvent is drained and discharged from the drum 10 and machine 1 through the sump 57 and duct 58. The band 263 is then energized to energize the solenoid 50 and, thus, provides a means for the introduction of hot water into the duct 45 through open vent 41. The band 268 is then engaged and causes the heaters 46 and 47 to be energized. The heaters 46 and 47 create steam from the water which has been introduced into the duct 45 by means of the solenoid 50 and the open vent 41. Shortly after the heaters have had time to create steam from the water, the band 270 is contacted and, thus, energizes the impeller 77 to run at a slow speed. The impeller 77 then propels the steam vapors into the rotating drum 10 so as to provide a steaming cycle in the dry cleaning operation. As previously explained, the steam eliminates any static charges which may have been set up by a hot air drying cycle. As a result of the steaming cycle, lint and residual solvent and contaminants are removed from the garment. In addition, the steam decatizes and conditions the garment prior to its being ironed by the method herein previously disclosed.

Upon the termination of the steaming cycle the band 267 is once again energized which causes energization of solenoid 230 which, in turn, opens the valve 57 in order to discharge the water from the duct 45 out of the machine.

The bands 265, 269, 271, 273 and 274 are then energized. The band 269 provides for the energization of solenoid 231 to effect the automatic replacement of filter 34 with filter 34–1. The solenoid 231 causes the filter holder 75 to revolve and thus, the air filter 34–1 is caused to assume the filtering position previously occupied by the solution filter 34. The band 265 is energized for brief intervals in order to energize and operate solenoid 34–2 intermittently so as to provide a filtering operation. The contact of band 271 energizes the impeller 77 to run at a high speed and the energization of band 270 causes the impeller 78 to be energized. The impeller cover 85 is closed over the impeller 78 by bus bar engagement and energization of band 273, which energizes the solenoid 233. The band 274 energizes the heater 95 so as to provide heat of approximately 100°, which subsequently is injected into the drum 10 for a drying cycle. After a few minutes of a drying cycle, the heater 95 is de-energized. The band 272 is then energized to energize the solenoid 232 to open the upper vent flap 42. The impellers 77 and 78, which are still energized, propel ambient air into the drum to cool the garment and supporting device by the expulsion of the heated air from drum 10 through vent 42 to the atmosphere through aperture vents 97 and 98.

When the cooling and exhaustion cycle is complete, the bands 258 and 260 are energized. The band 258 energizes motor 37a and causes the shaft 37 to move forward and engage the slot 99 in section 38 of drum 10. The band 260 energizes the electromagnet 37b so as to stop the rotation of drum 10 and to provide means to disengage the latches 49 of section 38. The band 259 is then energized to cause the reverse run of motor 37a which moves the drum section 38 back to its resting position in section 35 of door 4.

All the conducting bands, except band 257, are then disengaged to de-energize all the components. When the dry cleaning operation has thus been completed, the cleaned garment and support is removed from the machine. It is pointed out that the foregoing explanation for cleaning individual garments is identical to the method of drycleaning several garments (bulk drycleaning) in the machine 1. The only difference between the two methods of drycleaning individual garments and drycleaning several garments is that a garment supporting device is utilized when cleaning individual garments.

Referring now particularly to FIGURE 48 there is shown a diagram of the sequence control card 277 which will provide the control means for the washing and ironing, or appearance-finishing, of a garment. The appearance-finishing of a garment, as herein to be described, is a brief and supplemental outline of the detailed description of appearance-finishing a garment as disclosed in the copending application of Michael R. Krupsky and Harry A. Tompkins, Ser. No. 502,991, filed Oct. 23, 1965. The basic difference inherent in the method of appearance-finishing a garment herein now disclosed, from that compared with the aforementioned applications, is that a soiled garment, such as a shirt, may be washed and ironed in the machine 1 of this application. In the application No. 502,991, the garment to be appearance-finished or ironed has to be washed or cleaned in one machine and then transferred to another machine to be appearance-finished or ironed.

The following description will explain how the washing and ironing of a garment, such as a shirt, is accomplished in the machine 1 of this application. Referring back to the sequence control diagram 277 seen in FIGURE 48, there is shown the position and lengths of the conducting bands which perform the operation of washing and ironing a garment. The pushbuttons 7 and 8 are depressed thereby completing an electrical circuit as seen in FIGURE 41, and the motor 161a and bus bar 156 are energized so as to traverse the sequence control card 277 for performing the operation.

As the bus bar moves across the card, the bands 278 and 279 are engaged and energized and cause the drum section 38 to be engaged with the drum 10. When the section 38 is so engaged, the bands 278 and 281 are contacted. The energization of band 278 energizes the motor 37a and causes the shaft 37, which engages the section 38 to the drum 10, to be moved back to its resting position in section 35 of door 4. The energization of band 28 causes the energization and forward run of motor 20 which, in turn, provides for the drum half 13 to engage drum half 13a, and thereby provide for a closed drum to function as a washing container.

When the drum 10 is in a closed position, the band 283 is contacted and causes water to be introduced into drum 10 at a proper level as provided for by the solenoid 50 and water level control 50a. The bands 284, 285 and 297 are then engaged. The band 284 energizes the motor 62 so as to cause the drum 10 to rotate and agitate the washing solution about, in and through the pores and fabric of the garment. The band 285 is engaged to energize the solenoid 34–2 which operates the filter in an intermittent manner for filtering contaminants from the washing solution. Band 297 is contacted so as to provide a source of current for energizing the heater 95 in order to provide supplemental heat when so required.

When the garment has thus been washed, the bands 282, 283, 286, 287, 288, 289 and 290 are energized. Bus bar contact with the band 282 causes the drum half 13 to move away from the drum half 13a, and thus, a drying container is effected. The band 283 and solenoid 50 are energized so as to provide for the introduction of clean water into the duct 45 so that the heaters 46 and 47, when energized, can convert the liquid water to steam vapor. The band 286 and solenoid 229 are energized to open the vent flap 41. The band 287 and solenoid 230 are energized so as to open valve 57a in order that the contaminated wash water can be discharged from the machine 1 prior to the introduction of clean water into the drum. The band 288 is then contacted and energizes the heaters 46 and 47 for converting the clean water, which has been introduced and held in duct 45, to steam so that a further cleansing, steaming, and conditioning cycle during the washing and ironing operation is achieved. The band 289 and solenoid 231 are energized so as to rotate the filter holder 75 in order that the filter 34–1, an air purifying filter, can replace filter 34, a wash water purifying filter. The band 290 and impeller 77 are energized shortly after the steam producing heaters 46 and 47 are energized in order that the impeller 77 can inject the produced steam into the drum.

When the steaming cycle is complete, the band 287 and solenoid 230 are energized and valve 57a is opened to allow the discharge of any water remaining in duct 45. The bands 291, 292, 293, 294, 295 and 297 are then contacted. The band 291 and solenoid 237 are energized in order to open the vent flap 42 so that the hot air inside the drum 10 can be expelled from the machine 1. The bands 292 and 293 are contacted so as to energize the heaters 89 and 90 which provide a source of heat of 250° to be propelled subsequently into the drum 10 for a drying cycle. The bands 290 and 294 are contacted so as to energize the impellers 77 and 78 in order that the impellers can blow the heat from the heaters 89 and 90 into the drum 10. The band 295 and solenoid 226 are energized in order to close the impeller cover 85 over the impeller 78, and, hence, cause all the air which is being propelled by the impeller 78 to be directed into the passage 80 and duct 45 for injection into the drum 10. The band 297 is energized so as to provide a source of current for energizing the heater 95 in order that heater 95 can supply supplemental heat to drum 10 when it is required. When a hot air drying cycle is completed, the heaters 89 and 90 are de-energized. The impeller 77 is then energized for a high speed run by energization of the band 290. Both the impellers 77 and 78 are then caused to propel ambient air into the drum 10 so as to provide for a cooling cycle.

When the garment and supporting device are sufficiently cool for removal, all the bands are disengaged except band 299. As the bus bar loses contact with the band 298 it de-energizes the relay 238 of FIGURE 41 which causes the switch 196 to close and, thus, the reverse run of motor 161a is effected, which causes the de-energized bus bar to travel back over the card 277 to its starting position at the left of the card. Referring to the right side of the card 277 at the end of the operation the energized bus bar disengages band 298. The bus bar then immediately energizes band 299. Energization of band 299 energizes the relay 238 which causes the switches 189 and 190 to open. Switches 189 and 190 when opened de-energize the bus bar 156 and the forward run of motor 161a.

The switch 196, which has been held open all during the operation, is caused to close at the end of the operation when the bus bar loses contact with the band 298. When the band 298 is disengaged and de-energized the relay 195, which holds the switch 196 open, is de-energized and, hence, the switch 196 closes. When the switch 196 closes the reverse run of motor 161a, and the bus bar attached to the motor, is effected through the energization of thyratron 197 and field winding 198. When the de-energized bus bar has travelled completely back over the card 277 and when the bus bar reaches its starting position at the left of the card, it mechanically trips the switch 182 open, thereby de-energizing the complete circuit. The method by which the bus bar causes the switch 182 to be opened has previously been explained and illustrated in FIGURES 42 and 43. The sequence control card lock 187 and the door lock relay 184 when de-energized, open the door lock and the finished garment may then be removed from the machine 1.

While in accordance with the patent statutes I have described what at present is considered to be the preferred embodiment of my invention, it will be obvious to those skilled in the art that various changes and modifications may be made therein without departing from the invention. It is therefore aimed in the appended claims to cover all such equivalent variations as fall within the true spirit and scope of my invention.

What is claimed is:

1. A combination clothes washer, clothes dryer, dishwasher, and clothes drycleaning and appearance-finishing machine comprising: a horizontally disposed and rotatably mounted cylindrical clothes and dish container, said clothes and dish container being constructed as two cylindrical sections, said two sections being a first cylindrical section and a second cylindrical section, said first and second cylindrical sections being separable from one another, said sections possessing solid portions and perforated portions with said perforated portions so positioned as to form an annulus of openings around the container; a means for joining said first cylindrical section to said second cylindrical section in order to form an imperforated closed cylindrical container for clothes and dishwashing operations; a means for separating said first cylindrical section from said second cylindrical section so as to form a perforated open cylindrical container for clothes and dish-washing operations.

2. A clothes and dish container, as in claim 1, in which said means for joining and separating said first and said second cylindrical sections also serves as a means to support and provide for the rotation of the container.

3. A clothes and dish container, as in claim 1, including means to tumble clothes and agitate solution inside said clothes and dish container, said means comprised of a plurality of inwardly extending tumbling vanes whereby each singular vane of said plurality of vanes is constructed so as to be separable into a first vane section and a second vane section, said first vane section being rigidly joined to said first cylindrical container section and said second vane section being rigidly joined to said second cylindrical container section, said first vane section aligned parallel with and caused to be positioned adjacent to said second vane section when said clothes and dish container is caused to form an imperforated clothes and dish container, said first vane section caused to be positioned in parallel, but not positioned adjacent to, said second vane section when said clothes and dish container is caused to form a perforated clothes and dish container; means provided by said parallel alignment and adjacent positioning of said first vane section and said second vane section and means provided by said parallel alignment, but not adjacent positioning, of said first vane section and said second vane section to allow the unrestricted opening and closing of said clothes and dish container.

4. A clothes and dish container, as in claim 3, in which said first vane section and said second vane section lie sufficiently adjacent to one another when said clothes and dish container is caused to be placed in an open perforated condition, means provided by said partial adjacent positioning of said first and second vane, when said clothes and dish container is in an open state to enable the caused rotation of only one said cylindrical section of said clothes and dish container to automatically cause rotation of the other said cylindrical section.

5. A clothes and dish container, as in claim 1, in which said container possesses a third movable section, means provided to move said third movable section, said movable section constituting an integral part of said cylindrical container in that said third movable section provides means to form a completely enclosed cylindrical container when said third movable section is joined to the main cylindrical body of the said clothes and dish container, and wherein said third movable section, when separated from said clothes and dish container, provides an opening in said container, said opening providing a means to deposit clothes and dishes in said clothes and dish container.

6. A clothes and dish container, as in claim 5, in which said third movable section has disposed therein a recess so as to provide for the insertion and engagement of a rigid member, said rigid member providing means to position said movable section onto the clothes and dish container; said rigid member also providing means to disengage and separate said third movable section from the clothes and dish container.

7. A clothes and dish container, as in claim 6, in which said rigid member includes means to arrest the rotation of the clothes and dish container in a predetermined position.

8. A clothes and dish container, as in claim 1, in which said two separate cylindrical sections of the said container have a common aperture disposed in their respective cylindrical wall portions, said aperture having a first rigid baffle attached and positioned substantially perpendicular to said common aperture and said first baffle rigidly attached adjacent to said aperture, said first baffle positioned and fixed on the exterior side of said cylindrical wall portions of the container, said first baffle extending across the cylindrical width of the clothes and dish container, said aperture providing means to discharge liquid and/or air from the interior of the clothes and dish container, and said first baffle providing means to restrict movement of discharged liquid and/or air, and said first baffle providing means to direct liquid and/or air discharged from the interior of said clothes and dish container back into the interior of the clothes and dish container.

9. A clothes and dish container, as in claim 8, in which said first rigid baffle is constructed so as to be separable into a first baffle section and a second baffle section, said first baffle section being rigidly joined to said first cylindrical section of said container, and said second baffle section being rigidly joined to said second cylindrical section of said container, said first baffle section aligned parallel with and caused to be positioned adjacent to said second baffle section when said clothes and dish container is caused to form a closed imperforated clothes and dish container; said first baffle section caused to be positioned in parallel with, but not adjacent to, said second baffle section when said clothes and dish container is caused to form an open perforated clothes and dish container; means provided by said alignment and positioning of said first and second baffle sections to allow the unrestricted opening and closing of said clothes and dish container.

10. A clothes and dish container, as in claim 8, including means by which a second rigid baffle attached substantially perpendicular to the exterior cylindrical wall portions of said container is positioned distant from the said aperture and said first baffle, said second baffle providing a means to carry and drive liquid and/or air discharged from the interior of said container towards said aperture and said first baffle whereby said first baffle and said second baffle move in tandem while the container is caused to rotate, said positioning and tandem movement of said baffles providing means to restrict the movement of said discharged liquid and/or air between said first baffle, said aperture, and said second baffle.

11. A clothes and dish container, as in claim 8, in which said second rigid baffle is constructed so as to be separable into a first baffle section and a second baffle section, said first baffle section being rigidly joined to said first cylindrical section of said container, and said second baffle section being rigidly joined to said second cylindrical section of said container, said first baffle section aligned parallel with and caused to be positioned adjacent to said second baffle section when said clothes and dish container is caused to form a closed imperforated clothes and dish container, said first baffle section caused to be positioned in parallel with, but not adjacent to, said second baffle section when said clothes and dish container is caused to form an open perforated clothes and dish container; means provided by said alignment and adjacent positioning of said first section and said second section of said second rigid baffle to allow the unrestricted opening and closing of said clothes and dish container.

12. A clothes and dish container and a stationary chamber, as in claim 8, wherein said aperture has attached adjacent to it a first rigid baffle, said first rigid baffle providing means to direct filter-cleansed and filter-regenerated solution and/or air from said annular passage through the said aperture, said solution and/or air thereby caused to be injected into the clothes and dish container.

13. A clothes and dish container and a stationary chamber, as in claim 8, wherein said aperture when caused to be positioned below the level of the soiled solution inside the clothes and dish container provides a means for the discharge of all or a portion of said solution from the interior of said container to the said annular passage, said aperture being caused by the rotation of said container to be positioned below the level of the soiled solution.

14. A clothes and dish container and a stationary chamber, as in claim 10, wherein the discharge of the soiled solution and/or contaminated air from the interior of the clothes and dish container to the annular passage is caused to be contained and restricted in the annular passage between said first rigid baffle and said second rigid baffle, said second baffle providing means to carry and drive said soiled solution and/or contaminated air to the filtering device positioned in the annular passage wherein said filtering device provides for cleansing and regenerating the soiled solution and contaminated air prior to the solution of air being injected by means provided by the first rigid baffle and aperture into the said clothes and dish container.

15. A combination machine, as in claim 1, comprising: a horizontally disposed, separable and rotatable mounted cylindrical clothes and dish container; means to separate and/or join two sections of said clothes and dish container; means to disconnect a third movable section from said two container sections of said rotatable container, said means effecting an opening in said rotatable container; means to rest said movable section in a door; said door providing means to effect an opening in said stationary chamber, said opening providing means to introduce a garment-supporting device or a dish-holder device into said rotatable container, said rotatable container having a first fixing means and a second fixing means to support said garment-supporting device and said dish-holder device in free space in a fixed, nonrotatable position in said rotatable container while said rotatable container is rotating.

16. A combination machine, as in claim 15, wherein first fixing means in said rotatable container is comprised of a horizontally disposed nonrotatable member, said nonrotatable member possessing a catch mechanism; means provided by said catch mechanism to engage and hold onto a take member on said garment supporting device; means provided by said catch mechanism to engage and hold onto a take member on said dish-holder device, said catch mechanism and said take member cooperating with each other so as to effect a stationary condition of said garment-supporting and dish-holder devices; said non-rotatable member having a first bearing member positioned parallel and adjacent to it, said first bearing member being enclosed by and attached parallel and adjacent to a rotatable first member, said first rotatable member being joined rigidly to said rotatable container; said first rotatable member also being joined rigidly to a second rotatable driving member, said second rotatable driving member providing means to rotate said first rotatable member and said rotatable container; said second rotatable driving member having a second bearing member positioned parallel and adjacent to said second rotatable driving member; said second bearing member being housed in a stationary enclosure device; said stationary enclosure device joined to said stationary, non-rotatable chamber; said second rotatable member supported by a third bearing member, said third bearing member being joined at one end to the vertical wall of said stationary chamber and being joined at its opposite end to a stationary brace member.

17. A combination machine, as in claim 15, wherein second fixing means is provided to hold said garment-supporting device and said dish-holder device in free space within said rotatable container; said second fixing means comprised of: a horizontally disposed, convertible support member, said convertible support member being caused to convert from a semifixed support member to a fixed, non-rotatable support member; means provided on said garment-supporting device and means provided on dish-holder device to convert said convertible support member to a non-rotatable member; means to provide continuous engagement of said convertible support member with the rotatable container by a support container member, said support container member having a bearing member positioned therein; said bearing member being held in said rotatable container by a rotatable member and said rotatable container; said bearing member positioned parallel and adjacent to said convertible support member; said bearing member providing means for rotatable movement of said rotatable member around said convertible support member; said rotatable member being joined rigidly to said rotatable container; means provided by said rotatable member to allow rotation of the said rotatable clothes and dish container; means provided to rotate said rotatable container and the rotatable member joined to said clothes and dish container.

18. A combination machine, as in claim 15, which includes a loader-rack apparatus; means provided by said loader-rack for the support of said garment-supporting device and said dish-holder device while garments or dishes are placed upon said support devices; means provided by said loader-rack apparatus to position said garment-supporting or dish-holder devices within the interior of the rotatable clothes and dish container; said loader-rack comprised of: a base member; means provided by said base member to effect the positioning of said garment-supporting and said dish-holder devices in the rotatable container, said rotatable container and said base member severally and jointly supplying means to have said loader-rack engaged in said rotatable container; means provided by a brace member to hold said loader-rack, said garment-supporting device and said dish-holder device in a rigid position outside the combination machine; means to position said brace member in a position parallel and adjacent to the combination machine; means provided by said loader-rack apparatus and said brace member for a safe and convenient loading of and introduction of said garment-supporting device and said dish-holder device into said clothes and dish container.

19. A combination clothes washer, dryer, dishwasher, and clothes drycleaning and appearance-finishing machine comprising: a rotatably mounted imperforate cylindrical clothes and dish container; means for rotating said container, means provided to tumble clothes and agitate solution in said container; a separate imperforate stationary chamber surrounding said rotatable container, said stationary chamber and said rotatable container so related as to define and provide an open passage between said stationary chamber and said rotatable container, means for introducing solution in said rotatable container; means including a baffle and aperture on the rotatable container to direct the solution across said open passage into the rotatable container, said baffle and aperture means on said rotatable container forming a separate compartment in combination with said stationary chamber, means for transferring the solution from the rotatable container to said separate compartment to regenerate the solution in said open passage, means provided to transfer said regenerated solution from said separate compartment back into the interior of said rotatable container.

20. A clothes and dish container having a rotatable container and a stationary chamber arrangement, as in claim 19, wherein a filtering device provides means to filter contaminants and spent detergents from soiled solution, said filtering device also providing means to filter lint and residues from contaminated air; said soiled solution and contaminated air being carried to and thrust through said filtering device by said baffle, said baffle being formed so as to cover completely the annular passage space created by the vertical wall portion and the cylindrical wall portion of the said stationary chamber and the vertical enclosure wall portion and the cylindricall wall portion of said clothes and dish container; means provided when the clothes and dish container are caused to rotate to move said filter device out of the path of said first and said second baffles.

21. A clothes and dish container and a stationary chamber, as in claim 19, in which said stationary chamber has a first aperture and a second aperture; said first aperture located in the bottom portion of said stationary chamber, said second aperture located in the top portion of said stationary chamber, said apertures serving as both air inlets and air outlets; means for covering said apertures so as to provide a water-tight and/or an air-tight stationary chamber; means for uncovering said apertures so as to effect air inlets or air outlets; said apertures cooperating with a first inlet duct and a second inlet duct, said first inlet duct connected to said first aperture, said second inlet duct connected to said second aperture; means for impelling air through said ducts into said stationary chamber and said clothes and dish container.

22. A clothes and dish container and a stationary chamber arrangement, as in claim 21, in which said first and said second ducts have first and second impellers positioned therein; said first impeller located in said first duct and said second impeller located in said second duct; said first impeller having an inlet formed substantially on the axis of rotation of said first impeller, said first duct connected to and aligned with said first impeller and said first duct connected to and aligned with said first aperture of said stationary chamber; said second impeller having an inlet formed substantially on the axis of rotation of said second impeller, said second duct connected to and aligned with said second impeller and said second duct connected to and aligned with said second aperture of said stationary chamber.

23. A clothes and dish container and a stationary chamber arrangement, as in claim 22, in which a common duct passage connects and is aligned with said first impeller and said second impeller, said duct passage having a heater assembly positioned therein; said second impeller providing means to blow air down and over said heater assembly in said duct passage in order to preheat said air, said preheated air being directed to said first impeller, said first impeller providing means to impel said preheated air into said first duct; said preheated air being injected through said first aperture in said stationary chamber to said clothes and dish container.

24. A duct and aperture arrangement, as in claim 22, wherein said axis of rotation of said first impeller and said second impeller are substantially horizontal.

25. A duct and aperture arrangement, as in claim 22, including a means to cover said second impeller, said covering means causing all the air impelled by said second impeller to be directed into and over said heater assembly in said duct passage.

26. A clothes and dish container and a stationary chamber arrangement, as in claim 22, in which heaters are positioned in said first duct, said heaters providing means to heat water introduced into said first duct and thereby causing said water to be transformed into steam; means provided by said first impeller, said first duct and said first aperture to cause injection of said steam into said clothes and dish container.

27. A clothes and dish container and stationary chamber arrangement, as in claim 22, including means to discharge water or solution from said clothes and dish container, said first duct, and said combination machine.

28. A combination machine comprising: a rotatable clothes and dish container being enveloped by a stationary chamber, said cylindrical rotatable container and stationary chamber so related as to form an annular passage between said container and said chamber, said rotatable container having an aperture therein; said aperture having a first rigid baffle attached adjacent to it, said rotatable container having a second rigid baffle attached distant from said first rigid baffle and said aperture; said first and second baffles formed so as to extend from the said vertical enclosure wall of the rotatable container to the opposite vertical wall of the stationary chamber; said first and second baffles attached to and extending from the cylindrical wall portion of the rotatable container to the opposite cylindrical wall portion of the stationary chamber; means thus provided for said first and second baffles to cover the space produced by the said annular passage; said first and second baffles and said vertical enclosure wall of said rotatable container and said vertical wall of said stationary chamber so related to one another as to form a restrictive container within said passage; means provided by said restrictive container to enclose and confine the movement of solution and/or air within the said passage.

29. A rotatable clothes and dish container and stationary chamber arrangement, as in claim 28, in which the circumference of the said rotatable container and the level of solution inside the said container are the factors which substantially determine the distance ascribed between the relative locations and positions which said aperture and said first baffle bear to second baffle; means to control and determine the discharge of said solution and/or air contained in said annular passage to the interior of said rotatable container provided for by the location and position relationship of said aperture, said first and said second baffles and said circumference of the rotatable container and the level of solution inside said container.

30. A rotatable clothes and dish container and stationary chamber arrangements, as in claim 28, in which the location and position of a filtering device is substantially determined by the location and position relationship of the said aperture, said first and said second baffles, said circumference of the rotatable container and the said level of solution inside said container.

31. A rotatable clothes and dish container and stationary chamber arrangement, as in claim 28, in which the means to control and determine the discharge of solution and/or air from the interior of said rotatable container into the said annular passage is provided by the location and position relationship of said aperture, said first and said second baffles, and said circumference of the rotatable container and the lever of solution inside said container.

References Cited
UNITED STATES PATENTS

| | | | |
|---|---|---|---|
| 1,084,275 | 1/1914 | Hess | 134—189 |
| 1,183,632 | 5/1916 | Collins et al. | 68—142 |
| 1,215,583 | 2/1917 | Sessions | 134—189 |
| 1,629,856 | 5/1927 | Boughton | 68—4 |
| 1,671,557 | 5/1928 | Tyler | 134—189 |
| 2,797,567 | 7/1957 | Helen | 68—4 X |
| 2,819,540 | 1/1958 | Toma et al. | 68—16 X |
| 2,892,335 | 6/1959 | Gray | 68—16 |
| 3,022,654 | 2/1962 | Aberle | 68—18 |

WILLIAM I. PRICE, *Primary Examiner.*